United States Patent [19]

Smalley et al.

[11] Patent Number: 5,209,878

[45] Date of Patent: May 11, 1993

[54] SURFACE RESOLUTION IN THREE-DIMENSIONAL OBJECTS BY INCLUSION OF THIN FILL LAYERS

[75] Inventors: Dennis R. Smalley, Baldwin Park; Hop D. Nguyen, Little Rock; Kris A. Schmidt, Granada Hills; Herbert E. Evans, Valencia; Ray S. Freed, Northridge; Paul J. Jacobs, La Crescenta, all of Calif.

[73] Assignee: 3D Systems, Inc., Valencia, Calif.

[21] Appl. No.: 605,979

[22] Filed: Oct. 30, 1990

[51] Int. Cl.$^5$ .................. B29C 35/08; B29C 41/02
[52] U.S. Cl. ..................... 264/22; 118/407; 118/423; 118/428; 118/429; 118/620; 156/273.5; 156/275.5; 156/307.1; 156/379.6; 250/432 R; 250/492.1; 264/232; 264/308; 264/340; 264/343; 364/476; 365/106; 365/107
[58] Field of Search ............... 264/22, 40.1, 232, 255, 264/308, 340, 343; 425/135, 174.4, 375; 156/64, 242, 273.3, 273.5, 275.5, 307.1, 378, 379.6; 427/53.1, 54.1, 393.5, 407.1, 430.1; 118/407, 423, 428, 429, 620, 712; 250/432 R, 492.1; 364/468, 476, 522, 523; 365/106, 107, 119, 120, 126, 127; 430/270, 328, 331; 395/119

[56] References Cited

U.S. PATENT DOCUMENTS 4,752,498  6/1988  Fudim .................. 427/54.1

FOREIGN PATENT DOCUMENTS 56-144478  11/1981  Japan .

OTHER PUBLICATIONS

Sculpting Parts with Light by Efrem v. Fudim, published Mar. 6, 1986.
Automatic method for fabricating a three-dimensional plastic model with photo-hardening polymer by Hideo Kodama, published Nov. 1981.
A new method of three-dimensional micromachining by Efrem Fudim, published Sep. 1985.

*Primary Examiner*—Leo B. Tentoni
*Attorney, Agent, or Firm*—Lyon & Lyon

[57] ABSTRACT

Methods and apparatus for reducing surface discontinuities, resulting from the formation of a three-dimensional object out of a plurality of stacked layers, during layer by layer stereolithographic formation of the three-dimensional object. The discontinuities between layers are reduced by utilizing formation and solidification of thin fill layers near the edges of thicker structural layers or by utilizing surface tension effects to smooth discontinuities between the structural layers by formation of meniscuses of building material and solidifying the meniscuses.

69 Claims, 37 Drawing Sheets

↧ SUPPORTS

↧ SUPPORTS

"IN-SITU SURFACE FINISHING BY "MENISCUS RAMP" METHOD

STEP D

"SUPER ELEVATE"

TO ALLOW RESIN TO

FORM "FREE MENISCUS RAMP"

STEP E

CORRECTLY POSITION
LASER BEAM SO THAT
OUTERMOST EDGE OF
LASER BEAM COINCIDES
WITH CORNER OF LAYER
N=1 (i.e. LOWER LAYER),
AND CURE THE NEW
"MENISCUS RAMP"

STEP E

DEEP DIP

AND CONTINUE...

SURFACE RESOLUTION IN THREE-DIMENSIONAL OBJECTS BY INCLUSION OF THIN FILL LAYERS

BACKGROUND OF THE INVENTION

I. Field of the Invention

This invention relates generally to the field of forming three-dimensional objects through a layer by layer buildup in accordance with the principles of stereolithography, and, more specifically, to increasing the surface resolution of such objects by the creation of thin fill layers to fill the surface discontinuities which inherently form in such objects in the course of building up the object layer by layer.

II. Background of the Invention

A variety of techniques for step wise building of three-dimensional objects have recently become available. One such technique is stereolithography, which is described in U.S. Pat. Nos. 4,575,330 and 4,929,402, the disclosures of which are hereby fully incorporated by reference herein (hereinafter the '330 and the '402 patents). In one embodiment of stereolithography, a three-dimensional object is formed in accordance with a corresponding object representation through a step wise laminar buildup of cross-sections of the object at the working surface of a polymerizable resin, which cross-sections are formed at the surface by selective exposure to UV radiation. Moreover, in accordance with this embodiment, the cross-sections, as they form, are adhered to previously-formed cross-sections through the natural adhesive properties of the polymerizable resin as it solidifies. FIG. 1 illustrates a side view of a spherical object 1 which is formed by the stepwise layer by layer buildup of stereolithography. The layers of the object are identified by numerals 1a, 1b, and 1c, respectively. Also shown is a corresponding object representation 2 which may be a data representation of the surface of the object originating from a CAD system (this representation may later be sliced into cross-sectional representations which are used to drive the stereolithography process). In FIG. 1, the object representation is depicted to be a representation of the surface of the object, and it appears as a circular envelope around formed object 1. The formed object 1 is depicted by the hatched area. Also shown are stair step surface discontinuities 3a through 3x which comprise deviations between the object 1 and the object representation 2. These surfaces discontinuities inherently form in objects produced through stereolithography, and result from the layers being used to form such objects having finite thicknesses. If, as will be discussed subsequently, infinitesimally small thin layers could be utilized, the surface discontinuities would be eliminated entirely. However, as will also be discussed subsequently, thin layers may, in general, not a feasible solution for reducing the surface discontinuities, and other techniques must be employed.

Additional details of stereolithography are available in the following co-pending patent applications, the disclosures of which, including appendices, are hereby fully incorporated by reference as though set forth in full herein:

| U.S. APP. SERIAL NO. | FILING DATE | INVENTOR(S) | STATUS |
| --- | --- | --- | --- |
| 07/182,801 | 4/18/88 | Hull, et al. | U.S. PAT. NO. 4,999,143 |
| 07/183,015 | 4/18/88 | Smalley | U.S. PAT. NO. 5,015,424 |
| 07/268,428 | 11/8/88 | Freed | ABANDONED |
| 07/268,429 | 11/8/88 | Modrek et al. | U.S. PAT. NO. 5,076,974 |
| 07/268,816 | 11/8/88 | Spence | U.S. PAT. NO. 5,058,988 |
| 07/268,837 | 11/8/88 | Spence | U.S. PAT. NO. 5,123,734 |
| 07/268,907 | 11/8/88 | Spence | U.S. PAT. NO. 5,059,021 |
| 07/331,644 | 3/31/89 | Hull et al. | ALLOWED |
| 07/339,246 | 4/7/89 | Hull et al. | U.S. PAT NO. 5,104,592 |
| 07/365,444 | 6/12/89 | Leyden | ALLOWED |
| 07/414,200 | 9/28/89 | Hull et al. | PENDING |
| 07/415,168 | 9/29/89 | Sekowski et al. | PENDING |
| 07/427,885 | 10/27/89 | Spence et al. | PENDING |
| 07/429,911 | 10/27/89 | Spence et al. | U.S. PAT. NO. 5,133,987 |
| 07/428,492 | 10/27/89 | Vorgitch et al. | ABANDONED |
| 07/429,435 | 10/30/89 | Hull et al. | U.S. PAT. NO. 5,130,064 |
| 07/429,301 | 10/30/89 | Lewis et al. | PENDING |
| 07/495,791 | 3/19/90 | Jacobs et al. | PENDING |
| 07/515,479 | 4/27/90 | Almquist et al. | ALLOWED |
| 07/545,517 | 6/28/90 | Cohen | U.S. PAT. NO. 5,096,530 |
| 07/566,527 | 8/13/90 | Jacobs et al. | ABANDONED |

Additional details of stereolithography are also available in two related applications which are being filed currently herewith. The disclosures of these additional applications are hereby fully incorporated by reference herein as though set forth in full.

The first of these concurrently-filed applications is U.S. patent application Ser. No. 07/606,191, entitled "Boolean Layer Comparison Slice," filed by Snead et al. This application discloses an apparatus and method for slicing an object representation into a plurality of cross-sectional representations, utilizing boolean operations to compare the boundaries of successive layers, which cross-sectional representations are subsequently used to drive a stereolithographic apparatus to produce successive object cross-sections in a layer by layer buildup of the object.

U.S. patent application Ser. No. 07/427,885, now U.S. Pat. No. 5,133,987, incorporated by reference above, describes various stereolithography apparatus design considerations and in particular describes design considerations related to the exposure system. The following three paragraphs have been extracted from this referenced application.

There are a number of considerations which are advantageously undertaken in the design of a stereolithographic apparatus. When using a dynamic mirror system to trace the desired pattern, a laser beam may be used which is passed through a converging lens before being directed by the mirrors to the working surface. This lens is chosen to bring the beam to a focus on the working surface of curable material which is often a liquid photocurable resin. Before passing through this converging lens, the beam may be passed through a diverging lens in order to increase its size and thereby allow a smaller image point to be formed after being focused by the converging lens. All parts of the horizontal liquid surface upon which the beam is to be traced do not have the same path length from the dynamic mirror system; and, therefore, the beam may not be in optimum focus at all such parts of the horizontal liquid surface. The beam must be focused to a relatively fine point so that maximum resolution of details may be realized in the part formed. Because of this focusing problem, a system employing a small field of view relative to the beam path length is desirable. This small field of view refers to the target surface dimensions (maximum width) being small relative to the path length between the scanning mirrors and the target surface. In other words, the angular displacement of the scanning mirrors should be small when traversing between extremes on the target surface. This design criteria is at odds with the need to make relatively large parts with such a system and keep the size of the system within reasonable limits.

The orientation of the beam is also of importance. As cure rates are affected by beam intensity (power/per unit area), it is advantageous to have a relatively uniform orientation of the beam on the surface. Similarly, a problem can occur whenever solidifying radiation impinges on the target surface at angles other than ninety degrees. When this happens, resin will be cured at these same angles, giving rigs to a roughness of part finish known as the shingle effect. Therefore, a design consideration is to have the beam as close to perpendicular to the liquid surface as possible. Again, small patterns relative to the length of beam path enhance this desired condition.

It should be noted that the shingle effect is reduced by building layers which are thin relative to the error which can be tolerated. This is because it is the displacement in the X-Y position of the beam at the liquid surface and the X-Y position of the beam at one layer thickness below the surface that gives rise to the error which causes the shingle effect. The thinner the layers, the more off perpendicular to the beam can strike the surface without producing significant shingling. In equation form, the maximum angular displacement of the beam from off center, $\theta$, is equal to the arctangent of the error which can be tolerated divided by the layer thickness. For an error tolerance of 2 mils and a layer thickness of 20 mils, for example, the maximum angular displacement of the beam can be about 5.7 degrees. However, if the layer thickness is reduced to 5 mils, the maximum angular displacement can be increased to about 21 degrees.

The second of these applications is U.S. patent application Ser. No. 07/606,802, entitled "Simultaneous Multiple Layer Curing for Forming Three-Dimensional Objects," filed by Smalley et al. This application describes methods of building high resolution objects from traditionally low resolution combinations of building materials and synergistic stimulation, which combinations result in a particularly deep (and therefore low resolution) cure depth. This is accomplished by delaying the exposure of certain areas on a particular cross-section until layers of material for additional cross-sections have been placed over the particular cross-section at which point, corresponding areas on the upper cross-sections are exposed. The number of these upper cross-sections are determined based on the cure depth being deep enough to penetrate and transform the specific areas at issue on the cross-section at hand. If exposure of these areas had not been delayed, because of the cure depth involved, resolution would have been negatively impacted, because material on lower cross-sections than the cross-section at hand would be inadvertently cured.

Turning to FIG. 2, the magnitude of the deviations and the corresponding discontinuities depend on the location of the discontinuity on the object surface. A "feature" of the object comprises a particular localized area on the surface of the object, and in FIG. 2, numeral 2a identifies a horizontal feature, while numeral 2b identifies a vertical feature. Therefore, as seen in the figure, the magnitude of the discontinuity is negligible at horizontal and vertical regions 2a and 2b, respectively. The only surface regions where the deviations are material are those regions which comprise neither completely horizontal nor nearly vertical features. Additionally, FIG. 1 depicts an undersized object while FIG. 2 depicts an oversized object.

Several techniques have been proposed to eliminate these surface discontinuities. As will be seen below, each one has one or more attendant problems, which prevent the technique from having universal applicability over a wide range of part geometries.

As mentioned earlier, a first proposed technique is the use of thinner layers. The technique of using thinner layers in the context of an undersized part is illustrated in FIGS. 4a and 4b. FIG. 4a is similar to FIG. 1 in that it depicts a side view of a spherical object and its corresponding object representation, but it differs from FIG. 1 in that the layer thickness of FIG. 4a, identified with numeral 4', is about half as much as that of FIG. 1, identified with numeral 4. As shown, the corresponding surface deviations 3a' through 3x' of FIG. 4a are smaller than the surface deviations 3a through 3x of FIG. 1. FIG. 4b and FIG. 2 are similarly related, in the context of an oversized part, except that the layer thickness in FIG. 4b, also identified with numeral 4', has about half the layer thickness of the formed object of FIG. 2, identified with numeral 4.

This technique, however, is not generally feasible with the typical combinations of building material and synergistic stimulation available. For example, typical building materials may not be able to form layers which are thin enough to adequately reduce surface discontinuities. Therefore, the individual layers once formed may not be adequately cohesive while in an unsupported state. This problem is more fully described in the concurrently filed U.S. patent application Ser. No. 07/606,802, entitled "Simultaneous Multiple Layer Curing for Forming Three-Dimensional Objects". Even if an appropriate material could be obtained, thin layers can be excessively affected by various forces that are applied to the part during its formation, thereby resulting in the material still being incapable of forming adequately cohesive layers. These forces include forces responsible for curl distortion, and those which are applied to the part during formation. For example, using an overdip recoating process, the layers of the part experience drag and gravitational forces as the partially-formed part is dipped up and down repeatedly in a vat of material in the course of successively coating top-most layers of the partially-formed part with layers of untransformed material to be utilized in the formation of successive part layers.

Another problem with thin layers is the longer layer formation time that may be required to form them. As discussed in the '330 patent, when using an overdip recoating technique, the partially-formed part is typically over-dipped into the vat of material so that excess material flows over the top-most layer. Then, the partially-formed part is typically up-dipped, and excess material is allowed to flow off or is swept away by means of a doctor blade or the like to form an untransformed layer of relatively uniform thickness. Because of the viscosity of the material involved, it may take an unacceptably long time for the excess material to flow off and leave a thin uniform layer of untransformed material. In addition, as described in Ser. No. 515,479, the use of a doctor blade to speed up this process may not be possible because of various problems attendant with the formation of thin layers.

A further problem with thin layers is that it may be difficult to control the exposure of the building material to the synergistic stimulation both to ensure that regions intended to be transformed are not exposed too much, resulting in a greater thickness than desired, and to ensure that regions not intended to be transformed are not inadvertently exposed since exposure may result in creating undesired solidified regions. In the case where the material is transformed upon exposure to a beam of radiation emitted by a source of synergistic stimulation, exposure control is typically performed by means of rotatable scanning mirrors which direct the beam to a working surface of building material, and by means of a shutter. These mirrors are described in the '330 patent, and in U.S. patent application Serial Nos. 07/331,644; 07/268,816; 07/268,907; 07/268,837; and 07/428,492. The shutter is described in Ser. No. 07/428,492. The specific control problems are obtaining mirrors which can be rotated fast enough both to guarantee the formation of thin enough layers, and also to prevent appreciable exposure over areas that are not to be transformed.

Another technique which has been proposed is an oversized building technique (known as STYLE 1 or 2) described in Ser. No. 07/331,664, according to which an oversized object is built which deviates from a corresponding object representation by means of solid deviations, which solid deviations are sanded down in a post-processing step. FIG. 2 illustrates an oversized object. Compared with FIG. 1, surface discontinuities $3a$ through $3x$ are shown which extend beyond the envelope of the object representation 2 thereby giving justification for the designation of STYLES 1 and 2 as oversized building styles. The extent of these deviations is shown by the cross-hatched areas in FIG. 2. These discontinuities or deviations could be sanded down so that the sanded object would more closely match the object representation.

A problem with this technique, however, is that it is impossible or extremely difficult to sand down surface deviations located in relatively inaccessible areas, since it may be difficult to situate an appropriate sanding apparatus in these areas. Therefore, these styles can only be used with a subset of possible part geometries where the deviations are situated in accessible areas.

Another disadvantage with this techniques is that it requires a manual post-processing sanding step, which can be labor-intensive, time-consuming, is largely incapable of being automated, and is therefore expensive.

A third technique which has been proposed is an undersized building technique (known as STYLE 3 or 4) described in U.S. patent application Ser. No. 07/331,644, according to which an undersized object is built which deviates from an object representation by means of hollow deviations. For this technique, the hollow deviations are filled in with material, and this material is then exposed to synergistic stimulation in a subsequent post-processing step. An undersized object is illustrated in FIG. 1, and the hollow surface deviations $3a$ through $3x$ are also illustrated. These deviations would be filled in with material and exposed in a subsequent post-processing step so that the resultant object would more closely match the object representation.

A benefit of this technique, compared to the oversized building technique, is that there are fewer inaccessible part geometries. However, this technique still suffers from the disadvantage that it requires a subsequent post-processing step which is manual, labor-intensive, is largely incapable of being automated, requires additional equipment, and is therefore expensive.

An additional disadvantage of this technique, compared to the oversized technique, is that certain undersized objects may not be structurally sound. This problem is illustrated in FIG. 3. FIG. $3a$ depicts a sideview of an object representation which is a side view of a sphere with a rectangular hole passing horizontally through it. FIG. $3b$ shows the object formed with a given layer thickness using an oversized building technique (STYLE 1 or 2). FIG. $3c$ shows the same object formed with that same layer thickness (as that used in FIG. $3b$) using an undersized building technique (STYLE 3 or 4). As shown, not only does the object have the characteristic surface discontinuities, it is also structurally unsound. Layers $1b$ and $1c$ (comprised of sections, $1b'$, $1c'$, and $1c''$), for example, are completely separated from each other by gaps $2e$ and $2f$. The same thing is true for layers $1l$ and $1m$.

To alleviate this problem, special supports could be used during the building process. These supports would support the separated layers, i.e., layers $1b$ to $1c$ and $1l$ to $1m$ in the Figure, until they could be adhered to the other layers, thereby ensuring structural soundness. However, even with these supports, the gaps must still be subsequently filled in with material and exposed. Compared to the filling in of surface discontinuities, it would be difficult to fill in the gaps between layers with any degree of accuracy. Therefore, application of specialized supports do not provide a general solution to the separation problem.

A fourth technique which has been proposed is described in Ser. No. 415,168. This application describes filling in the surface deviations simply by immersing the object in a liquid, or subjecting it to electrostatic powder coating, whereby the deviations are smoothed out by the action of surface tension. This technique requires additional equipment, and is therefore expensive. It additionally suffers from the same problems as does the undersized building style, and, additionally, for the accurate formation of parts, it requires the development of a slice program or the like which not only builds an undersized object as previously described but one which undersizes the object further to compensate for the coating thickness that will be formed even in surface areas where there are no surface discontinuities.

For all the foregoing reasons, an object of the present invention is to provide an apparatus for and method of reducing surface discontinuities in a three-dimensional object formed by stereolithography, which is general enough to apply to a wide range of object geometries. It is a further object to provide such an apparatus and method which can be implemented on the same apparatus used to build the object in the first instance, which does not require further equipment, and which is capable of being automated compared to the previously-described techniques. It is an even further object to provide such an apparatus and method which employs the use of thin layers to improve surface resolution, but which does not have the problems traditionally inherent in the use of thin layers, i.e., slow speed of layer formation, lack of structural strength, and the like.

Additional objects and advantages will be set forth in the description which follows or will be apparent to those of skill in the art who practice the invention.

SUMMARY OF THE INVENTION

To achieve the foregoing objects, and in accordance with the purpose of the invention as embodied and broadly described herein, there are provided methods and related apparatus for reducing a surface discontinuity comprising a deviation between a region of a three-dimensional object surface and a desired object envelope, the region to comprise an end of a not yet formed first structural layer, and an extension region, the extension region to comprise at least a portion of a surface of a not yet formed second structural layer, the second structural layer to have an end which is to extend beyond an end of the first structural layer by the extension region, the ends to abut at least in part against the envelope, the surface of the second structural layer to contact, at least in part, a surface of the first structural layer, and the first and second structural layers to have thicknesses, the method comprising the following steps: containing a volume of flowable material, the material capable of selective physical transformation upon selective exposure to synergistic stimulation; selectively exposing the material to a first exposure of the synergistic stimulation to form a first selected one of the first and second structural layers; selectively exposing the material to a second exposure of the synergistic stimulation to form a first fill layer having a first portion which contacts, at least in part, a portion of the first selected one which portion comprises the region at least in part; and selectively exposing the material to a third exposure of the synergistic stimulation, which may be before the formation of the first fill layer, to form a second selected one of the first and second structural layers which is different from the first selected one.

DESCRIPTION OF THE PREFERRED EMBODIMENTS

The preferred embodiments of the subject invention distinguish between filling in surface discontinuities of up-facing features and filling those of down-facing features. Up and down-facing features are described in more detail in U.S. patent application Ser. No. 07/331,644. Briefly, in an object built with a plurality of structural layers, the term "up-facing" refers to a region on the object surface bounded by an extension region on an upper surface of a second structural layer and an end of an adjacent first structural layer situated above the second structural layer where an end of the second structural layer extends beyond an end of the first structural layer by the extension region. The term "down-facing" refers to a region on the object surface bounded by an extension region on a lower surface of a second structural layer, and an end of an adjacent first structural layer situated below the second structural layer, where an end of the second structural layer extends beyond an end of the first structural layer by the extension region. The above definitions of down-facing and up-facing regions are suited for the needs of this application; however, in general, any region of a layer which is not bounded from below is a down-facing region, similarly for any region of a layer which is not bounded from above is an up-facing region.

The treatment of surface discontinuities of down-facing features will be addressed first. FIGS. 5a–5e all illustrate different methods of forming fill layers that fill surface discontinuities at a down-facing feature. In each of these figures, like elements are referred to with like numerals. In particular, the shorter first structural layer is referenced with numeral 6, the second structural layer with numeral 5, the ends of the first and second layers by the numerals 6' and 5', respectively, and the extension region on the lower surface of the second layer is referenced with identifying numeral 5". The surface discontinuity comprises a deviation between a down-facing region of the object surface and an envelope of an object representation. The down-facing region of the object surface is bounded by the extension region 5" of the second layer, and the edge 6' of the first layer. The deviation is, in turn, bounded by this down-facing region of the object surface and the envelope 10 of the object representation.

An aspect of the subject invention is the use of thin fill layers to reduce a surface discontinuity. The thin fill layers which have been added to reduce the surface discontinuity are referenced with numerals 7a, 7b, and 7c. Each of the layers shown in the figures, both structural and fill layers, are formed in a particular order, and the order in which each layer is built is indicated by a circled number corresponding to that layer.

Figure 1:
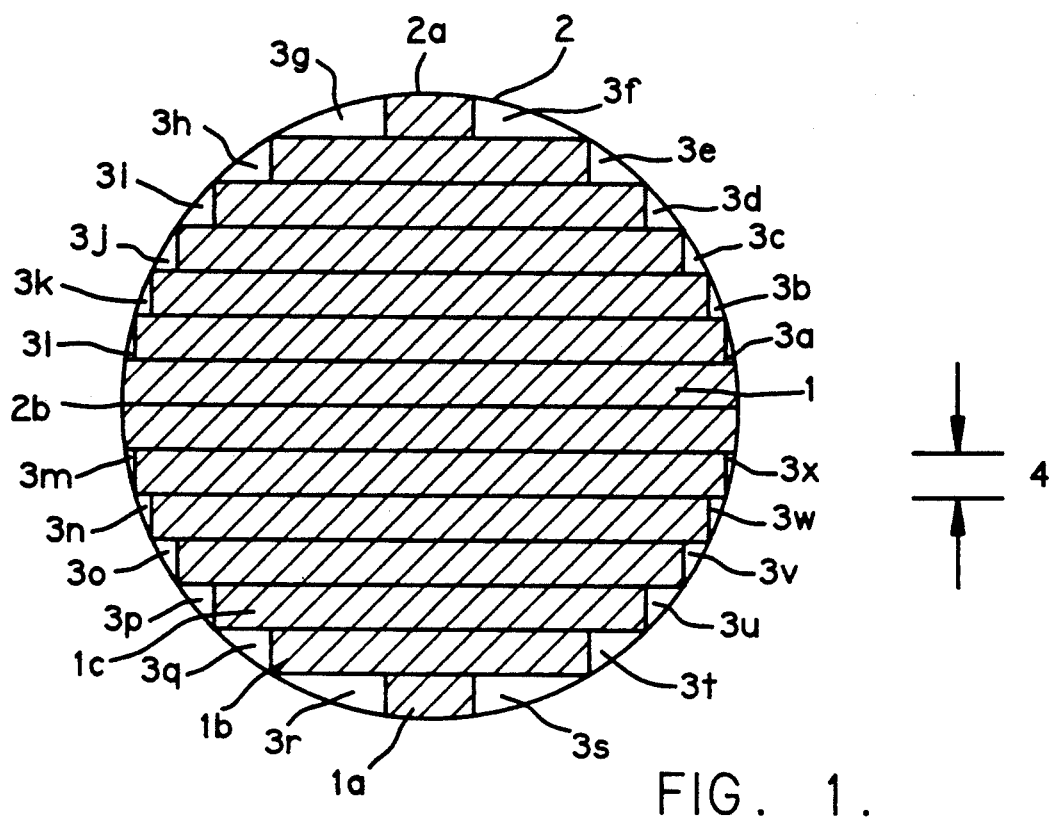
FIG. 1 illustrates a three dimensional object built using an undersize style.
Figure 2:
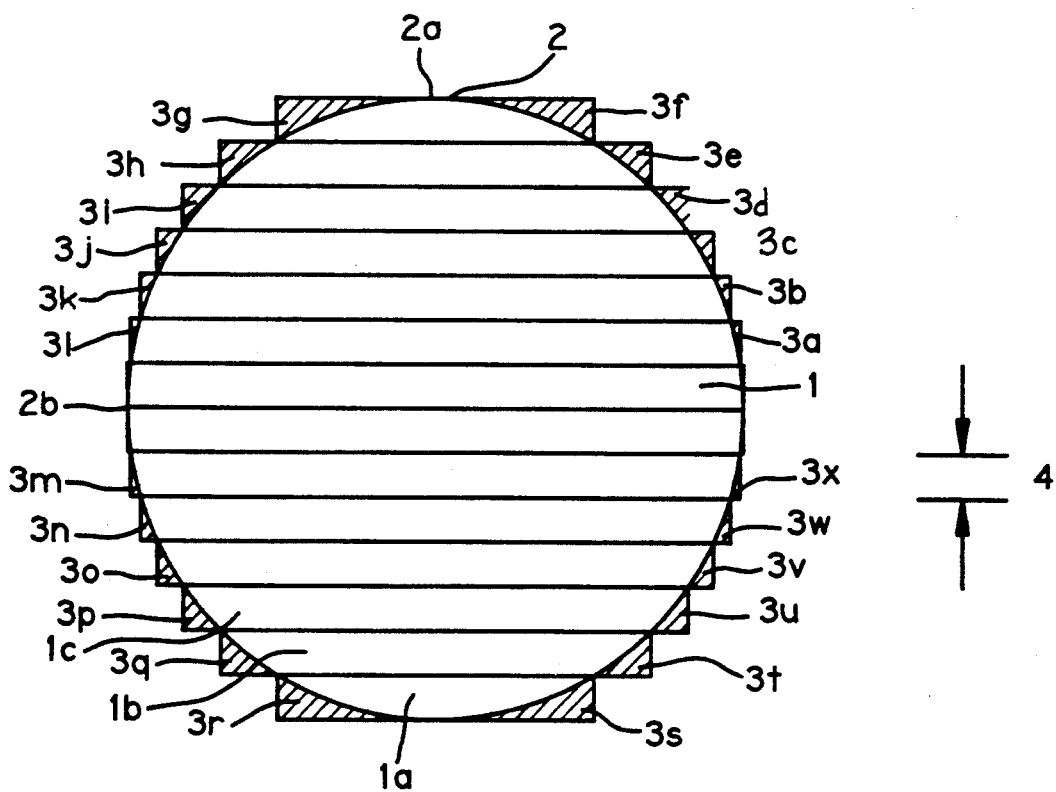
FIG. 2 illustrates an object built using an oversize style.
Figure 3A:
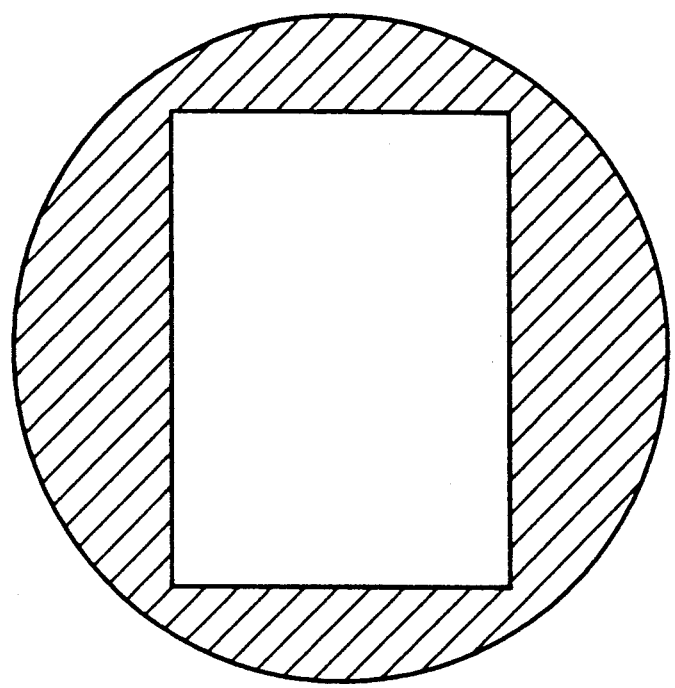
FIG. 3a, 3b, and 3c illustrates an adhesion problem that can occur with certain objects built according to an undersize style.
Figure 3B:
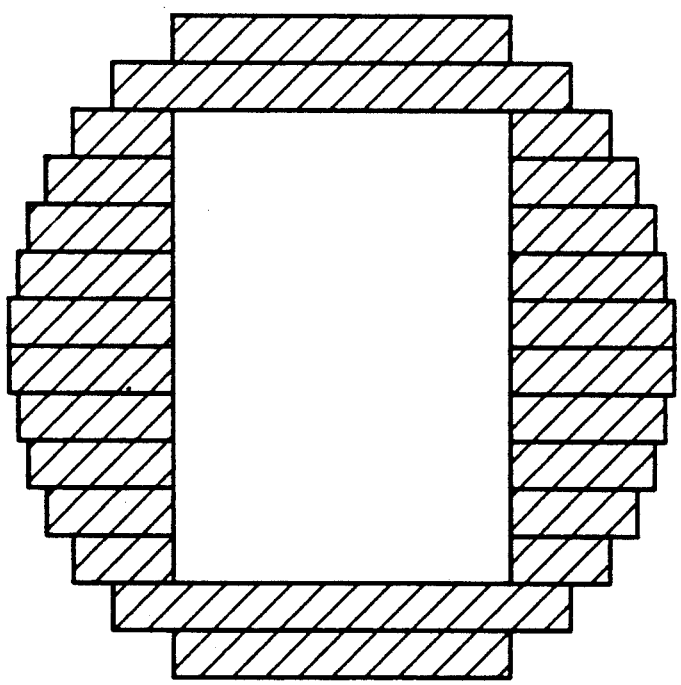
Figure 3C:
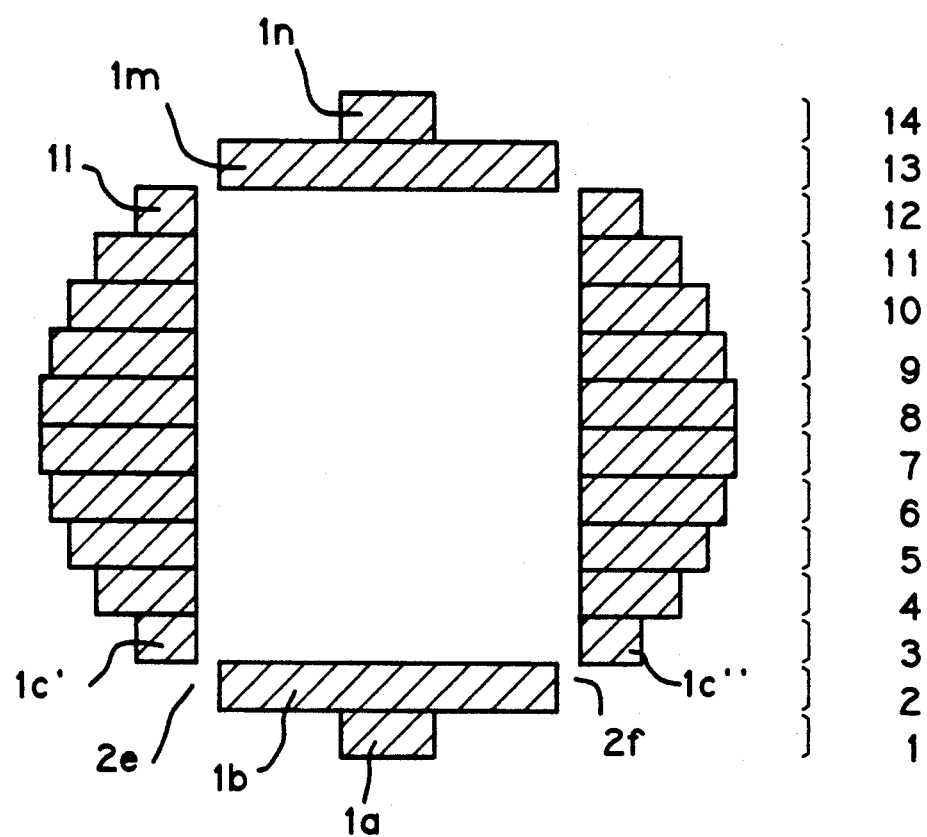
Figure 4A:
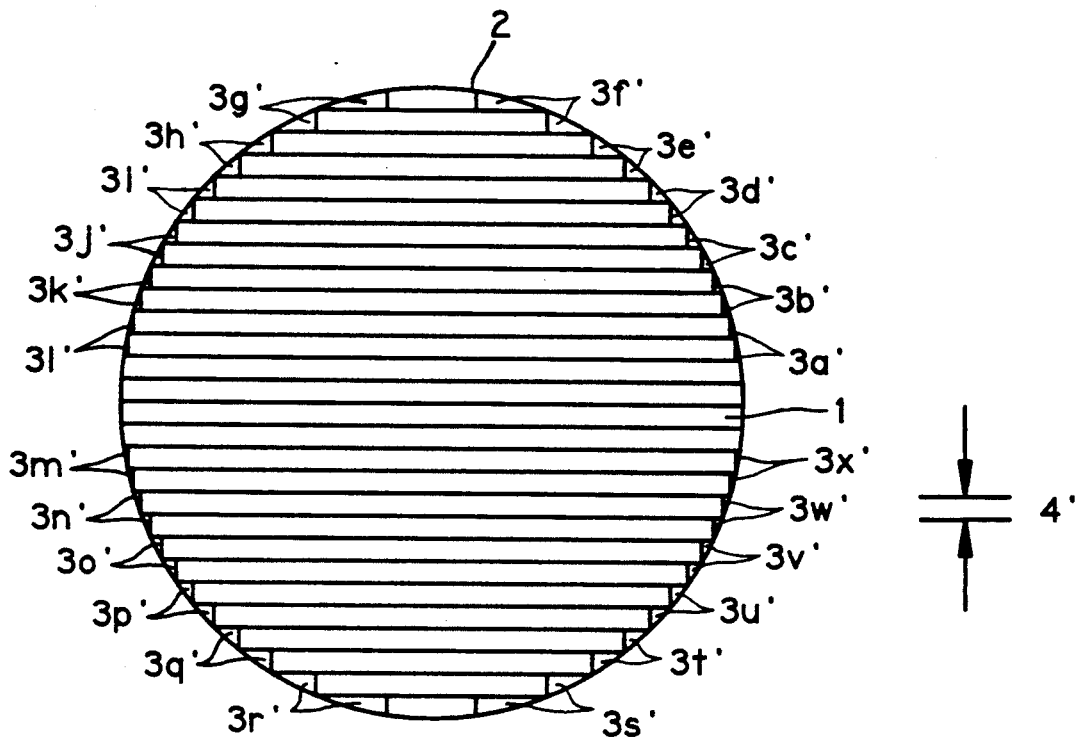
FIGS. 4a and 4b illustrate objects which correspond to the objects of FIGS. 1 and 2, respectively, except for the use of thinner layers.
Figure 4B:
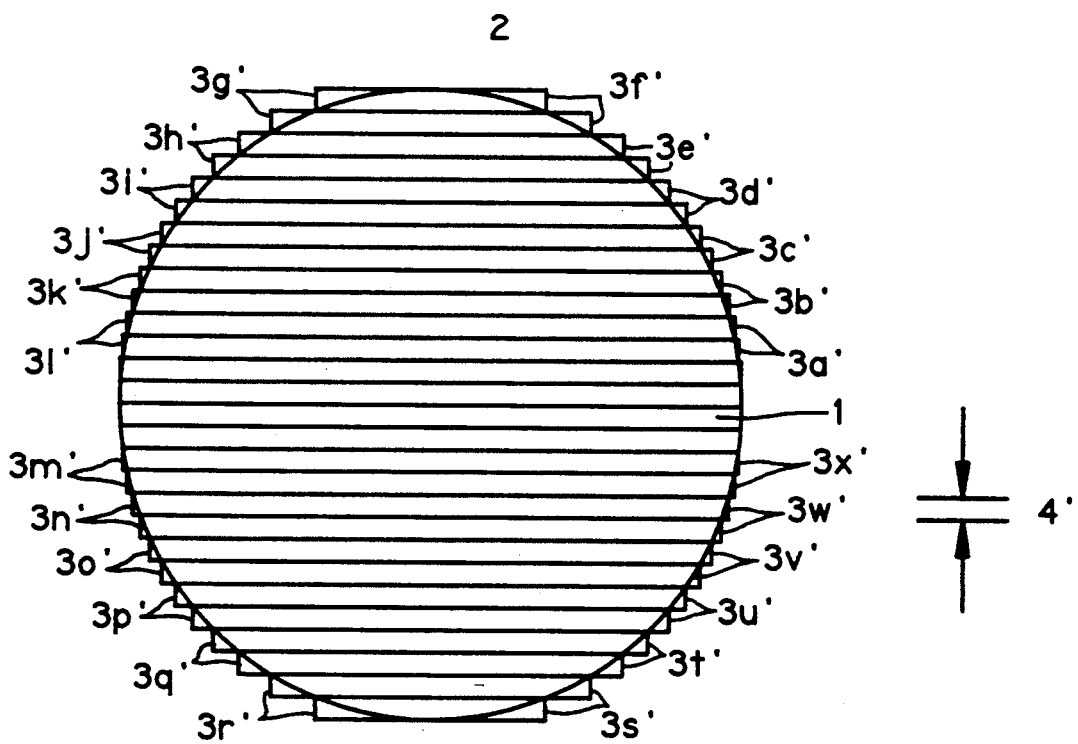
Figure 5A:
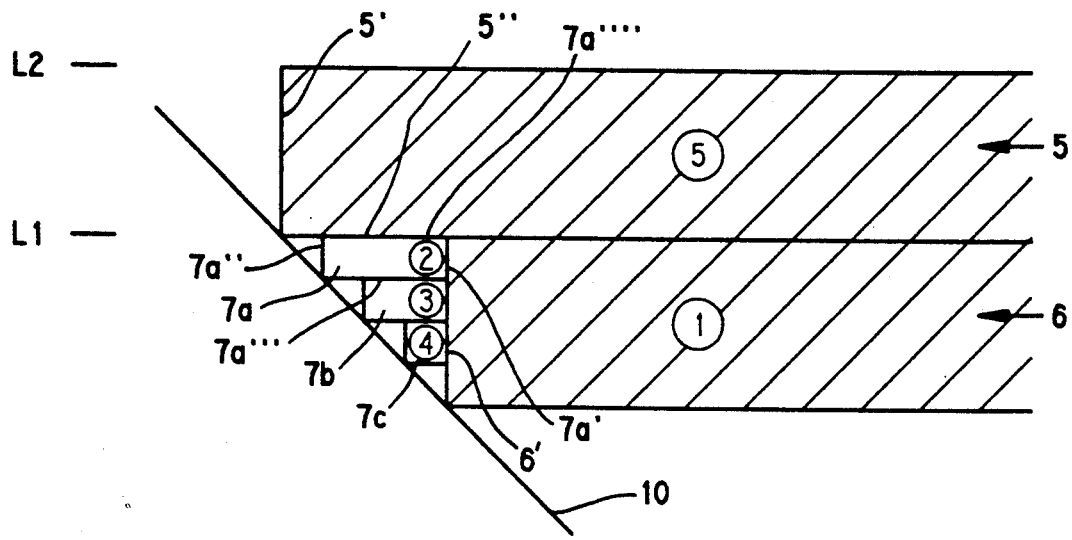
FIGS. 5a–5e illustrate various methods of filling surface discontinuities at down-facing features with fill layers.

In FIG. 5a, a first example is illustrated. In this example, structural layer 6 is formed first by selective exposure of material at a working surface to synergistic stimulation when the working surface of the material is located at level L1. According to the principles of stereolithography, the material is of the type that is flowable, and which is capable of selective physical transformation upon selective exposure to the synergistic stimulation. The material may also be incrementally absorptive of the synergistic stimulation substantially in accordance with a relationship known as Beer's Law, described in detail in U.S. patent application Ser. No. 07/339,246. According to this relationship, the intensity, $I_o$, of synergistic stimulation, at the surface of the material, will decay exponentially due to absorption by the material according to a decay constant $\alpha$, so that at a distance x into the material beyond the surface, the intensity of the synergistic stimulation, $I_x$, will be:

$$I_x = I_o e^{-\alpha x}$$

Therefore, according to Beer's Law, if the intensity at the upper surface of a layer of material having a thickness T is $I_o$, the intensity of the synergistic stimulation at the lower surface will be $I_o e^{-\alpha T}$.

This relationship also holds for exposure, which is a variable equal to the intensity of the synergistic stimulation multiplied by the time of exposure. Therefore, if $E_x$ is the exposure at a distance x beyond the surface, and $E_o$ is the exposure at the surface, these variables obey the following relationship:

$$E_x = E_o e^{-\alpha x}$$

The working surface is typically formed by placing a volume of material in a container or the like, whereupon the working surface naturally forms. Layer 6 has a thickness and the required exposure to achieve a given thickness using typical materials such as photopolymers is described in more detail in U.S. patent application Ser. No. 07/331,644, incorporated by reference previously.

Next fill layer 7a is formed lengthwise relative to the working surface, by exposure of material situated at the working surface. Also, layer 7a is formed while the working surface is at level L1. However, layer 7a is formed with a thickness less than the thickness of layer 6 by appropriately reduced exposure of material at the working surface to the synergistic stimulation. In this example, layer 7a has a first end 7a' which adheres to end 6' through the natural adhesive properties of the material upon transformation.

Layer 7a also has a second end 7a" which abuts against envelope 10 of the object representation, as shown.

Next, while the working surface is still at L1, layer 7b is formed lengthwise relative to the working surface, below the lower surface 7a''' of layer 7a, by exposing at least in part the upper surface 7a'''' of layer 7a at a sufficient exposure to expose and transform material below the lower surface 7a''' of layer 7a. As shown, upon formation, layer 7b has an upper surface which is adhered at least in part to the lower surface of layer 7a, and a first end which is adhered at least in part to the end 6' of the first structural layer, through the natural adhesive properties of the material upon transformation, as described previously. The layer also has a second end which abuts at least in part against the envelope 10.

The formation of layer 7b illustrates a significant aspect of the method of FIG. 5a, which is the formation of fill layers, such as layer 7b, below other fill layers without moving the partially-formed part relative to the working surface. This is accomplished, in part, because the material will only partially absorb synergistic stimulation (For example, the absorption characteristics being defined by Beer's Law). Therefore, untransformed material placed below both untransformed and previously-transformed material can be transformed if the exposure is great enough.

As explained in more detail in U.S. patent application Ser. No. 07/339,246, the incremental exposure required to form layer 7b can be determined by the exposure already applied to form layer 7a, and by the required thickness of layer 7b. For typical building materials which obey Beer's Law such selected photopolymers, an incremental increase in cure depth of 4 mils will require an incremental exposure about equal to the exposure already applied. Therefore, if $E_1$ is the exposure already applied to form layer 7a, and the desired thickness of layer 7b is 4 mils greater than 7a, then the incremental exposure required at the working surface to form layer 7b will be equal to $2 \times E_1$, of which ½ has already been applied. Therefore, the remaining net exposure required is $E_1$. Of course, if the desired layer thickness were 8 mils greater, then the required incremental exposure would be $3 \times E_1$. These principles are explained in U.S. patent application Ser. No. 07/339,246.

Next, layer 7c is formed lengthwise, in a similar manner to layer 7b, by transforming material situated below the lower surface of layer 7b, again while the working surface is at L1. Regarding the exposure required to form layer 7c, this will depend on the exposures already applied to form layers 7a and 7b, respectively. Denoting these values as $E_1$ and $E_2$, (where $E_2$ is the additional exposure required to form layer 7b after layer 7a has already been formed) respectively, for a typical photopolymer and a desired increase in layer thickness of 4 mils, the required incremental exposure will be $2 \times (E_1 + E_2)$, but since an exposure equal to $(E_1 + E_2)$ has already been applied, the net required additional exposure is $(E_1 + E_2)$. Of course, if the desired layer thickness were 8 mils greater, then the required additional exposure would be $3 \times (E_1 + E_2)$. Again, the thickness of layer 7c will be less than the thickness of layer 6. Also, upon formation, the upper surface of layer 7c will be adhered to the lower surface of layer 7b, and the first end of layer 7c will be adhered to the end 6' of the first structural layer, similar to the manner described previously for layers 7a and 7b. The second end of layer 7b abuts the envelope 10 in the same manner as described above with respect to layers 7a and 7b.

Note that layers 6, 7a, 7b, and 7c are all formed while the working surface remains at L1. Consequently, if the means for causing relative movement between the partially-formed part is a platform coupled to a Z-stage elevator, as described in U.S. patent application Ser. No. 07/515,479 referenced earlier, then the platform and elevator need not be moved throughout the formation of these layers.

Next, the partially formed part including the upper surfaces of layer 6 and layer 7a are lowered relative to the working surface, resulting in fresh material coating over these upper surfaces. After this material settles, a fresh layer of building material will have formed over the upper surfaces, to redefine a new working surface of the material at level L2 which is the upper surface of this fresh layer. Typically, this lowering is accomplished by down-dipping the partially formed part below the working surface by means of a platform or the like by an amount greater than the thickness of the next structural layer 5 to be formed, thereby causing an excess coating of material to flow rapidly over the upper surfaces of layers 6 and 7a, and then raising the partially-formed part by an amount which is appropriate to place the upper surfaces of layer 6 and layer 7a at a distance equal to the desired layer thickness of layer 5 below the newly defined working surface. Other relative movement means are possible, including means for adding to or extracting material from the container, or means for moving the container itself relative to the partially-formed part. In any event, any excess material is then allowed to flow off of the upper surfaces, either simply through the passage of time and the force of gravity on the material, through the application of vibrational forces as described in U.S. patent application Ser. No. 07/495,791, or by means of a doctor blade as described in U.S. patent application Ser. No. 07/515,479, or the like. The result is a faster formation of a fresh layer than if the platform were not over-dipped. In the subsequent discussion, the time to form a fresh layer of material over a previously-transformed layer will be referred to as the "recoating time," and the process of forming a first layer over a previously-transformed layer will be referred to as the "recoating process" or "recoating" step. At this point, a layer of untransformed material has been formed at the appropriate thickness in anticipation of forming layer 5. This layer is then transformed upon selective exposure of material at the redefined working surface to the synergistic stimulation. As shown, this layer has a lower surface which is adhered to the upper surfaces of fill layer 7a and structural layer 6, in the manner described previously, and an end 5' which abuts against envelope 10.

A significant advantage of this example is that layers 6, 7a, 7b, and 7c can all be formed while the working surface is located at level L1, so that there is no additional recoating time required over what would be required to form the structural layers.

On the other hand, the method may have the slight disadvantage that the thickness of the fill layers may be more difficult to control since the required exposure to form each fill layer after the first one (layer 7a in the figure) depends on the already-applied exposure used to form previous layers. For example, in FIG. 5a, the required exposure to form layer 7b depends on that already applied to form layer 7a. Therefore, any error in the exposure given to the previous layers can affect the thickness achieved for succeeding fill layers. Another disadvantage may be that the exposure used to form the first fill layer 7a (the other fill layers, 7b and 7c, are typically formed with greater exposure, as discussed previously, because of absorption by layer 7a) may be so low that it requires a speed of scanning of the beam that may exceed the speed and control limitations of the scanning system described in U.S. patent application Ser. No. 07/428,492. Therefore, to accomplish this fast scanning, a faster and more appropriate set of scanning mirrors must be used, or the intensity of the synergistic stimulation must be reduced in some manner. This in turn makes the process more difficult and costly. Another disadvantage may be that the layers 7a, 7b, and 7c may have low structural strength, at least before layer 7a has been adhered to layer 5 (adherence to layer 5 will increase the structural strength not only of layer 7a, but also of layers 7b and 7c, since these layers are adhered to layer 7a). These layers will gain more strength after they have been adhered, from above, to the next structural layer 5 that will be formed. However, before this can happen, these layers may be subjected to forces which result from down-dipping and up-dipping these layers, as described previously, in the course of coating the upper surface of layer 6 with fresh material in anticipation of forming layer 5. These fill layers may be lacking in sufficient cohesiveness or rigidity to withstand these forces before adherence to layer 5. It is noted that the exposure given to form a layer and adhere it to layer 7a and layer 6 may vary from region to region depending on whether the regions are used for adhesion or for forming a down-facing region. For example, the end of 5 near 5" forms a down-facing region and will be given an appropriate exposure to form the down-facing feature at the right position, whereas the remaining portions of layer 5 may be given greater exposure to insure adhesion.

Figure 5B:
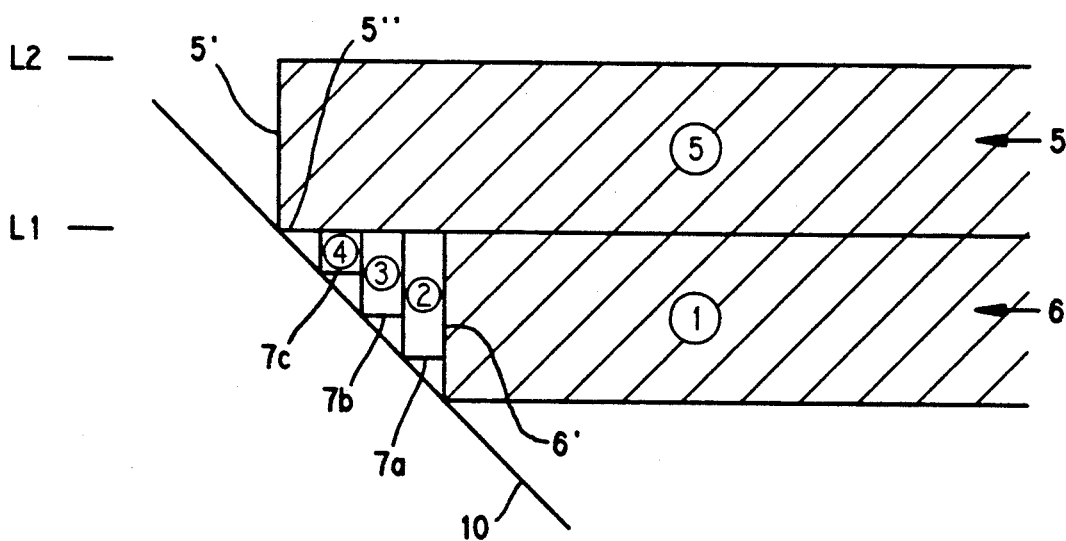

Turning now to FIG. 5b, a second example is shown which is similar to that illustrated in FIG. 5a, except that fill layers 7a, 7b, and 7c are formed edgewise, instead of lengthwise. Layer 6 is first formed while the working surface is at level L1. Next, while layer 6 remains stationary, fill layers 7a, 7b, and 7c are successively formed, edgewise as shown, and not lengthwise as in FIG. 5a, upon exposure of material at the working surface to the synergistic stimulation. Again, as with the example of FIG. 5a, all the fill layers are formed while the working surface is kept at level L1. As shown, upon formation, each fill layer has a first end level with the working surface and a second end which abuts against the object envelope 10. One of the fill layers, layer 7a in the figure, has a surface which is adhered to the end 6' of structural layer 6. The other fill layers have surfaces which are adhered to adjacent fill layers.

Each of the fill layers has a different depth. The non-uniform depths of the fill layers can be achieved by varying the exposure used to form each layer. Again, considering a material obeying Beer's Law and applying the principles discussed in U.S. patent application Ser. No. 07/339,246, if the exposure required to form layer 7c is $E_1$, and a fill layer penetrates 4 mils beyond layer 5, then for the photopolymer in the previously discussed example, the required exposure required to form layer 7b will be twice $E_1$. Of course, if the incremental increase in cure depth were 8 mils, the required exposure would be four times $E_1$. Note that the order of forming the fill layers, which is illustrated, is 7a, 7b, and followed by 7c. This is to insure that each successive layer has a solid anchoring point to attach to as it is formed, thereby insuring that the fill layers do not shift out of their appropriate position as they are formed.

After the formation of the fill layers, the first ends of the fill layers, and the upper surface of layer 6 are coated with a layer of fresh material in the manner described previously which defines a new working surface at level L2. The new working surface is defined by the upper surface of the layer of fresh material. This fresh material is then exposed to form layer 5. As shown, upon its formation, layer 5 is adhered to the first ends of the fill layers along at least a portion of extension region 5''.

The benefits of this example are similar to those discussed earlier with respect to FIG. 5a, and will not be repeated. An additional advantage of this example, however, is that layers 7a, 7b, and 7c are formed edgewise instead of lengthwise as in FIG. 5a, enabling layers 7b and 7c to be formed without requiring exposure thorough previously-formed layer 7a as in the example of FIG. 5a. Thus, any errors in the exposure level given to, and therefore depth achieved with, one fill layer will not affect the depth achieved for the other fill layers.

Figure 5C:
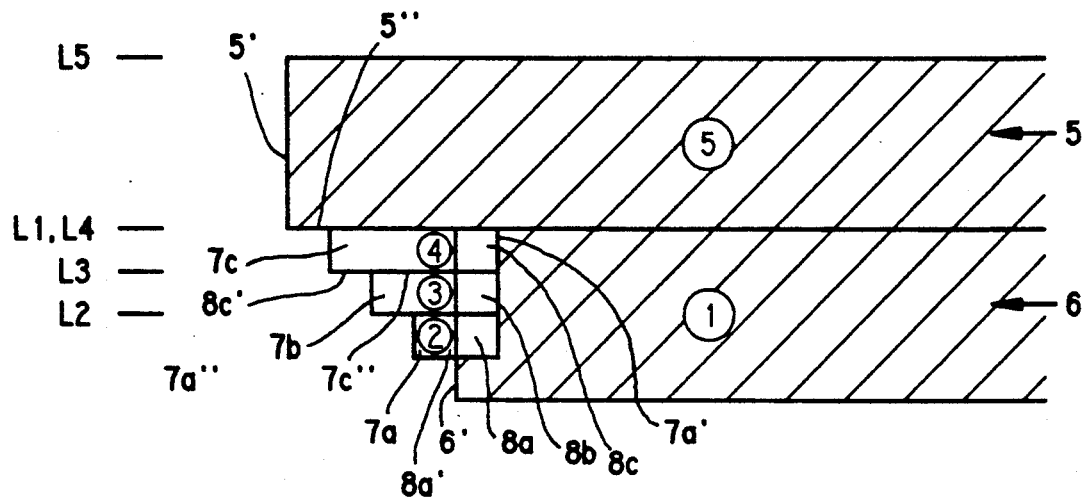

A third example which can provide greater structural strength than the examples of FIGS. 5a and 5b is shown in FIG. 5c. An important aspect of this example is the lengthwise formation of layers 7a, 7b, and 7c, and the overlapping of these layers with layer 6. The overlapping portions are referenced with numerals 8a, 8b, and 8c, respectively. Because of this overlapping, these fill layers may be somewhat stronger, and better able to withstand the forces incidental to any down and up-dipping which occurs in the coating process described previously.

The sequence of part building starts with the formation of layer 6 while the working surface is at level L1. Next, the upper surface of layer 6 is raised relative to the working surface. Therefore, the upper surface of the body of untransformed medium defines in part a new working surface at level L2. At this point, layer 7a is formed by selectively exposing material at the new working surface. The non-overlapping portion of layer 7a is formed right at the new working surface, while the overlapping portion is created by exposing the upper surface of layer 6 sufficiently so that the synergistic stimulation penetrates deeply enough to reexpose portion 8a. The partially-formed part including the upper surfaces of layers 7a and 6 are then lowered relative to the new working surface, and a layer of untransformed material forms over the upper surface of layer 7a, to define a newer working surface at level L3. At this point, layer 7b is formed in a similar manner to layer 7a except that a lower surface of layer 7b is adhered, upon formation, at least in part, to an upper surface of layer 7a. Next, the partially-formed part including the upper surfaces of layers 7b and 6 are lowered relative to the new working surface whereupon a layer of untransformed material forms over layer 7b having an upper surface which defines a newer working surface at level L4 which is coplanar with L1. At this point, layer 7c is formed by selectively exposing material at the newer working surface in the manner described previously for layers 7a and 7b. Next, the partially-formed part including upper surfaces of layers 7c and 6 are lowered relative to the newer working surface in anticipation of the formation of layer 5, whereupon a layer of untransformed material is formed over the upper surface of layers 7c and 6. The upper surface of this layer defines a newest working surface at level L5. Then, layer 5 is formed by selectively exposing material of the newest working surface, whereupon, upon formation, a lower surface of layer 5 adheres at least in part to the upper surfaces of layers 7c and 6.

It should be noted that, in general, after raising the upper surface of layer 6 relative to the working surface in anticipation of forming layer 7a, it will require some period of time for the level of building material around the part to recede to level L2. The amount of time required will depend on the specific geometry of the part and the viscosity of the building material. If the sides of the part over the last several layers are vertical or down-facing, and if the area of interest (where fill layers are needed) is not inside a trapped volume[1] or inside a nearly trapped volume, the time required for the material to decrease to the proper level will be small. However, if the area of interest is inside a trapped volume, the level will never recede to L2, and if the area of interest is inside a nearly trapped volume, the time required may be excessive. This is because a trapped volume will prevent the material from flowing away. Trapped volumes are discussed in more detail in U.S. patent application Ser. No. 515,479, previously incorporated by reference.

[1] A trapped volume is a volume of untransformed building material that is entirely circumscribed by a structure of transformed material except near the working surface.

Next layer 7a is formed as shown, overlapping layer 6 by area 8a, by selectively exposing material at the new working surface to the synergistic stimulation. The upper surface of layers 6 and 7a are then lowered relative to the new working surface of the building material to define a newer working surface at level L3. After some delay, excess building material will flow over the upper surface of layer 7a to form a layer of untransformed medium over the surface. The time required will depend on the parameters mentioned previously for level L2, and additionally, on the extent which the non-overlapping portion 8a of layer 7a extends beyond the edge 6' of layer 6. The natural adhesive properties of the material upon transformation cause the end 7a' of layer 7a to adhere to end 6' of layer 6. After the newer working surface has stabilized at level L3, layer 7b is then formed, with overlapping portion 8b. The partially formed part (and therefore, the upper to the newer working surface to define a newest working surface at level L4. Note that level L4 is identical to level L1. After a time, as discussed previously with respect to reforming the working surface at levels L2 and L3, material will flow over the upper surface of layer 7b to form a layer of untransformed material to be utilized in the formation of layer 7c. Also, generally, the time required for this formation probably cannot be eliminated by utilization of a doctor blade, or the like, since this region will typically not be accessible by a doctor blade. However, other techniques may be used, such as vibrational recoating discussed in U.S. patent application Ser. No. 495,791, incorporated by reference previously, or overdip recoating discussed previously. Next layer 7c is formed, with overlapping portion 8c, again, by exposure of material at the newest working surface to the synergistic stimulation. After layer 7c is formed, the partially-formed part including the upper surface of the layers 6 and 7c are again lowered relative to the newest working surface to define a final working surface at level L5. After a time, in the manner discussed previously, a layer of untransformed material will form above the upper surfaces of layers 7c and 6 of the desired thickness of layer 5. However, unlike the process of recoating layers 7a and 7b, the process of recoating the upper surfaces of layer 7c and layer 6 can be enhanced by the use of a doctor blade or the like, since these upper surfaces will be accessible to, and hence capable of being swept by, a doctor blade. Next, layer 5 is formed upon exposure of material at the final working surface to the synergistic stimulation. In the manner discussed previously, the lower surface of layer 5 will adhere to the upper surfaces of layers 7c and 6 through the natural adhesive properties of the material upon transformation.

An advantage of the method of this example is that the exposure of the synergistic stimulation used to form the unsupported portions of each of layers 7a, 7b, and 7c can be kept substantially constant, since those layers are being formed with a substantially uniform thickness right at the working surface. In the previous examples, on the other hand, the required penetration and therefore exposure varied from fill layer to layer. In FIG. 5a, for example, the required penetration varied even though the fill layer thickness is uniform, since, other than layer 7a, the fill layers are all being formed at variable distances below the working surface requiring a different cure depth, and therefore a different exposure for each fill layer. In FIG. 5b, although each of the fill layers are being formed right at the working surface, the required cure depth for each layer varies. In FIG. 5c, on the other hand, each fill layer is formed right at the working surface, and in addition, each layer has a uniform thickness.

An additional advantage of this example is the increased "green strength" of the supported portion of each fill layer. In this example, a fill layer will typically comprise an unsupported portion, and a supported portion which overlaps a previous fill layer. In FIG. 5c, for example, fill layer 7c comprises an unsupported portion 8c' and supported portion consisting of the portion of 7c over 7b and portion 8c. The supported portions of the fill layers will generally be given somewhat higher exposure than the unsupported regions to assure adhesion between the layers at the supported portions. For portion 8c, for example, this portion will be given an exposure during the formation of layer 6, and will be given an additional exposure during the formation of layer 7c, 7a and 7b. This can lead to further polymerization of this supported portion (when using polymerizable building material that obeys Beer's Law) without substantial increase in cure depth (since these supported portions are placed on top of already-transformed material) compared to the polymerization resulting from a single exposure of equivalent cure depth. In FIG. 5c, for example, the portion of 7c over 7b is given an exposure somewhat greater than that required to achieve a cure depth equal to the fill layer thickness since some extra cure is generally desired to assure adhesion to the previous layer 7b which causes additional polymerization of 7b over what it would be given by the previous methods. This results, on a net basis, to a similar depth of cure, but will enhance green strength compared to the single exposure.

A disadvantage of the method of this example is that the process of recoating the layers 7a, 7b, and 7c may be difficult, impossible, or simply too time-consuming, for a given part geometry. As mentioned previously, this is in part because the upper surfaces of these layers are generally inaccessible to a doctor blade. Another disadvantage may still be the relatively low structural strength of the fill layers which results from the fill layers being formed before the formation of layer 5. As a result, these layers will be subjected to the forces of recoating, e.g., those caused by the up and down-dipping, required to redefine the working surface at levels L2, L3, L4, and L5, before the upper surface of layer 7c can be adhered to the lower surface of layer 5. This factor is especially crucial here given the recoating operations that must occur (e.g., the amount of down-dipping and up-dipping required) before formation of layer 5. This disadvantage may be offset somewhat by the additional green strength that is obtainable, as discussed above, and by the overlapping of the fill layers with structural layer 6 at 8a, 8b, and 8c, which may further contribute to the structural strength of the fill layers. In fact, the contribution to the structural strength from these factors may be sufficient to withstand the bending forces which may be exerted on the fill layers during the recoating process.

Figure 5D:
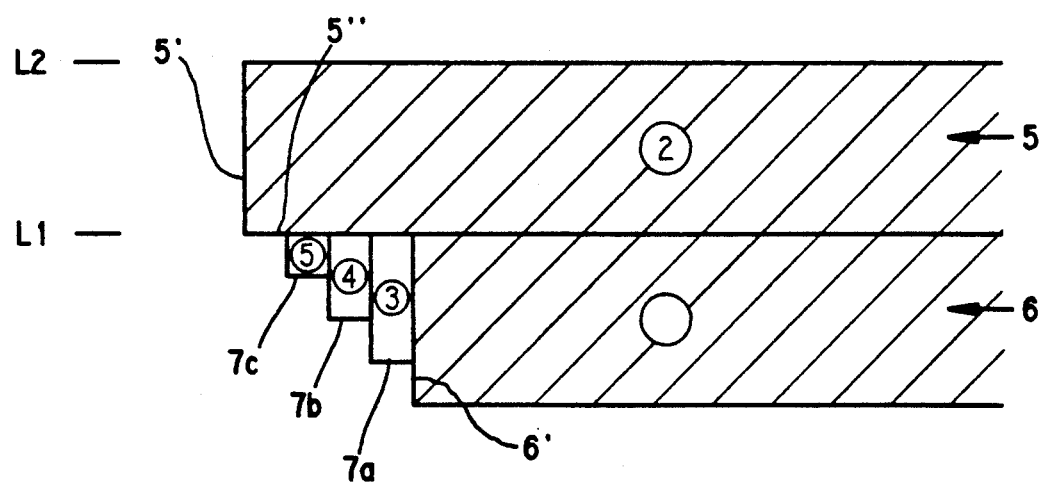

A fourth example, and most preferred embodiment of the subject invention for the filling of discontinuities at down-facing regions, is shown in FIG. 5d, which compared to the first three examples, including the example of FIG. 5c, has greater structural strength. This is because, as will be seen, layer 5 is formed before the forming of the fill layers, so that the top-most fill layer can be adhered to it before any additional recoating must occur. First, layer 6 is formed directly at the working surface, in the manner described previously, which is at level L1, and then the upper surface of this layer is lowered relative to the working surface to define a new working surface located at level L2, at which point layer 5 is formed, again in the manner described previously. Next, while the level of the working surface remains at tangent L2, which is level with the upper surface of layer 5, fill layers 7a, 7b, and 7c are formed by exposure through layer 5. These fill layers are formed edgewise, as shown, out of material below the lower surface of layer 5 (which is below the working surface) by varying the exposure of the synergistic stimulation sufficiently so that it penetrates through layer 5 and into the material below the lower surface of layer 5 (at the extension region 5") to form the fill layers. The amount of exposure required for each layer can be determined based on the cure depth and exposure required for the particular fill layer under consideration and the amount of exposure already applied to form layer 5.

As mentioned previously, an important aspect of this example is the formation of structural layer 5 before fill layers 7a, 7b, and 7c. This results in these fill layers being adhered to layer 5 as they are formed. Consequently, these layers will have greater structural strength and greater support as the rest of the part is built, compared with the previous examples. This is especially important as the fill layers may be subjected to substantial forces throughout the recoating process as discussed previously. If these layers were to be formed before the formation of structural layer 5 as per the examples of FIGS. 5a-5c, they would be relatively weak and may be easily damaged by the recoating process. This is in contrast to the examples of FIGS. 5a-5c, where the fill layers are formed before the formation of the upper structural layer. Consequently, the only adherence of the fill layers throughout the up and down-dipping preceding the formation of layer 5 is to each other, and to the edge 6' of layer 6. As a result, the fill layers are more susceptible to distortion throughout the recoating process.

Note that in this example, the order of the formation of the fill layers is to be 7a, 7b, and 7c. This is to provide additional structural strength to the fill layers in that a surface of layer 7a can be first adhered to the edge 6" of layer 6 before the other fill layers are adhered to it. If the order of formation were reversed, the ends of layers 7c and 7b would only be adhered to the extension region 5" of layer 5 before the formation of layer 7a. However, since the structural strength of layers 7b and 7c may still be sufficient to withstand the bending forces, the subject invention is intended to encompass the formation of the fill layers in any order.

Figure 5E:
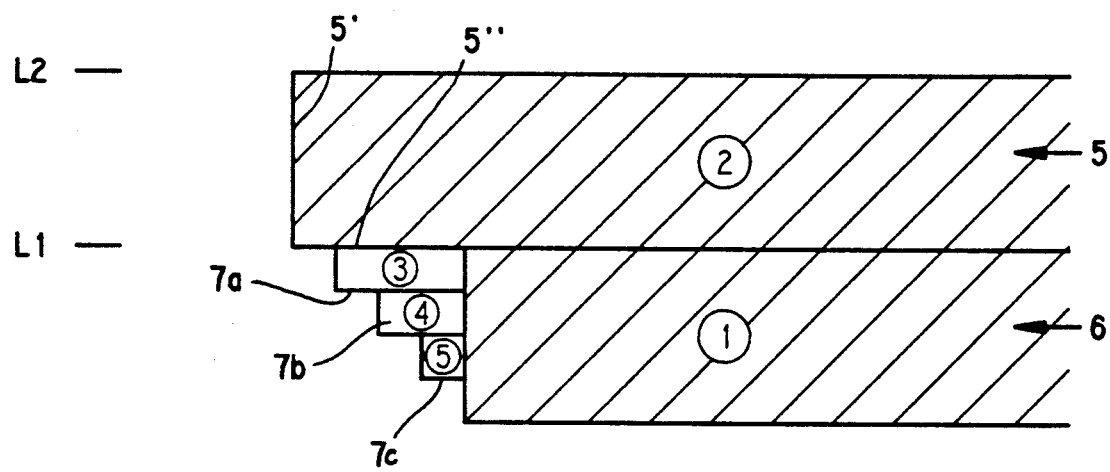

An alternative to this embodiment is shown in FIG. 5e. FIG. 5e depicts a building technique similar to that of FIG. 5d in that the fill layers are formed after the formation of layer 5, by exposure through layer 5, except that the fill layers are formed lengthwise instead of edgewise. The result is that fill layer 7a is cured by exposure through already-formed layer 5, layer 7b is cured by exposure through layers 5 and 7a, and layer 7c is cured by exposure through layers 5, 7a, and 7b. Again, in this example, the order of the formation of the fill layers is shown as 7a, 7b, and 7c.

The filling in of surface discontinuities of up-facing features will now be described.

Figure 6A:
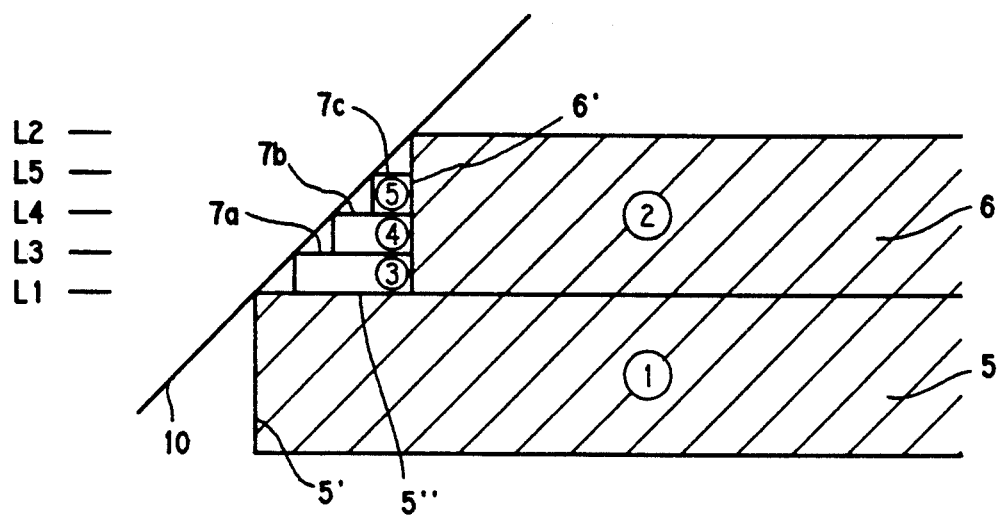
FIGS. 6a–6e illustrate various methods of filling surface discontinuities at up-facing features with fill layers.
Figure 6B:
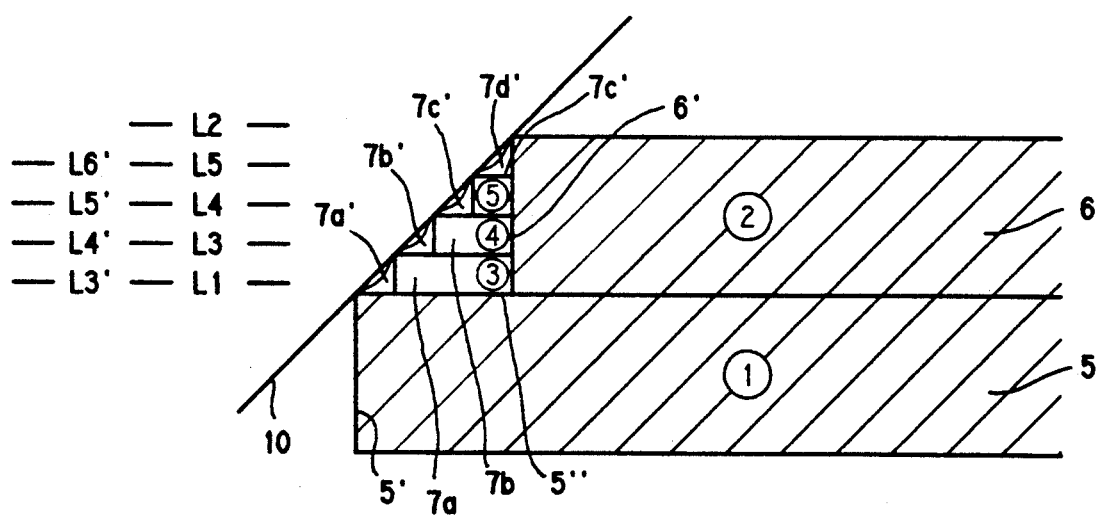
Figure 6C:
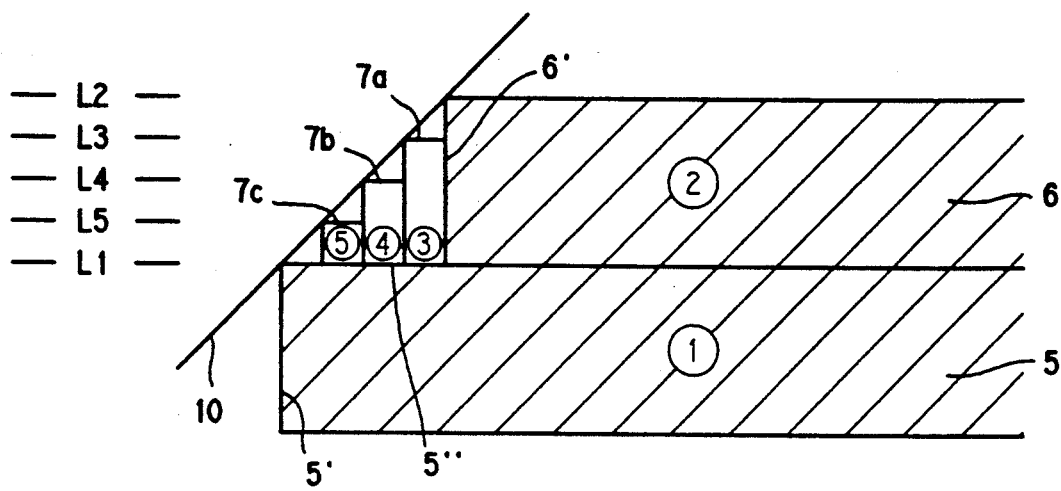
Figure 6D:
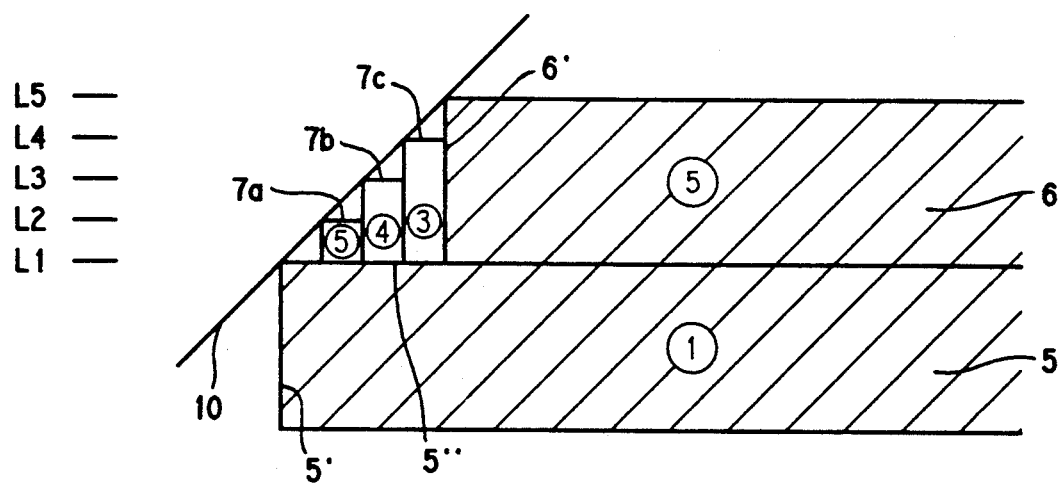
Figure 6E:
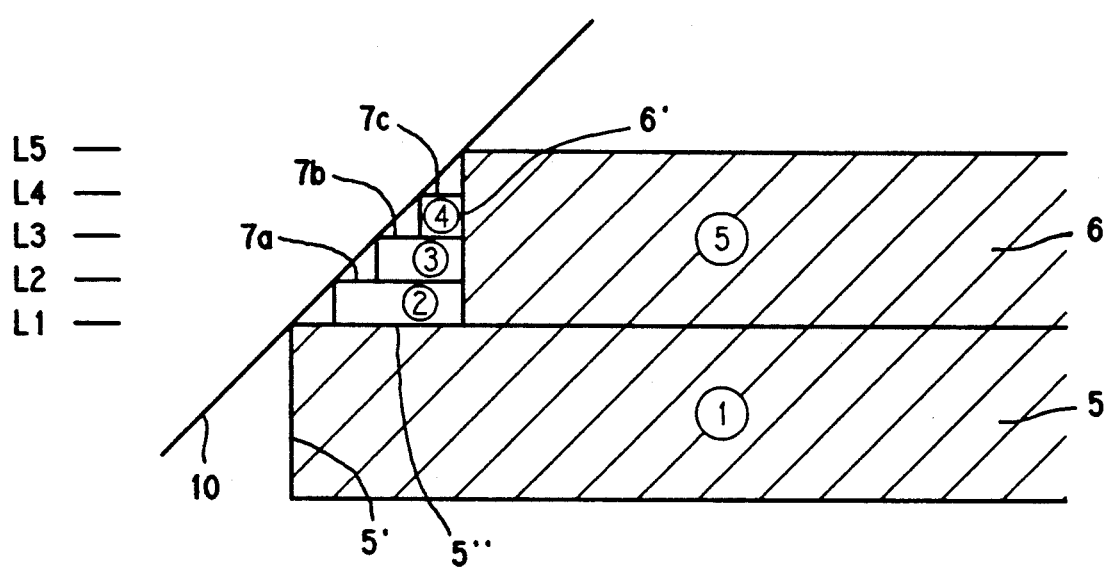

Examples of filling in surface discontinuities of up-facing features are illustrated in FIGS. 6a–6e, in which compared to FIGS. 5a–5e, like elements are referred to with like numerals. As with the down-facing embodiments, FIGS. 6d and 6e depict the most preferred embodiments. One difference, however, is that consistent with the definition of an up-facing feature, larger structural layer 5 is placed below adjacent shorter structural layer 6, instead of above it, as per FIGS. 5a–5e.

Each layer in FIGS. 6a–6e has a corresponding circled numeral, which, as with the examples of FIGS. 5a–5e, indicate the sequence in which the layers are built. As with the examples of FIGS. 5a–5e, the examples of FIGS. 6a–6e all assume that the layers are formed at or near the working surface of a building material which is flowable, such as a liquid photopolymer, solidifiable powder or the like, capable of physical transformation upon exposure to synergistic stimulation, (e.g. UV light or the like), and that the layers once formed are capable of being coated over with unsolidified material in preparation for formation of the next layer. For example, these layers may be movable through the material relative to the working surface by translation means such as a platform coupled to a Z-stage elevator. Alternatively, the working surface may be redefined by adding to or extracting material from the existing material contained in a container which defines the existing working surface. As described earlier, however, the building medium, synergistic stimulation and translation means used can all be varied, and the above is not meant to be limiting. More details about stereolithography, or using alternative flowable materials or translation means are all available in the '330 patent, and in the above-referenced patent applications previously incorporated by reference.

The first example for filling in discontinuities at up-facing features is illustrated in FIG. 6a. As shown, before the formation of the fill layers, structural layer 5 is first formed while the working surface is at level L1. Structural layer 6 is then formed which has a lower surface adhered to an upper surface of layer 5. Layer 6 is formed after the working surface has been redefined to be at level L2. In addition, the exposure used to form layer 6 need not be precisely determined, since the cure depth of layer 6 can be extended into layer 5 without sacrificing the accuracy of the part. Edge 5' of layer 5 also extends beyond edge 6' of layer 6 by extension region 5". The sequence of building the fill layers is as follows: first, the partially formed part is raised relative to the working surface such that a thinner layer of untransformed material is recoated over the extension region. At this point, the upper surface of the untransformed layer defines a new working surface at level L3.

Next layer 7a is formed, and adhered to extension segment 5" in the manner described earlier.

Note that the formation of a thinner coating of untransformed material over the extension region in anticipation of forming layer 7a may take a significant amount of time because of the viscosity of the material involved.

The partially formed part comprising layers 5, 6, and 7a is then lowered relative to the working surface at L3 so that a layer of untransformed material will form over the upper surface of layer 7a' in the manner previously described to define a new working surface which is one fill layer thickness above the upper surface of layer 7a' at level L4.

Note that any bending forces exerted on the layers by the recoating process, e.g., up and down-dipping, will not appreciably deform layer 7a, since its lower surface will be adhered to the extension region of structural layer 5 throughout this process, and should be able to withstand those forces. In addition, layer 7a can be made even stronger by overexposing it, since any increase in cure depth resulting from this exposure will mainly penetrate into the already-formed layer 5 and not harm part resolution. This additional exposure will therefore enhance adhesion between layers 7a' and 5, and will also further harden the material within the nominal layer thickness of layer 7a.

Turning back to the formation of the fill layer in FIG. 6a, after the formation of layer 7a, as already stated, the partially-formed part is lowered relative to the new working surface to define a newer working surface at level L4. At this point, layer 7b is then formed.

Finally, after the formation of layer 7b, the partially-formed part is lowered again relative to the working surface, and a layer of untransformed material is recoated over layer 7b to form a new layer of untransformed material having an upper surface which defines a newer working surface at level L5. At this point, layer 7c is formed.

As may be observed from FIG. 6b, the plurality of meniscuses which form at the ends of layers 7a, 7b, and 7c, identified as 7a', 7b', and 7c', may have the beneficial effect of smoothing the surface discontinuity more than would otherwise be the case, so that the surface formed by the meniscuses more closely matches the envelope of the corresponding object representation 10, than does the surface formed by the ends of the fill layers as shown in FIG. 6a. Therefore, it may be advantageous to form layers 7a, 7b, and 7c and/or meniscus regions 7a', 7b', and 7c' while the corresponding working surface is in transition.

FIG. 6b depicts an embodiment similar to that of FIG. 6a but where the viscosity and/or surface tension of the building material is used to advantage to form slanting end caps at the ends of the fill and structural layers in order to give a smoother surface finish than that obtained with the fill layers alone. This embodiment is practiced in several ways.

A first method of practice is to form layer 5 with the material surface at level L1, followed by the formation layer 6 with the material surface at level L2. Next, fill layer 7a is formed while the material surface is at L3. This is followed by the relative movement of the material surface to level L3'. Before the material which is adjacent to layer 7a completely recedes to level L3', this material is transformed to form meniscus region 7a'. This meniscus region gives the outer edge of layer 7a a tapered appearance and thereby reduces the discontinuity further. Next, the level is adjusted to level L4 and fill layer 7b is formed followed by an additional adjustment to level L4' and the formation of meniscus region 7b'. Similarly, fill layer 7c and meniscus region 7c' are formed with the material level adjusted to levels L5 and L5', respectively. Finally, the level is adjusted upward to at least level L2 wherein the region above 7c will be coated with material. Then, the level is readjusted to level L6' and meniscus region 7d' is transformed.

A second method of practice involves the formation of fill layers 7a simultaneously with meniscus region 7a'. Similarly, fill layer 7b and meniscus region 7b' are formed simultaneously. Also, fill layer 7c and meniscus region 7c' are formed simultaneously, followed by the formation of meniscus region 7d'. These fill layers and meniscus regions are formed with the material surface level at positions L3', L4', L5', and L6', respectively. Initially, layer 5 is formed with the material level at L1, followed by the formation of layer 6 while the material level is at L2. Next, the material level is relatively decreased to level L3' where prior to complete material recession from above extension region 5", fill layer 7a and meniscus region 7a' are transformed by exposing the receding material surface to synergistic stimulation. This exposure and transformation forms a solidified fill layer and end cap that approximates those depicted in FIG. 6b except that here, the fill layer and meniscus region together form a larger combined meniscus region. Next, the material level is raised to at least level L5' and the material is allowed to coat over region 7a and 7a'. After this coating process, the level is decreased to level L4' and fill layer 7b and region 7b' are exposed and transformed forming a second combined meniscus region. Sufficient exposure is applied to insure adhesion between 7a and 7b and 7a and 7b'. In a similar manner, the material level is raised to at least level L6' where the material is allowed to coat over 7b and 7b' after which the level is reduced to L5'. At this point, 7c and 7c' will be transformed. Finally, 7c and 7c' will be recoated with fresh material by bringing the level to at least L2', thereby allowing recoating to occur. Next, the level is reduced to level L6' and region 7d' is transformed.

The examples of FIG. 6a and 6b, while very useful for some parts, may not be completely acceptable for other part geometries. This is because these geometries may require excessively long recoating times to obtain appropriate working surfaces at levels L3, L4, and L5, before formation of each fill layer. As discussed earlier, the excessive time required results from the viscosity of the material and the corresponding time required for the formation of thin layers in anticipation of forming the fill layers, and also the inaccessibility of the areas where these layers are being informed by a doctor blade or the like. In addition, part geometries having trapped volumes will be problematic since the trapped volumes will prevent excess material from flowing off of a surface after the formation of layer 6. In FIG. 6b, for example, after the formation of layer 6, the partially-formed part is raised (e.g., up-dipped) relative to the working surface. If extension region 5" is located within a trapped volume, excess material will not flow off this region to form a layer of untransformed material of the correct thickness.

Turning to FIG. 6c, another example of filling an up-facing feature will now be described. This example seeks to speed up the recoating time for the fill layers by utilizing edgewise layers (which allow a thicker coating for the fill layers), and by reducing the areas to be recoated. In this example, a layer of untransformed material is first formed to define a working surface at level L1, and then layer 5 is formed as described above. The upper surface of layer 5 is then lowered relative to the working surface, so that a layer of untransformed material will be recoated over the upper surface layer 5 having an upper surface defining a new working surface at level L2. Here, a doctor blade can be effectively used to enhance the recoating rate since layer 6 is not yet formed. Layer 6 is then formed and adhered to layer 5 as described above. Next, the partially formed part is raised relative to the working surface to coat extension region 5" with a layer of untransformed material whose upper surface defines a newer working surface at level L3. Since the thickness of this layer is substantially larger than the thickness of the fill layer thicknesses as defined in the example of FIG. 6b, the time to recoat will be faster compared with the time required in the previous examples. Edgewise layer 7a is then formed in the manner described previously, wherein it is adhered to edge 6' and to extension region 5". As with the example described in FIG. 6b, layer 7a can be transformed prior to complete surface level relaxation to level L3 thereby forming a transformed meniscus region above fill layer 7a. Similar considerations are also conceivable for fill layers 7b and 7c also as well as for a region above 5" and adjacent to layer 7c. Next, the partially formed part is raised relative to the working surface to form a layer of untransformed material over the remainder of the extension region (other than that occupied by layer 7a), which forms a newest working surface at level L4. Then, layer 7b is formed in the manner described previously, as well as possibility a meniscus region above 7b. Finally, the partially formed part is raised relative to the new working surface, to define a newest working surface at level L5, and to coat the remainder of the extension region (other than that occupied by layers 7a and 7b) with a layer of untransformed material. Layer 7c is then formed. If this embodiment were to be combined with meniscus transformation, discussed previously, the surface level would be decreased to L1, and then prior to complete leveling, the meniscus next to 7c would be transformed.

Note that this example illustrates forming the fill layers in the order 7a, 7b, and 7c. This order was chosen for its structural strength compared to other orders, as well as its benefits for faster recoating. Since layer 7a will be formed first and adhered to edge 6' before the other fill layers, thereby providing greater support to layers 7b and 7c after they have been adhered to layer 7a. However, other orders such as 7c, 7b, and 7a may provide the necessary structural strength, and not be too slow in terms of recoating times, and are therefore meant to be encompassed.

This example improves on the examples of FIGS. 6a and 6b, since the edgewise formation of layers may significantly decrease the recoating time, although it may not completely solve the problems of these earlier examples. For example, excessive recoating time might still be a factor here since a doctor blade is still not available to speed up the recoating time of the fill layers 7a, 7b, and 7c. In addition, this example still require that the area being filled not be within a trapped volume.

A next, and most preferred example for filling discontinuities at up-facing features, is illustrated in FIG. 6d. This example is most preferred, since, unlike the previous examples, the required coatings can be obtained regardless of part geometry, and additionally, a doctor blade or the like can be used to speed up the recoating for the fill layers since this example ensures that the upper surface of a previously solidified layer will never block movement of the doctor blade across the working surface as per the previous examples. In the example of FIG. 6d, layer 5 is formed as described earlier while the working surface is at level L1, and then edgewise layers 7a, 7b, and 7c are successively formed in the order indicated, while the partially formed part is increasingly lowered, and the working surface is progressively redefined at levels L2, L3, and L4, respectively. Lastly, after the partially formed part has been lowered again to define the working surface at level L5, layer 6 is formed.

A next example, and another most preferred method of filling up-facing discontinuities is depicted in FIG. 6e. In this example, layer 5 is formed while the working surface is located at position L1. The uppermost surface of layer 5 is then lowered relative to the working surface, such that the new working surface is formed at level L2. Fill layer 7a is then formed situated lengthwise as shown. The partially formed part is then lowered relative to the new working surface so that the working surface is repositioned relative to the part at level L3. Fill layer 7b is then formed. The partially formed part is then lowered again relative to the new working surface, so that the level of the new working surface is repositioned at L4 to form a newest working surface. At this point, layer 7c is formed. Finally, the partially formed part is lowered once again relative to the newest working surface to reposition the working surface to level L5. At this point, layer 6 is formed.

In the example of FIG. 6e, the fill layers 7a, 7b, and 7c are formed lengthwise. In the example of FIG. 6d, the edgewise formation of the fill layers may allow somewhat faster recoating of the fill layers since the upper surfaces of each edgewise fill layer is narrower than the upper surfaces of the lengthwise fill layers of FIG. 6e, and may therefore offer less resistance to the flow of excess material off of these surfaces. On the other hand, the example of FIG. 6e may offer somewhat stronger fill layers since they are horizontally longer.

Comparing the FIG. 6 examples with the FIG. 5 examples, it is noted that the proper fill layer thicknesses for filling discontinuities at down-facing features are typically obtained by appropriate exposure control, instead of successive movement of the partially-formed part relative to the working surface, while the appropriate fill layer thicknesses for filling discontinuities at up-facing features are typically obtained by successively moving the partially-formed part relative to the working surface to obtain appropriate coating thicknesses.

Additionally, since the down-facing fill layers may lack sufficient strength to withstand the forces they may experience during the building process, especially the forces they could experience prior to the formation of layer 5, in the most preferred embodiments of forming down-facing fill layers, illustrated in FIGS. 5d and 5e, the fill layers are formed by exposing through layer 5 and varying the exposure appropriately for each fill layer, with the result that these layers can be adhered to layer 5 throughout the building process, thereby improving their structural strength.

For up-facing features, on the other hand, exposure is typically not necessarily varied from fill layer to fill layer. Instead, the formation of each fill layer requires a repositioning of the working surface as part of the recoating process which precedes the formation of each fill layer, so that each fill layer can be formed from material at the working surface. Since these recoating processes must be done in a reliable and speedy manner, the most preferred embodiments illustrated in FIGS. 6d and 6e for forming up-facing fill layers utilize a formation order for the fill and structural layers that allow recoating assistance (such as from a doctor blade or the like) during the recoating process which precedes the formation of each fill layer. This is accomplished by forming the fill layers before the formation of the structural layer 6, since this structural layer could impede movement of the doctor blade. In the examples of FIGS. 5d and 5e, on the other hand, it was important to form structural layer 5 before the formation of the fill layers so that these fill layers could be adhered to layer 5 for needed structural strength. In the examples of FIGS. 6d and 6e, on the other hand, sufficient structural strength can be achieved by applying extra exposure to increase polymerization or simply by adherence of the fill layers to the extension region 5" and to each other. This is partially because the downward movement of the fill layers in these examples will be shielded by the presence of layer 5, and therefore, the bending forces exerted on these layers will be less than in the examples of FIGS. 5d and 5e, where the fill layers are not shielded by a lower structural layer.

It is noted that in the previous figures, only three (3) fill layers per structural layer were illustrated for each example. In a given situation, however, the number of fill layers per structural layer can be any number from one upward. Therefore, the examples are not intended to be limiting regarding the number of fill layers.

Figure 7A:
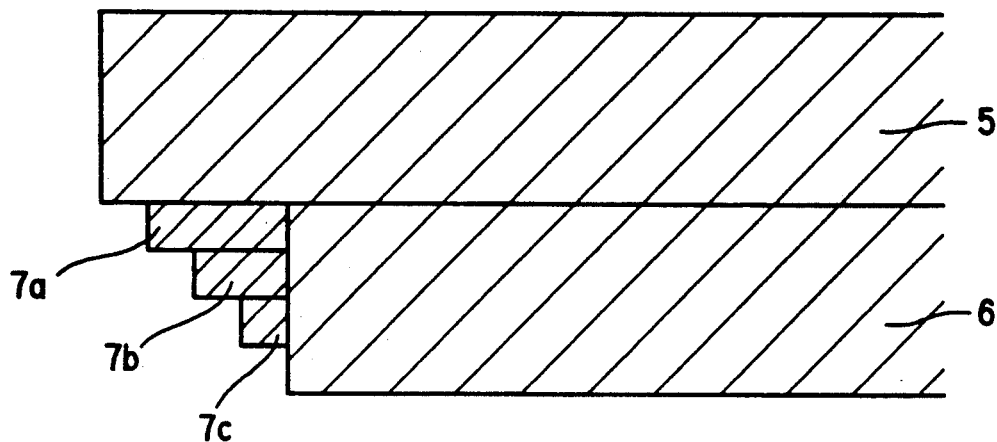
FIGS. 7a and 7b compares the surface resolution obtainable by two different fill layer thicknesses.
Figure 7B:
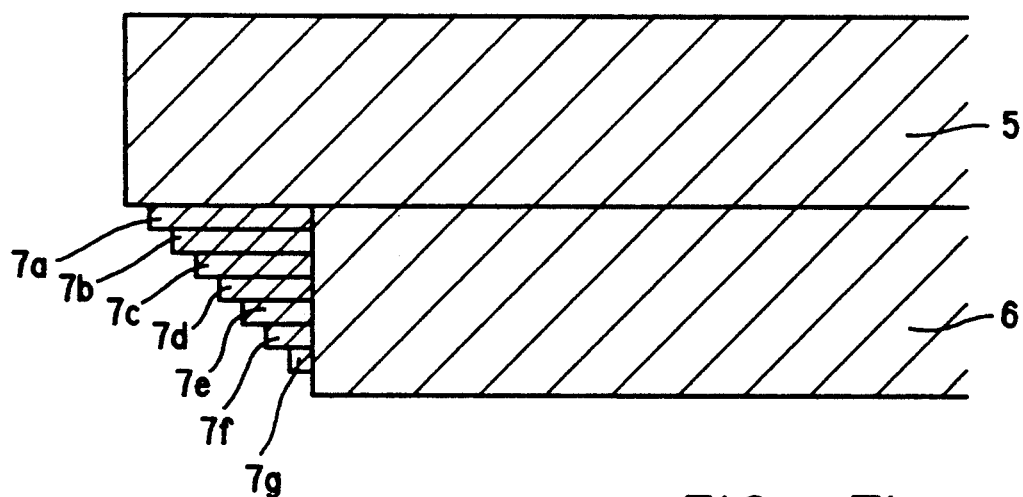

The particular examples of FIGS. 5a-5e show fill layers having a thickness which is about ¼ the thickness of the structural layers, i.e., if the structural layer thickness were 20 mils then the fill layer thickness would be 5 mils. The relative thicknesses determine the number of fill layers preferably needed to reduce the surface discontinuity. In the examples shown in the figures, it would take three 5 mil fill layers to fill a discontinuity when using 20 mil structural layers. The net result of adding these fill layers is an object having 20 mil structural layers built with a surface discontinuity which is characteristic of an object built with 5 mil structural layers. Of course, other ratios of fill layer thicknesses to structural layer thicknesses are possible, and the illustrated examples are not meant to be limiting with respect to this ratio. For example, if the ratio were ½, i.e., if the fill layers thickness were to be one-half the structural layer thicknesses, then there would be one fill layer for each structural layer. For a 20 mil structural layer thickness, for example, the use of fill layers in accordance with this ratio would result in a surface resolution substantially equivalent to that of a part built with 10 mil layers. On the other hand, if the structural layer thickness were 5 mils, then a ratio of ½ would result in a surface resolution characteristic of a part built with 2.5 mil layers. These concepts are depicted in FIGS. 7a and 7b. FIG. 7a depicts a side view of two structural layers 5 and 6 and three fill layers 7a, 7b, and 7c that are used to reduce the discontinuity between the structural layers. FIG. 7a depicts a ratio of fill layer thickness to structural layer thickness of ¼. FIG. 7b depicts a side view of two structural layers 5 and 6 and seven fill layers 7a, 7b, 7c, 7d, 7e, 7f, and 7g that are used to reduce the discontinuity between the structural layers. FIG. 7b depicts a ratio of fill layer thickness to structural layer thickness of ⅛. Comparing FIGS. 7a and 7b, it can be seen for a given structural layer thickness, a smaller ratio leads to higher surface resolution, i.e., a surface which deviates less from the corresponding object representation.

In addition to the relative thicknesses of the structural and fill layers, the degree to which the end of the first structural layer extends beyond the end of the second structural layer (which defines the extension region 5") is also a variable. In general, the length of the extension region will depend on the angle that the envelope (or envelope surface normal) of the object representation forms with the vertical direction at the location of interest on the object, and the thickness of the structural layers. The length of the extension region, in turn, helps determine the length and width of the fill layers. Since the angle between the surface normal of the object representation and the vertical will vary from region to region within a given cross-section and from cross-section to cross-section as an object is formed, the length and width of the fill layers required at each region will also vary.

Figure 8A:
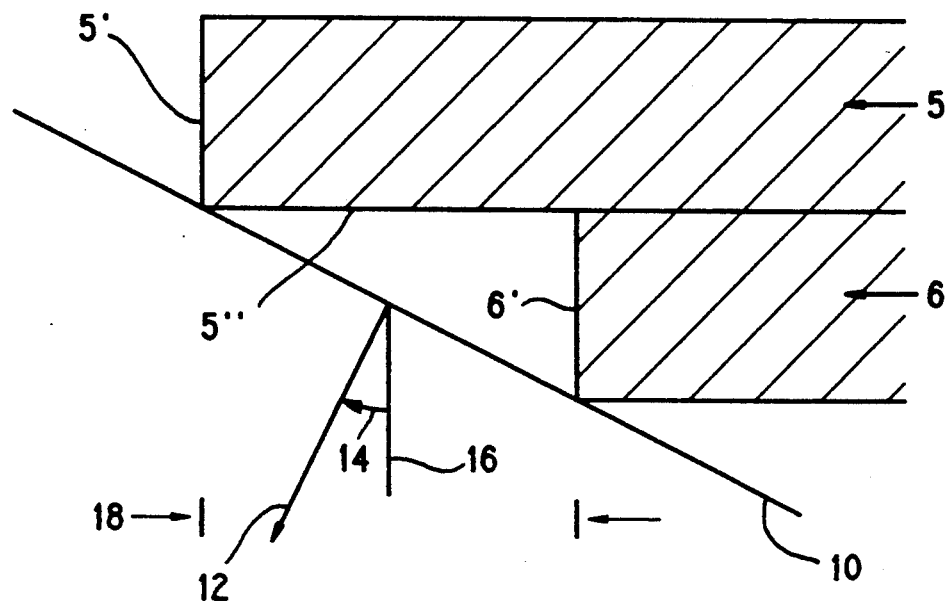
FIGS. 8a and 8b illustrate that the length of the extension region between two structural layers depends on the angle that the object representation makes with the vertical dimension at the point of interest.
Figure 8B:
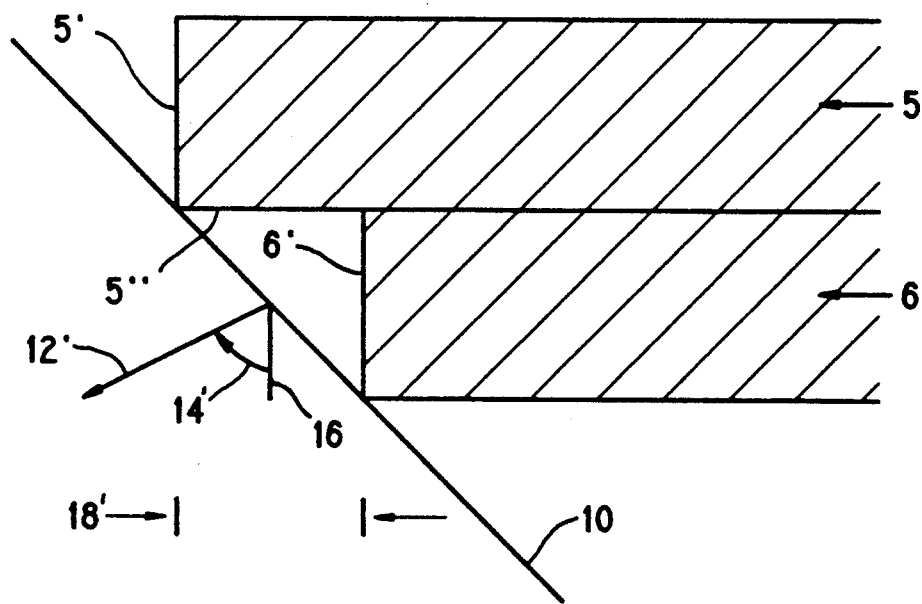

These concepts are illustrated in FIGS. 8a and 8b. FIG. 8a depicts two structural layers 5 and 6 and object representation envelope 10. A normal 12 to the object representation envelope 10 at the particular region of interest is also depicted. This normal forms an angle 14 to the vertical dimension 16. FIG. 8a also depicts the length 18 of the extension region 5" which extends between the ends, 5' and 6' of the two structural layers.

FIG. 8b depicts two similar structural layers 5 and 6 and object representation envelope 10. It also depicts a normal 12' to the object representation envelope 10, and angle 14' between the normal 12' and the vertical direction 16. FIG. 8b also depicts the length 18' of the extension region which extends between the ends 5' and 6' of the two structural layers. By comparing angles 14 and 14' and lengths 18 and 18' between these two figures, it can be seen that the lengths 18 and 18' are related to the angles 14 and 14'. Specifically, the greater the angle between the normal and the vertical, the smaller the length of the extension segment. FIGS. 8a and 8b illustrate the application of this rule to down-facing features, but the same rule applies in the case of up-facing features.

In sum, a variable length of the extension region is common.

Figure 9A:
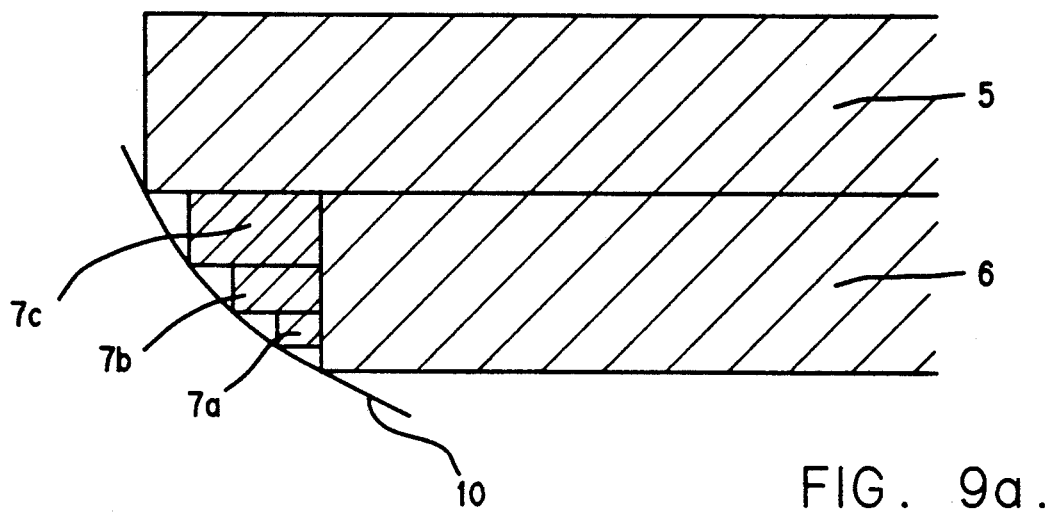
FIGS. 9a, 9b, and 9c depict various non-uniform filling techniques that may be used for filling in surface discontinuities.
Figure 9B:
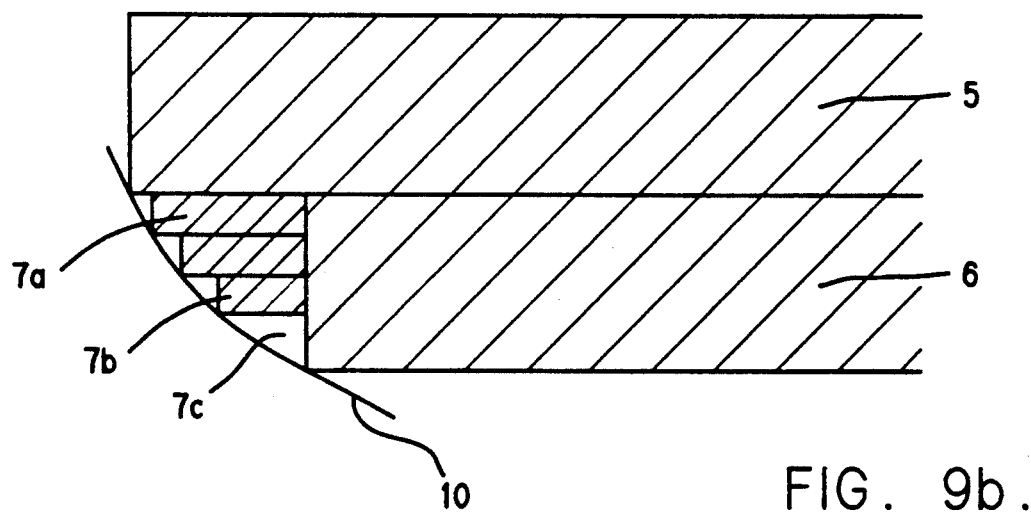
Figure 9C:
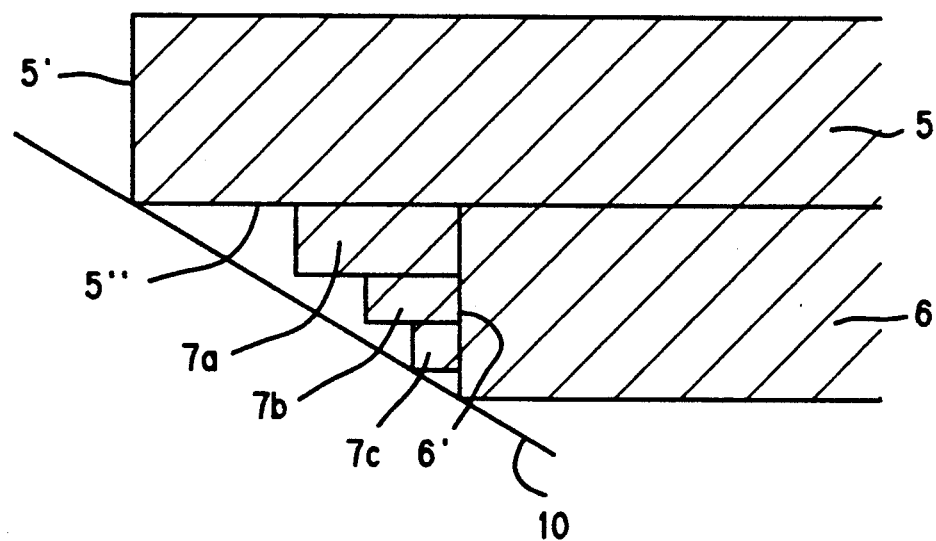

Also, the lengthwise fill layers depicted in the examples are shown having uniform thicknesses, and the edgewise layers are shown as having a uniform width. In addition, the extent to which a fill layer extends beyond an adjacent, lower fill layer ("overhang length") is also shown to be constant. Under some circumstances, it will be advantageous to deviate from those uniform sizes. These circumstances include situations where the envelope does not linearly connect the two structural layers which bound the surface discontinuity at issue, or situations where non-uniform spacing may enhance buildability with only a slight sacrifice in part accuracy. Such situations are depicted in FIGS. 9a, 9b, and 9c, which show the benefits of a non-uniform layer thickness and overhang length. FIGS. 9a and 9b depict situations where two structural layers 5 and 6 are connected by nonlinear object representation envelope 10. FIG. 9a depicts a situation where the overhang length for the fill layers is maintained constant, but the thickness of the fill layers 7a, 7b, and 7c is varied in order to compensate for the non-linearity of the envelope 10. FIG. 9b depicts the situation where the thickness of the fill layers 7a, 7b, and 7c is maintained constant, and the non-linearity of the envelope 10 is compensated for by using non-uniform overhang lengths for the fill layers. FIG. 9c depicts a situation where two structural layers 5 and 6 are connected linearly by object representation envelope 10, but where the fill layers 7a, 7b, and 7c still are built with either non-uniform thicknesses or overhang lengths.

Regarding this later example, it can be seen from FIG. 9c that the extent of the discontinuity bounded by structural layers 5 and 6, and by object representation envelope 10, is greatly reduced by inclusion of the fill layers even though the fill layers do not uniformly and fully fill the discontinuity to the extent possible if uniform thickness or overhang lengths were to be employed, for example. This example recognizes, however, that non-uniform fill layer thicknesses or overhang lengths may still be necessary, notwithstanding this slight sacrifice in accuracy, in those instances where a discontinuity at a down-facing region is being filled, where the fill layers are formed prior to forming layer 5, or where the length of the extension region 5" extending between the ends 5' and 6' of the structural layers at issue is long. In these instances, especially when the building material being used cannot form adequately cohesive unsupported fill layers which are as thin or as long as required to completely fill the discontinuity, the thickness of the fill layers may have to be increased, or the length of the lengthwise fill layers may have to be decreased, in order to form fill layers which have sufficient structural strength to withstand the bending forces exerted on them before the formation of layer 5.

Figure 10A:
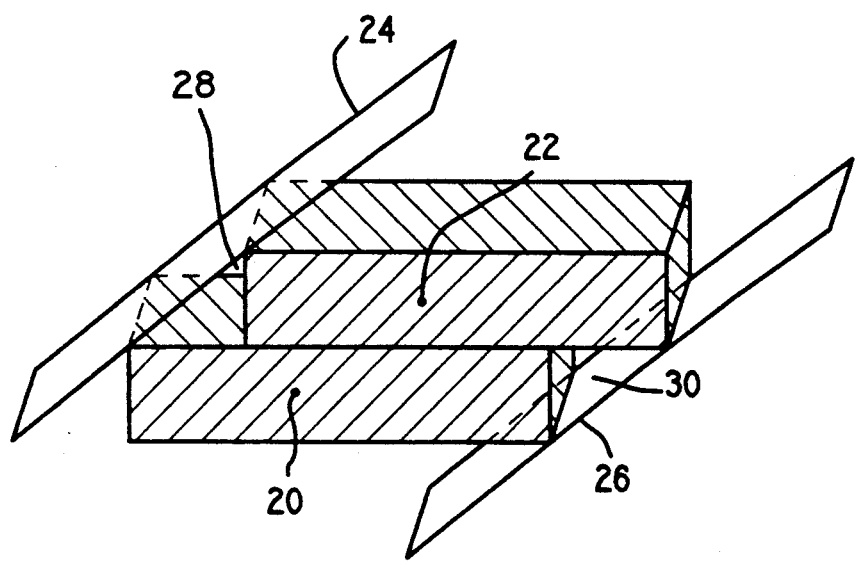
FIGS. 10a, 10b, and 10c provide a three-dimensional illustration of the fill layers of the subject invention.
Figure 10B:
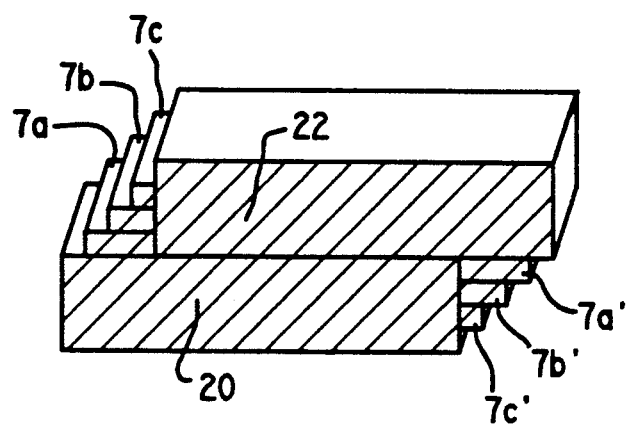
Figure 10C:
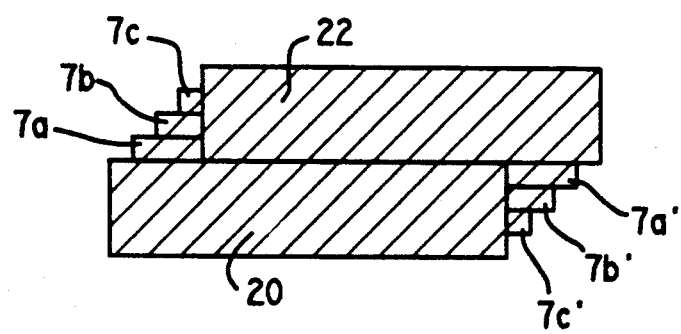

Turning now to in FIGS. 10a, 10b, and 10c, these figures depict two structural layers 20 and 22, which, compared to the earlier figures, are shown intersecting the envelope of the object representation at more than one region. FIG. 10a, for example, depicts two regions 24 and 26 of the envelope of the object representation which intersect the layers. Therefore, these structural layers, in general, define more than one surface discontinuity. In FIG. 10a, for example, portion 24 of the envelope bounds discontinuity 28, which is located at an up-facing feature of the object, while portion 26 of the envelope bounds discontinuity 30 which is located at a down-facing feature of the object. It should be recognized that, according to the teachings of the instant invention, both of these discontinuities could be filled in by fill layers. FIG. 10b depicts the discontinuity 28 being filled by lengthwise fill layers 7a, 7b, and 7c. It also depicts discontinuity 30 being filled by lengthwise fill layers 7a, 7b, and 7c. FIG. 10c depicts the object of FIG. 10b as seen in two dimensions, whereas the illustrations of FIGS. 10a and 10b provide a three-dimensional perspective.

The particular examples shown here are all with respect to the formation of a three-dimensional object at or near the working surface of a flowable building material, such as a liquid photopolymer or the like, capable of selective physical transformation upon selective exposure to synergistic stimulation. Other examples are possible, where the building materials used are thermoplastics, sinterable powders, bindable powders, or preformed films of dry film photoresist, or the like, all showing the common characteristic of being capable of physical transformation upon exposure to a synergistic stimulation. Various forms of synergistic stimulation can be used with these various materials, other than UV radiation from a laser, including $CO_2$ or other infrared lasers, other various forms of electromagnetic radiation or particle beams, or by dispensing various chemical reactors such as binders or polymerization initiators. These various forms of synergistic stimulation may be dispensed by controlled motion of focused spots of radiation, by flood exposure or spraying through a mask or the like, or by ink jet printers or the like. Various photo-reactive reactions can take place to physically transform the material and form the object, including optical, thermal or ablative reactions. In addition, means for adhering the layers together, other than by use of natural adhesive properties of a material itself upon transformation, including application of pressure or heat sensitive adhesives, and the like, are possible.

The examples are described in terms of building up layers one on top of the other so that the object builds up in the vertical dimension, but other orientations of layer to layer build-up are possible such as forming the part where successive layers are underneath previous layers or where successive layers are placed beside previous layers. In this latter instance, the object will build-up in a horizontal dimension. Additionally, it is appreciated that one may desire to reduce surface discontinuities for aesthetic appeal without necessarily increasing accuracy of the produced part. For example, it is appreciated that one may apply the techniques of the present invention to an over-sized building style, whereby surface discontinuities are reduced compared to a desired object envelope which is larger than the envelope of the object representation, even though this will reduce the overall accuracy of the part compared to the envelope of the object representation. Therefore, the examples shown here are not meant to be limiting, and the subject invention is intended to encompass smoothing out an object relative to a desired object envelope which may be different from an envelope of an object representation. In addition, each of the examples shown prescribe a particular order of building the fill layers in order to maximize particular formation characteristics, but it will be appreciated that other orders of formation are possible which emphasize other formation characteristics.

Figure 11A:
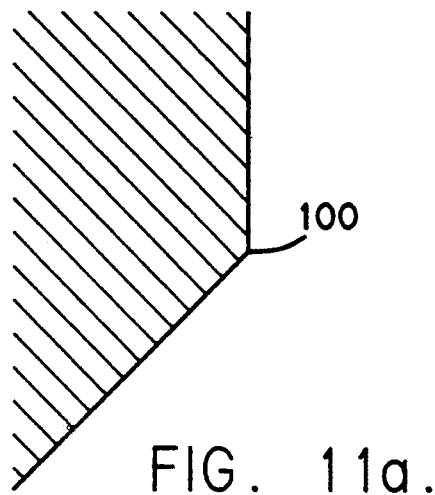
FIGS. 11a–11j depict several possible transition regions for a slanted down-facing region.
Figure 11B:
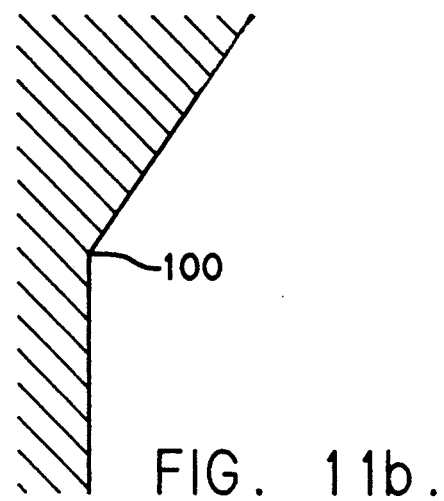
Figure 11C:
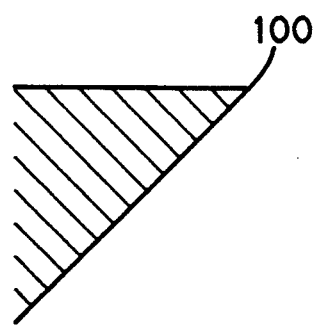
Figure 11D:
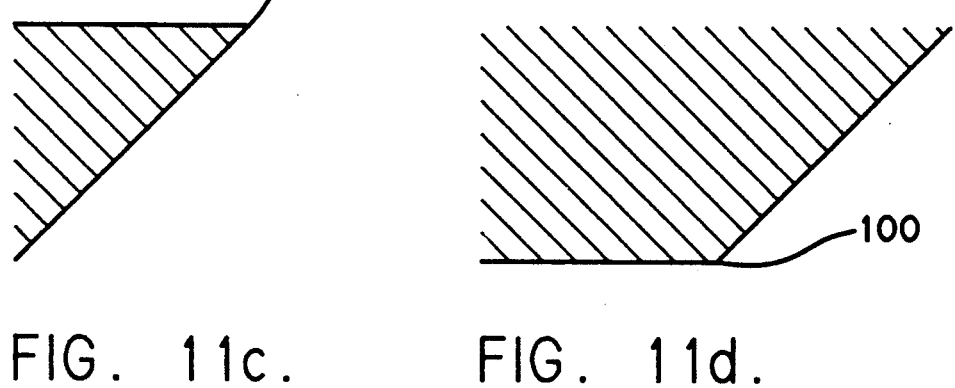
Figure 11E:
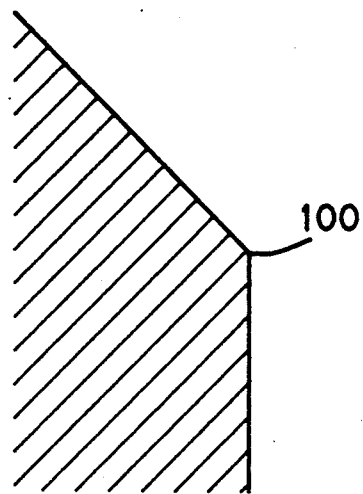
Figure 11F:
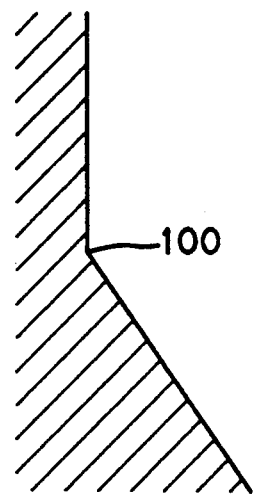
Figure 11G:
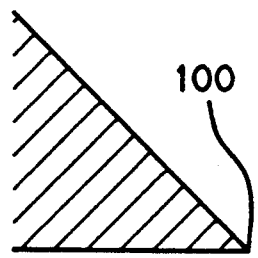
Figure 11H:
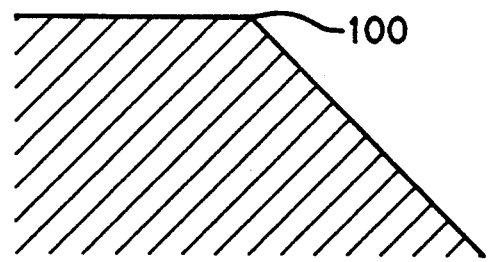
Figure 11I:
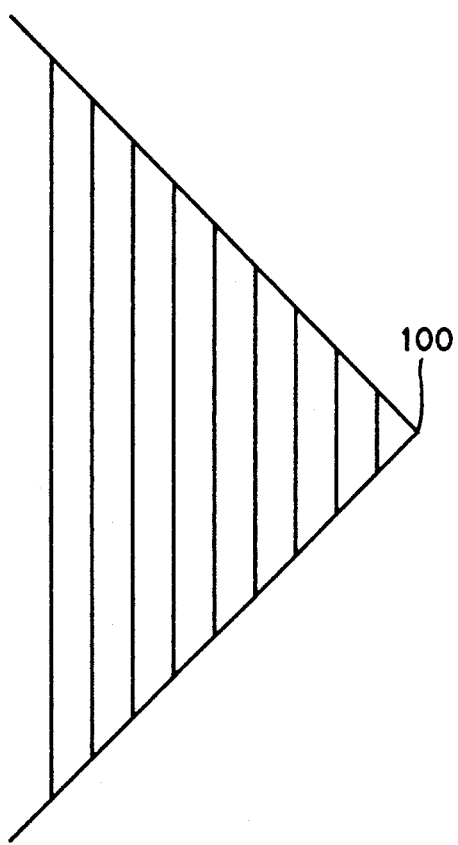
Figure 11J:
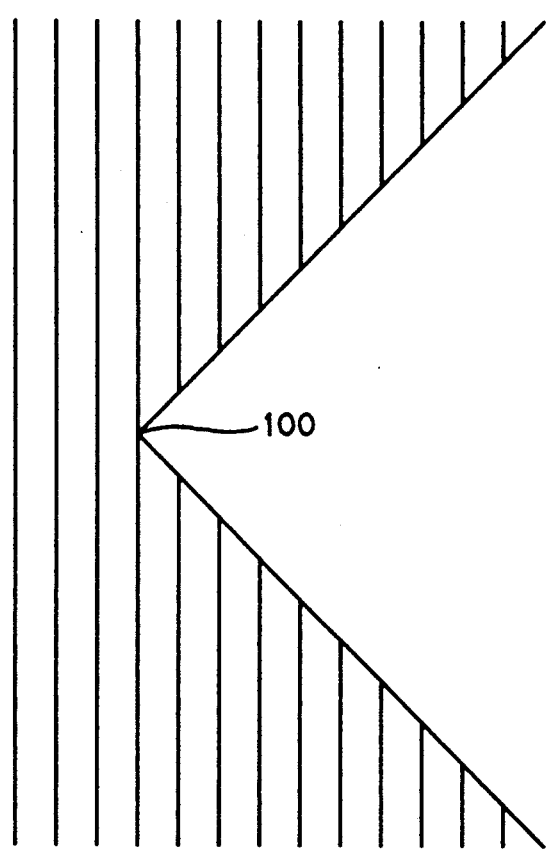

The discussion up to this point has emphasized various methods of forming fill layers in sloped up-facing or down-facing regions without regard to transition regions. A viable method of discontinuity reduction must also consider problems associated with and methods for dealing with various transition regions. Transition regions are those regions where an up or down-facing slanted region meets a vertical, a flat, or an oppositely slanted region. Several such transition regions are depicted in FIGS. 11a–11i. FIGS. 11a–11d depict several possible transition regions 100 for a slanted down-facing region. FIGS. 11e–11h depict several possible transition regions 100 for a slanted up-facing region. FIGS. 11i and 11j depict a couple of the possible transition regions 100 that may occur when an up-facing and a down-facing slanted region meet. FIG. 11a depicts a transition from a down-facing slanted feature to a vertical feature. FIG. 11b depicts the opposite transition: a transition from a vertical feature to a down-facing slanted feature. FIGS. 11c and 11d depict another pair of transitions: transitions between slanted down-facing features to horizontal features. FIGS. 11e–11h depict a corresponding set of transitions but pertaining to slanted up-facing features and FIGS. 11i and 11j depict a pair of complementary transitions between up-facing and down-facing slanting features.

Figure 12A:
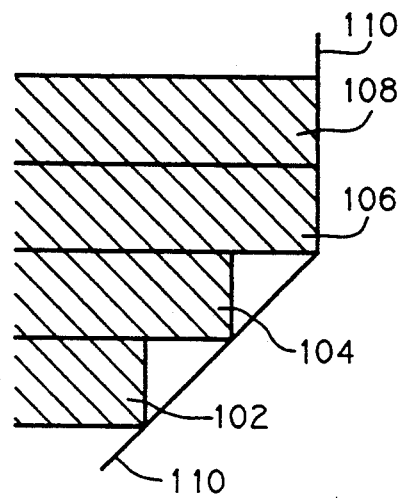
FIGS. 12a–12d depict the transition regions of FIG. 11a as reproduced in the three-dimensional object.

FIG. 12a depicts the transition region of FIG. 11a as reproduced using a traditional undersized building technique. This figure depicts the formation of the region by four structural layers 102, 104, 106, and 108. Also depicted is line 110 that represents the envelope of the computer generated object. Each structural layer ends flush against the object envelope 110 or only abuts against the envelope at one point and otherwise stops within a region that would be solidified if an exact reproduction were made. Thus, an undersized part is formed.

Figure 12C:
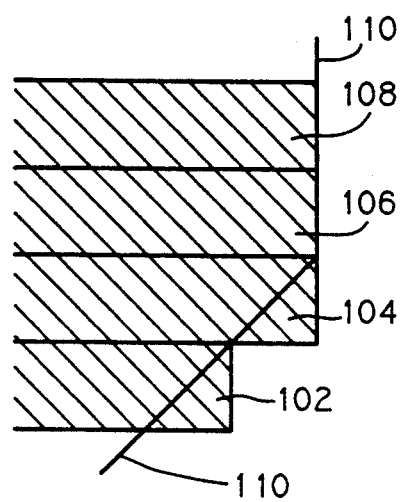
Figure 12B:
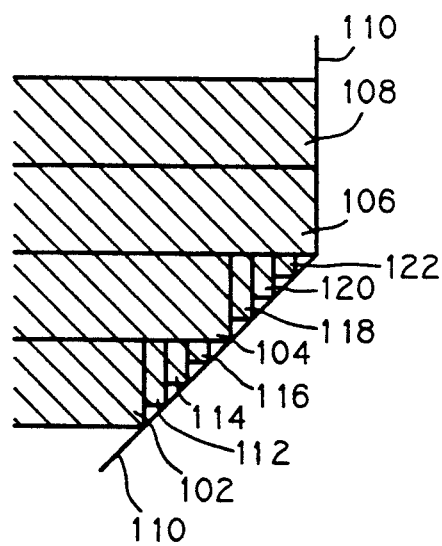

FIG. 12b depicts the same transition region and structural layers as FIG. 12a, except that FIG. 12b additionally depicts down-facing fill layers 112, 114, and 116 that occur within a continuing down-facing slanted region and therefore can be formed according to one of the preferred methods depicted in FIGS. 5d or 5e. This figure additionally depicts fill layers 118, 120, and 122 which are directly below the transition region. In FIG. 12b, it can be seen that these fill layers can be formed with the methods of FIG. 5d or 5e since it is guaranteed that there will be a structural layer over the region of these fill layers that can be exposed through.

Figure 12D:
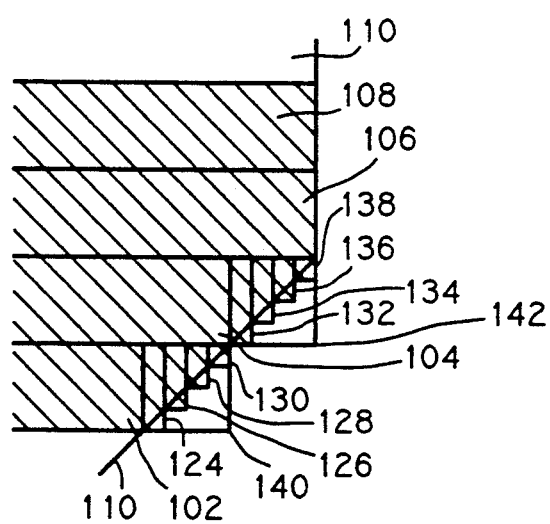

FIG. 12c depicts the same transition region as did FIGS. 12a and 12b but this time the object, and therefore transition region, is formed using an oversized building style. Like elements of FIG. 12c and FIG. 12a are labeled with like reference numerals. FIG. 12d represents one selection of a pattern of fill layers to create a slightly oversized object. It is noted that the oversized portion of the object is reduced by using the fill layers and that there are in effect 4 fill layers per structural layer wherein one of the fill layers has ¼ the thickness of the corresponding structural layer. These fill layers are labeled as 124, 126, 128, 130, 132, 134, 136, and 138. Lines 140 and 142 represent the outline of the oversized object as it would be formed without the fill layers. Fill layers 124, 126, 128, and 130 can be formed using one of the preferred methods discussed previously. Additionally, as with FIG. 12b, it can be seen that fill layers 132, 134, 136, and 138, which are associated with the lower transition layer 104, can also be formed by one of the preferred methods since the structural portion of the upper transition layer 106 extends out to the end of the shallowest fill layer 138. It is noted that the difference between the oversized and undersized formation is that the oversized formation requires 1 additional fill layer and somewhat more extended fill layers; alternatively worded, the oversized method requires the same number of fill layers with each fill layer being extended by 1 level, including the fill layer that originally had zero extent. Therefore, for this transition region, it can be concluded that the preferred methods of forming fill layers can be used successfully for either oversized or undersized object formation.

FIGS. 13a, 13b, 13c and 13d depict identical structures as that of FIGS. 12a, 12b, 12c, and 12d except they are instead based on the transition region of FIG. 11b.

Figure 13A:
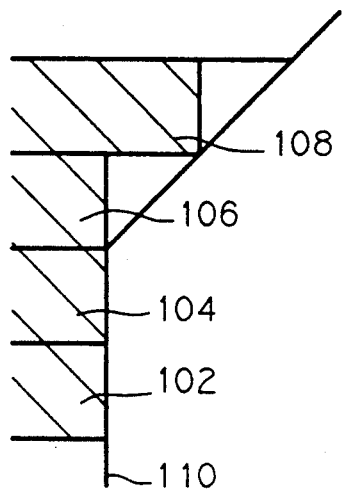
FIGS. 13a–13d depict the transition region of FIG. 11b as reproduced in the three-dimensional object.
Figure 13C:
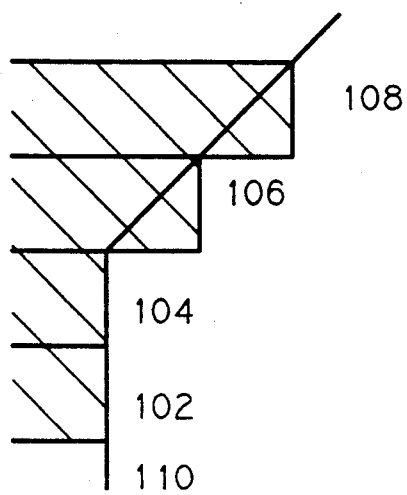
Figure 13B:
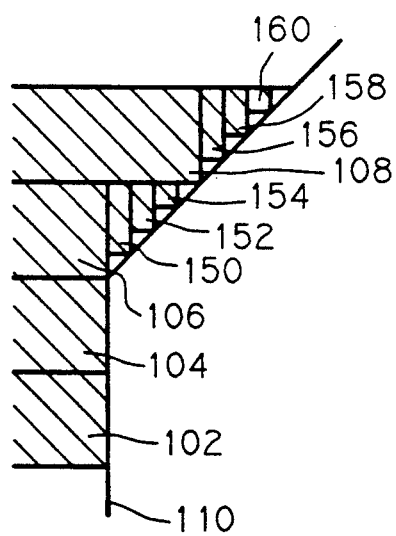
Figure 13D:
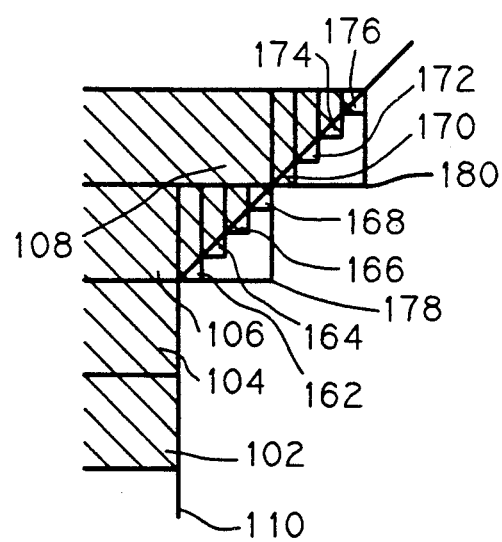
Figure 14A:
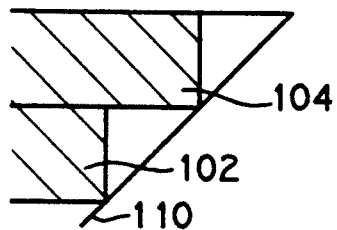
FIGS. 14a–14d depict the transition region of FIG. 11c as reproduced in the three-dimensional object.
Figure 14C:
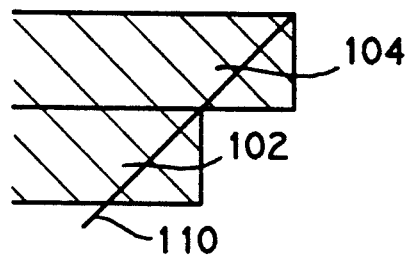
Figure 14B:
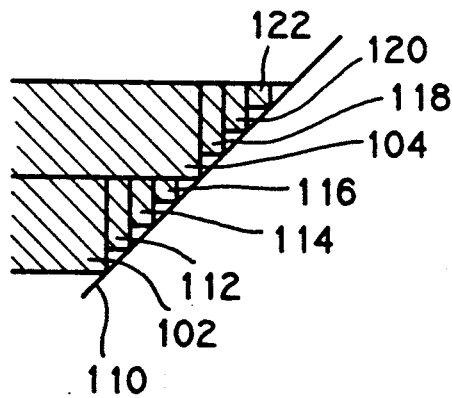
Figure 14D:
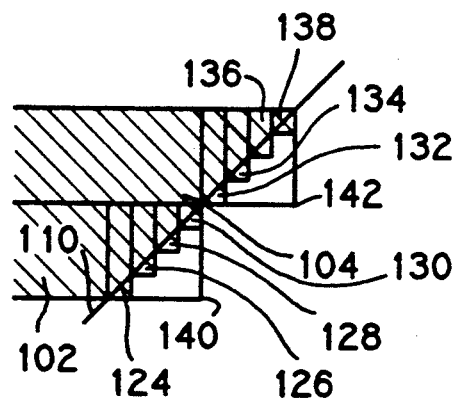
Figure 15A:
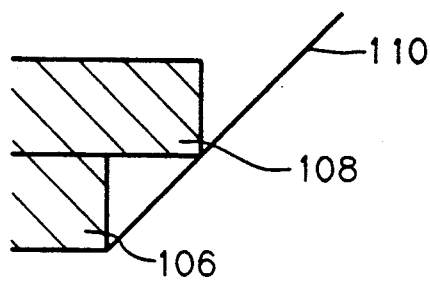
FIGS. 15a–15d depict the transition region of FIG. 11d as reproduced in the three-dimensional object.
Figure 15C:
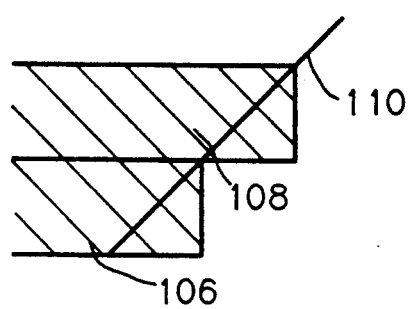
Figure 15B:
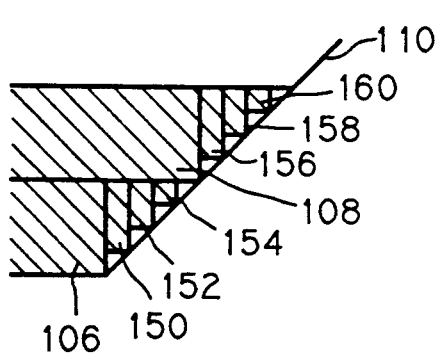
Figure 15D:
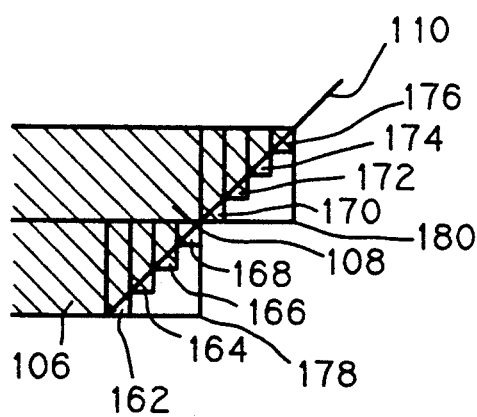
Figure 16A:
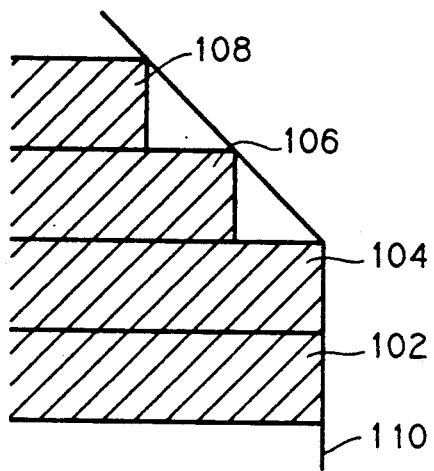
FIGS. 16a–16d are counterparts to FIGS. 12–15, but for up-facing slanted surfaces instead of for down-facing slanted surfaces.
Figure 16B:
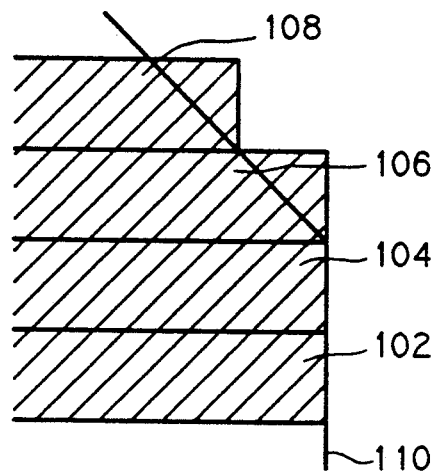
Figure 16C:
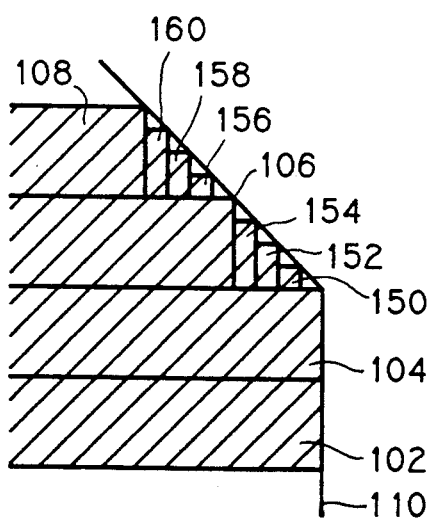
Figure 16D:
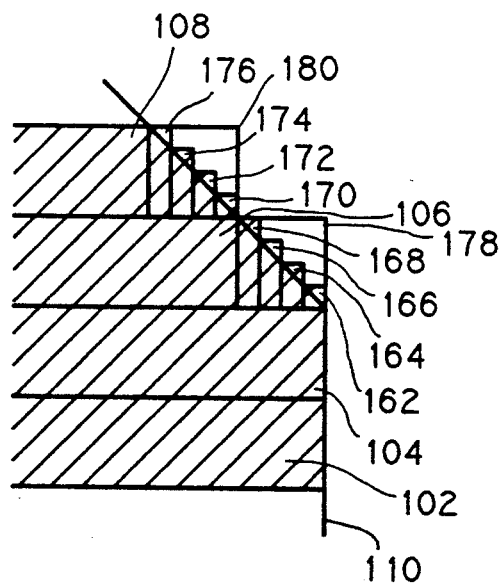
Figure 17A:
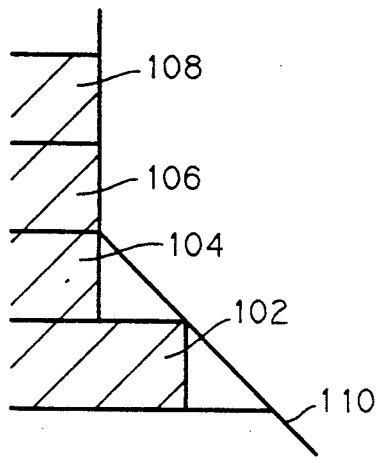
Figure 17C:
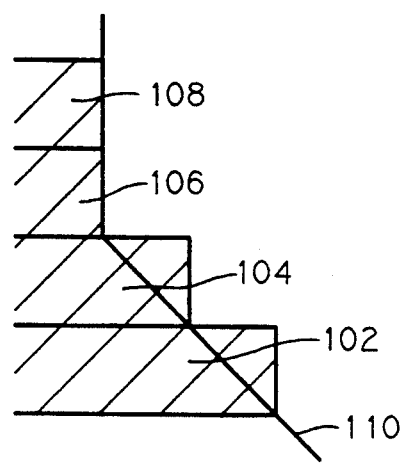
Figure 17B:
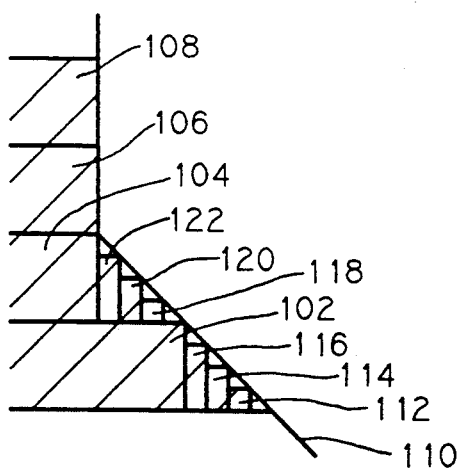
Figure 17D:
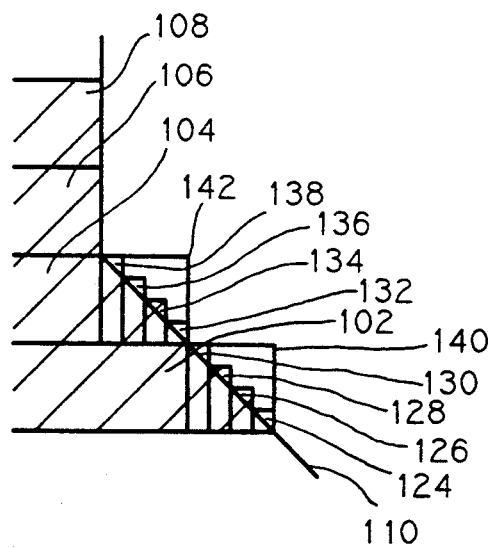
Figure 18A:
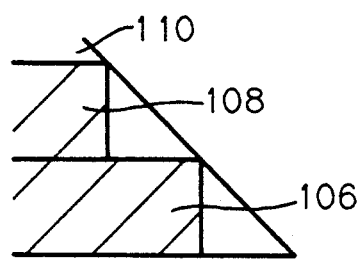
Figure 18C:
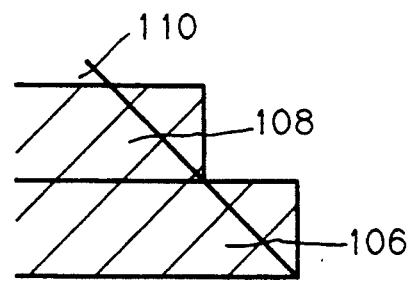
Figure 18B:
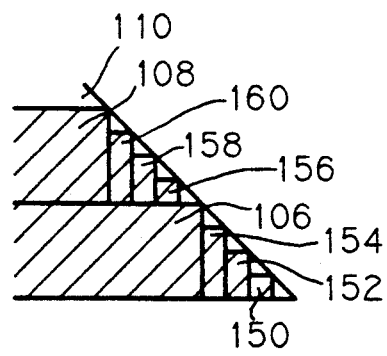
Figure 18D:
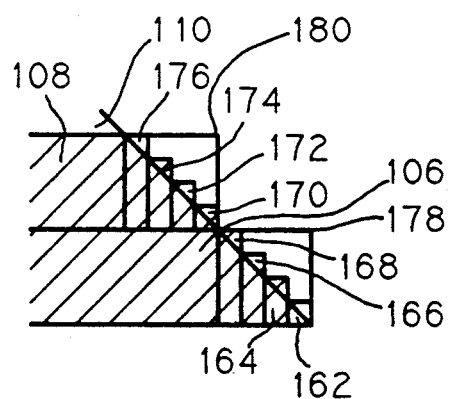
Figure 19A:
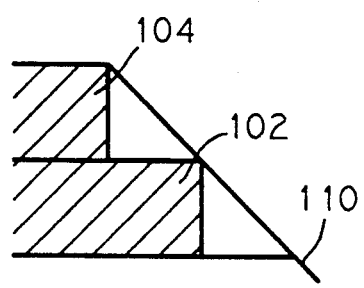
Figure 19C:
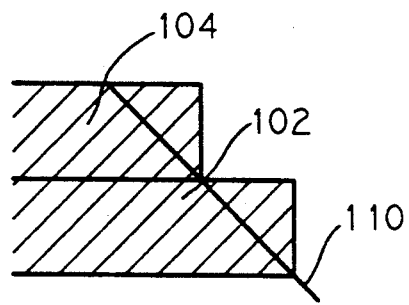
Figure 19B:
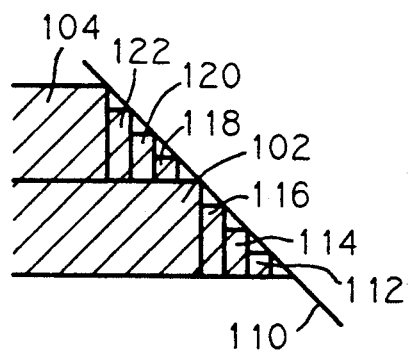
Figure 19D:
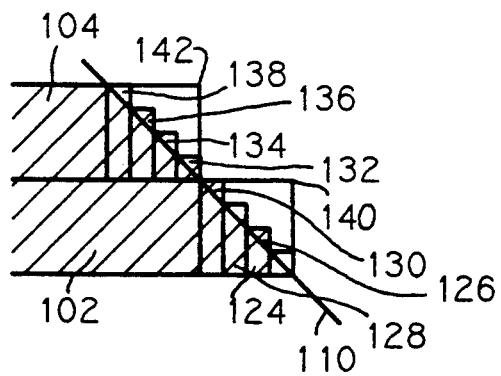
Figure 20A:
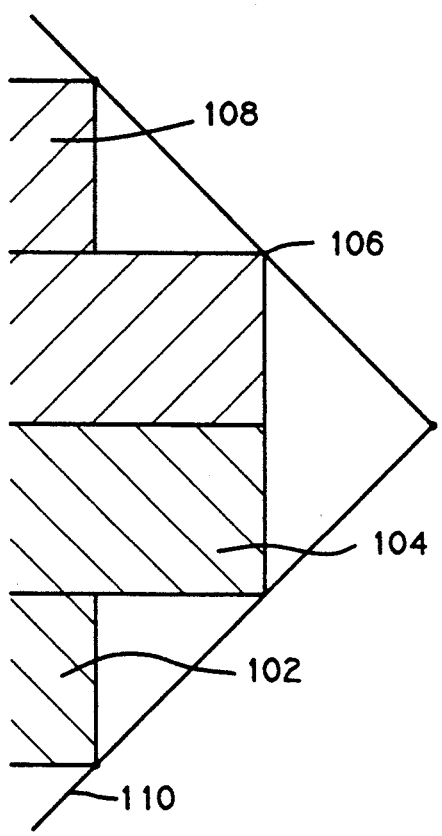
FIGS. 20a–20d depict the transition region of FIG. 11i as reproduced in the three-dimensional object.
Figure 20C:
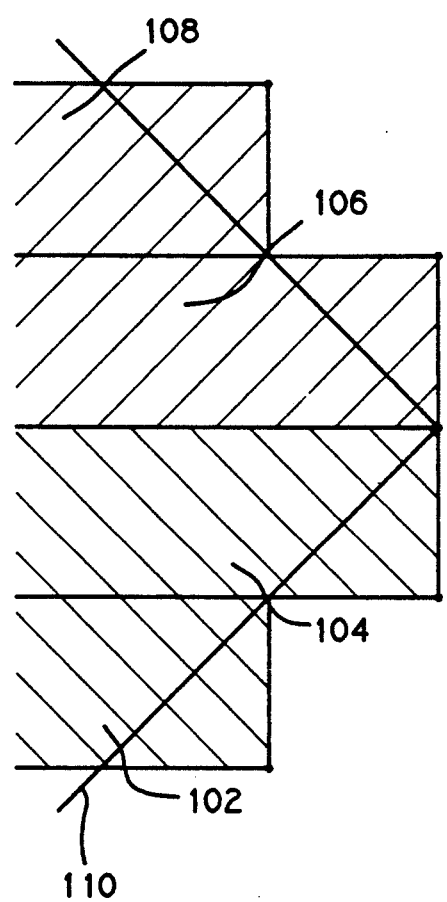
Figure 20D:
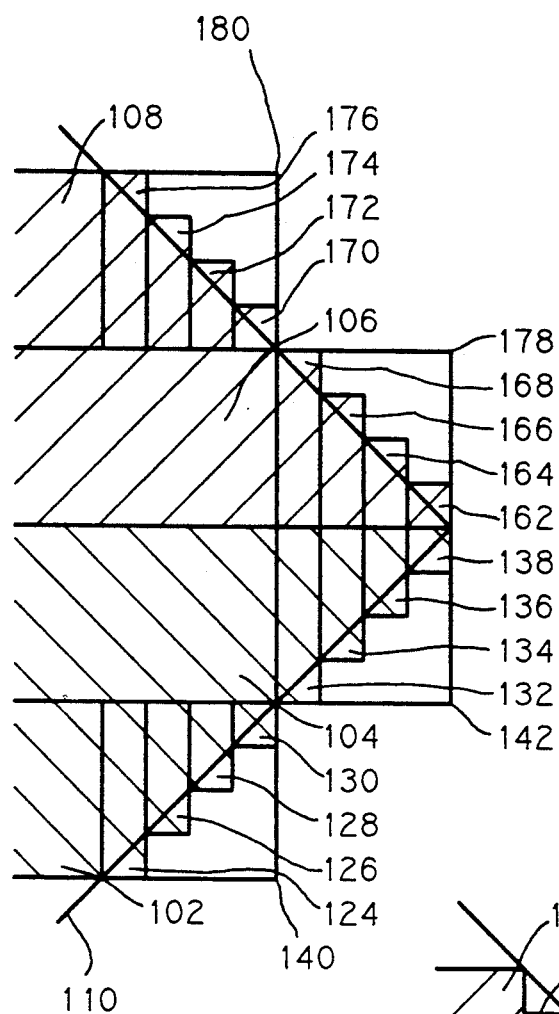
Figure 20B:
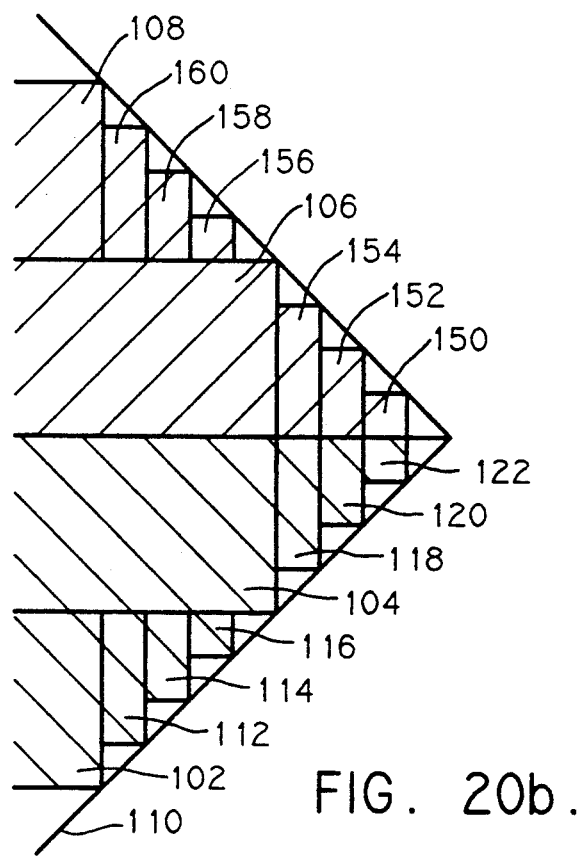
Figures 21A, 21C:
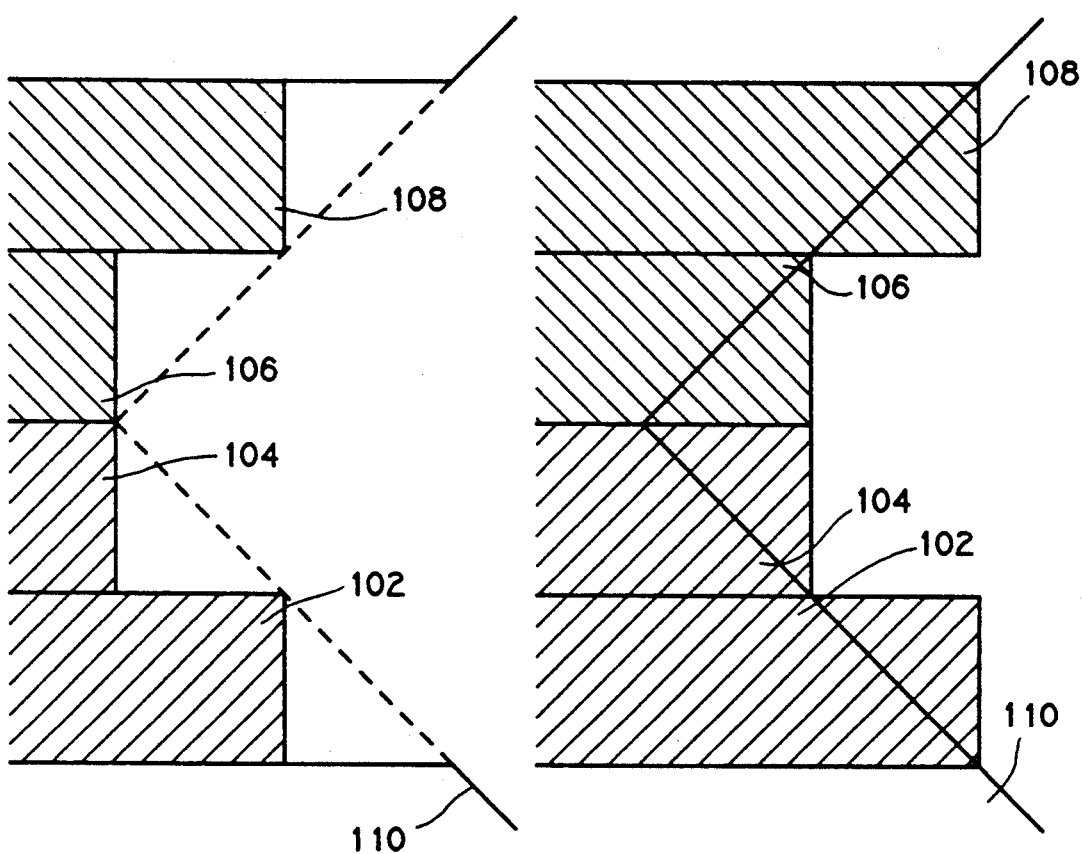
FIGS. 21a–21d depict the transition region of FIG. 11j as reproduced in the three-dimensional object.
Figure 21B:
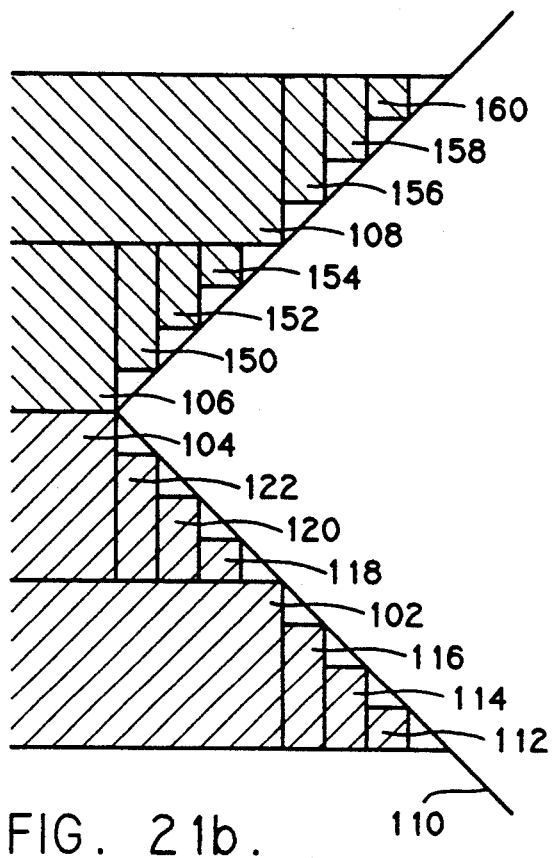
Figure 21D:
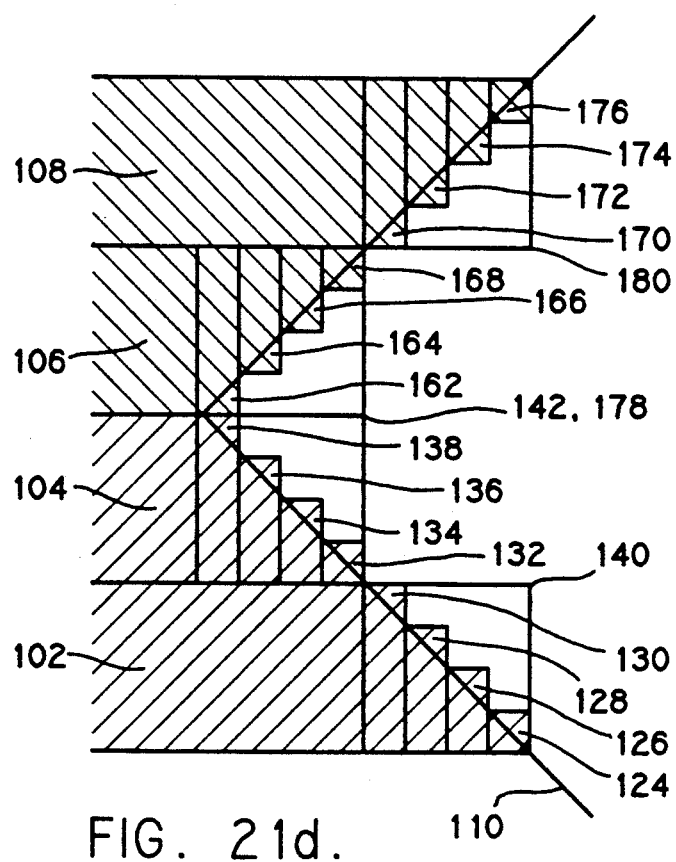

As such, the upper transition layer 106 is the layer that contains the fill layers instead of the lower transition layer 104. Compared to earlier figures, here, like elements are labeled with like numerals. As can be seen, the fill layers of this transition region can also be built utilizing the preferred methods of FIGS. 5d or 5e. FIG. 13c depicts fill layers 150, 152, and 154 adjacent to upper transition structural layer 106. It also depicts fill layers 156, 158, and 160 adjacent to structural layer 108 and therefore associated with a continuing slanted region. FIG. 13d depicts fill layers 162, 164, 166, and 168 adjacent to upper transition structural layer 106. It also depicts fill layers 170, 172, 174, and 176 adjacent to structural layer 108 and therefore associated with a continuing slanted region. Lines 178 and 180 represent the outline of the oversized object as it would be formed without the fill layers.

FIGS. 14a, 14b, 14c, and 14d depict identical elements as those of their respective counterparts in FIGS. 12 and 13, and as such are similarly labeled. Examination of FIGS. 14b and 14d indicate that the fill layers associated with structural layer 102 can be formed by one of the previously-discussed preferred methods. Additional examination, however, reveals that the fill layers associated with lower transition layer 104 cannot be handled in a similar manner since an appropriate upper fill layer 106 does not exist. Therefore, it is concluded that the fill layers 118, 120, and 122 of FIG. 14b or the fill layers 132, 134, 136, and 138 of FIG. 14d must be formed by one of the other methods described in FIGS. 5a, 5b, or 5c or the like. Alternatively, one may choose not to form these fill layers at all. In either case, in terms of a generalized implementation, it becomes necessary to utilize multiple layer information to determine how to form the fill layers associated with a given structural layer (at least if one wishes to use the preferred methods of formation as often as possible). Part building experience indicates that transition regions of the FIG. 11c type are not encountered often and, therefore can be handled by other alternative methods. One alternative method involves the inspection of the original three dimensional object data to see if such regions exist. If not, the object can be built according to a preferred method. If they do exist, the portion of space containing the region can be given an attribute which indicates to the computer not to form fill layers for that portion.

FIG. 15a, 15b, 15c, and 15d are similar to their corresponding counterparts in FIGS. 12, 13, and 14 except that these figures are based on the transition region of FIG. 11d. Since this transition region is bounded from below by a flat down-facing feature, there are no lower transition layers. It can be seen that the layer above the upper transition layer extends at least as far as the thinnest fill layer and therefore the fill layers can be formed according to one of the preferred methods of formation.

FIGS. 16 to 19 are counterparts to FIGS. 12 to 15 but for up-facing slanted surfaces instead of for down-facing slanted surfaces. FIG. 16 is the counterpart of FIG. 12 and depicts the transition region of FIG. 11e. FIG. 17 is the counterpart of FIG. 13 and depicts the transition region of FIG. 11f. FIG. 18 is the counterpart of FIG. 14 and depicts the transition region of FIG. 11g, and FIG. 19 is the counterpart of FIG. 15 and depicts the transition of region of FIG. 11h. For up-facing slanted features, the utilization of the preferred formation methods requires that the lower transition layer extend completely under the thinnest of the fill layers associated with the upper transition structural layer. The elements of FIGS. 16 to 19 are labeled with like numerals to their counterparts in FIGS. 12 to 15. Examination of these Figures indicate that the transition regions of FIGS. 16, 17, and 19 can be produced by the preferred methods (those of FIG. 6d or 6e). However, examination of FIG. 18 indicates that utilization of a preferred method might result in some difficulties since there is not a lower transition layer to support the fill layers. Therefore, utilization of a preferred method in this case would require the use of support structures (like the web supports described in U.S. patent application Ser. No. 07/182,801). Alternatively, one of the other formation methods of FIGS. 6a, 6b, or 6c can be used or a decision can be made not to produce fill layers in association with the upper structural layer of this particular transition region.

By analogy to FIGS. 12 to 19, FIGS. 20a, 20b, 20c, and 20d depict the transition zone of FIG. 11i. As can be seen from this figure, the lower transition layer 104 comprises down-facing fill layers and upper transition layer 106 comprises up-facing fill layers, wherein the upper fill layers are above the down-facing fill layers. Therefore, the up-facing fill layers do not have a full structural layer below them to give them support. This problem can be handled as described above for FIG. 18. However, it is noted that the down-facing fill layers cannot be exposed through a complete structural layer to give them support. This problem can be handled in the same way as described for that of FIG. 14.

FIGS. 21a, 21b, 21c, and 21d are similar to their counterparts in FIGS. 12 through 20 except they depict the transition region of FIG. 11j. As can be seen from the figures, the fill layers of this transition region can be appropriately formed by our preferred methods.

In summary, 7 of the 10 transition regions can be appropriately handled by the preferred formation methods whereas the other three transition regions require other methods for proper formation. These three special regions can be formed following the above outlined steps or, alternatively, they can be handled by appropriate utilization of the building methods described in the previously-referenced, concurrently-filed U.S. patent application Ser. No. 07/606,802 entitled "Simultaneous Multiple Layer Curing for Forming Three-Dimensional Objects". This referenced application discloses the use of comparisons between adjacent layers to determine the most appropriate layers on which to transform material and to what depth the material should be transformed with the dual purpose of maintaining desired resolution and structural integrity of the layers.

Keeping the above considerations in mind, methods of implementing the above-described preferred methods will now be described based on the assumptions that the three previously-discussed transition regions do not exist or that the portions of space that include them are attributed in such a way that the fill layers will not be formed, or if formed, will be associated with appropriate structural layers.

IMPLEMENTATION

A first method of implementation is based on forming a slightly oversized object as depicted in the "d" figures of FIGS. 12 through 21. The formation of fill layers is based on the methods described in FIGS. 5d and 6d or alternatively FIGS. 5e and 6e. This implementation is based on the commercial SLICE program developed by 3D Systems, Inc. of Valencia, Calif. The primary features of this SLICE program are described in detail in previously referenced U.S. patent application Ser. No. 07/331,644.

A preferred method of forming objects described in this application is directed to forming oversized objects. This referenced application identifies the primary regions that would profit from the utilization of fill layers as near-flat up-facing regions and near-flat down-facing regions. For a triangle to be considered near-flat, the angle between the triangle normal vector and the vertical axis must be less than a user specified value for an option known as the MSA. If the MSA value is set close to 90 degrees, then substantially all the non-flat and non-vertical triangles will be considered near-flat. According to a preferred format of the data input for the SLICE program, these near-flat regions are defined by triangles that are slanted relative to the vertical dimension and either face upward or downward.

In this program, the down-facing near-flat triangles form areas that are substantially non-overlapping with other areas produced for a given layer. There is the possibility that there may be some overlap with flat up-facing and near-flat up-facing regions. If overlap exists for a given object, then for accurate reproduction of the object, the overlap must be removed. Since the down-facing near-flat triangles substantially dictate the regions for fill layers and they form substantially independent areas, then for the present program to be successfully modified to produce fill layers, the processing that is done to these particular triangles must be modified. This modification consists of slicing the near-flat down-facing triangles at slicing intervals appropriate to the thickness of the fill layers.

FIGS. 22 to 25 depict examples of implementations of the subject invention. In these examples, the fill layers have thicknesses which are ¼ of that of the structural layer thickness.

Figure 22:
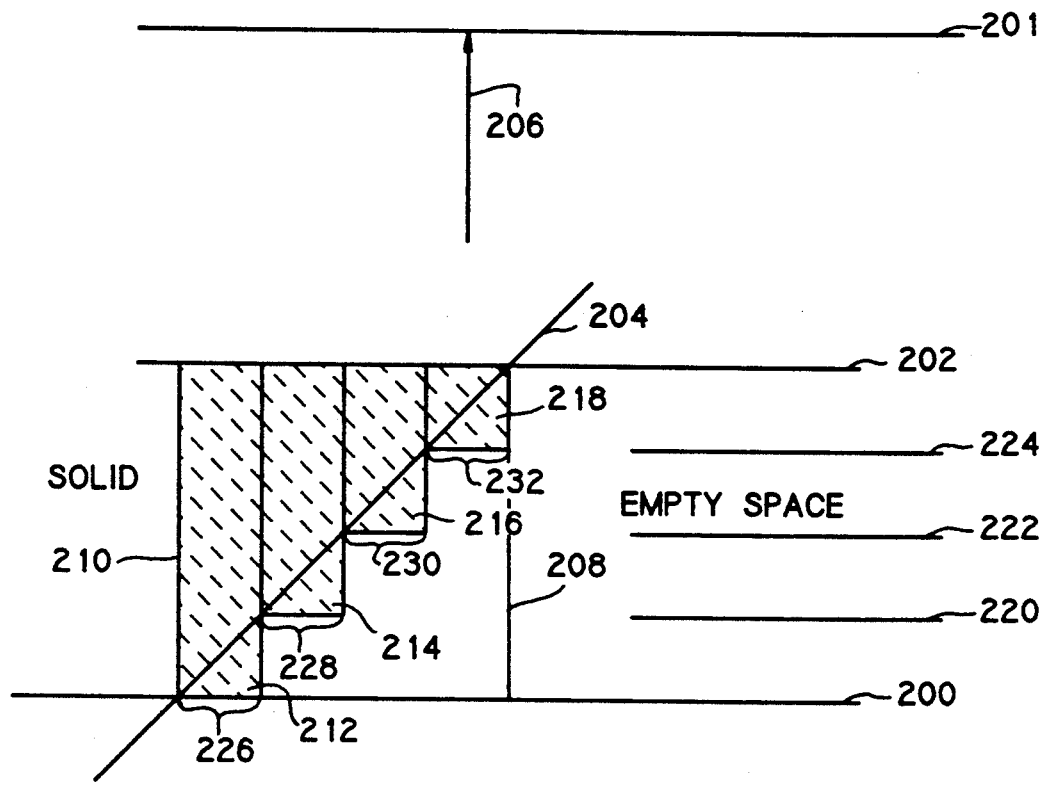
FIGS. 22–25 depict examples of implementations of the subject invention.
Figure 23:
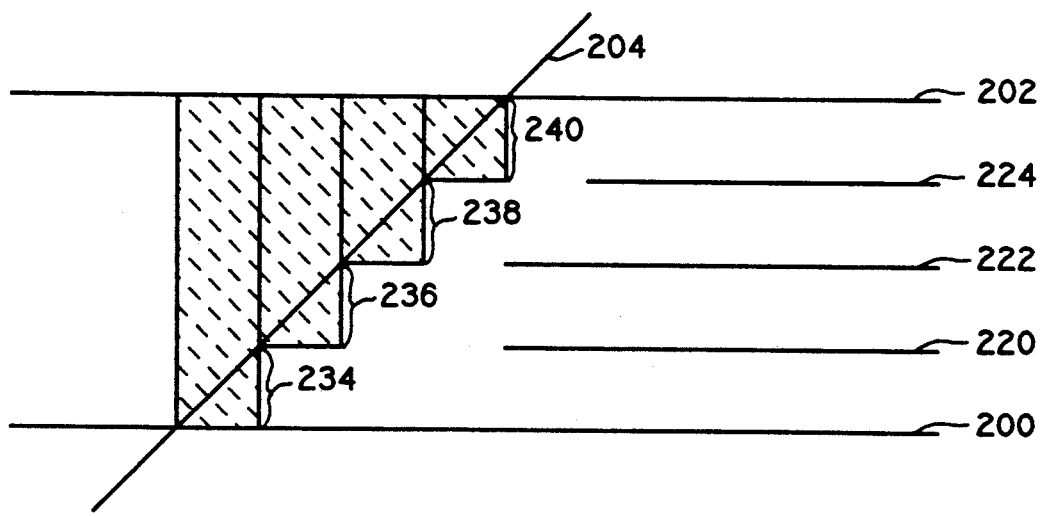

FIG. 22 depicts a two-dimensional side view of slicing planes 200 and 202 and of the only visible edge of triangle 204. The region to the left of triangle 204 comprises a portion of the object while the region to the right is empty space. The upward direction is indicated by arrow 206. Thus, 204 represents a down-facing near-flat triangle. In the normal processing of triangle 204, the region depicted between planes 200 and 202 and bounded by line 208 and line 210 would be produced and labeled as a near-flat down-facing region. It would be associated with a cross-section corresponding to slice plane 200 but which specifies material to be transformed that corresponds to the region between planes 200 and 202. Instead of creating this singular rectangular box to be cured, by use of additional slice planes and additional processing, smaller rectangular regions 212, 214, 216, and 218 can be separately produced and labeled to form fill layers of different thickness. Area 226 of fill layer 210 is formed by slicing triangle 204 at slice plane 200 and 220 and projecting the area (a line in this two dimensional view) to the appropriate cross-section. In terms of the preferred methods of forming fill layers discussed previously, this area 226 would be associated with the cross-section 201 (which the output of SLICE would label as 202). This area is one structural layer higher than the box between 202, 200, 208 and 210 (which is associated with 200). This area 226 would be labeled as requiring a cure depth of 1 full structural layer thickness to form fill layer 212, but since it will be exposed through an already existing layer, its actual thickness will be two layer thicknesses. An appropriate exposure level will be specified by the user or determined by the system. Area 228 of fill layer 214 is obtained by slicing the triangle at slicing planes 220 and 222 and projecting the net area to the same cross-section that 226 was associated with. However, in this case, the cure depth associated with this area will be ¾ of a layer thickness. Actually, the thickness will be 1 and ¾ layer thicknesses because of the method of exposing though a previously cured layer. Area 230 of fill layer 216 will be obtained by slicing at planes 222 and 224 and projecting the portion of the triangle between the planes to the same plane that 226 and 228 were associated with, along with the labeling and specification for a cure depth of ½ (or 1 and ½) layer thicknesses. Area 232 of fill layer 218 will be formed in an analogous manner by use of slicing plane 224 and 202. Its corresponding cure depth will be ¼ (or 1 and ¼) of a layer thickness.

The above description called for the formation of fill layers in an edgewise manner and it therefore corresponds to the method of FIG. 5d. A similar implementation based on the method of FIG. 5e could be developed based on similar slice planes but where the comparisons between planes would be modified and the cure depths modified. This is outlined in FIG. 23. Fill layer 240 is obtained by slicing at planes 200 and 202 and projecting the intervening area of triangle 204 between the planes to the appropriate cross-section, and then labeling and specifying a cure depth of ¼ layer (1 and ¼ layer). Fill layer 238 is obtained by slicing triangle 204 at planes 224 and 200 and projecting the intervening area of 204 between 224 and 200 to the appropriate layer (same as 240), labeling and specifying a cure depth of ¼ of a layer thickness below fill layer 240 (1 and ½ layers). Similarly, fill layer 236 is obtained from slicing planes 222 and 200 and its cure depth is ¼ of a layer thickness below fill layer 238 (1 and ¾ layers). Finally, fill layer 234 is obtained from slice planes 220 and 200 and its cure depth is ¼ of a layer thickness below fill layer 236 (2 layers).

According to this same SLICE program, the near-flat up-facing triangle regions form areas that overlap other regions. The most important of these other regions are the layer boundary areas. The down-facing flat and near-flat regions may also be overlapped; however, this condition belongs to the cases that have been excluded (transition regions of FIG. 11g and 11j). In any case, the flat down-facing region can be compensated for by appropriate use of supports. Since layer boundary areas and flat down-facing areas are considered to be worthy of at least a full structural layer thickness cure depth, these areas must be removed from the near-flat up-facing areas because it is desirable to cure the near-flat up-facing areas in a staged manner where effective cure thickness is less than or approximately equal to 1 layer thickness. Therefore, the first step in the process of forming the up-facing fill areas is to subtract the up-facing near-flat regions from the layer boundary (and flat down-facing boundary and near-flat down boundary) regions so that separate and distinct regions are formed. Techniques for performing these separations based on the present SLICE program are disclosed in the previously-referenced U.S. patent application Ser. No. 07/606,802. Methods based on a more direct layer comparison version of SLICE are described in the other previously-referenced concurrently-filed U.S. patent application Ser. No. 07/606,191. After the separation of regions has occurred, the up-facing near-flat triangles substantially dictate the regions for fill layers and they form substantially independent areas. From this point, for the present SLICE program to be modified to produce fill layers, the processing that is done to these particular triangles must be modified. This modification consists of slicing the near-flat up-facing triangles at slicing intervals appropriate to the thickness of the fill layers.

Figure 24:
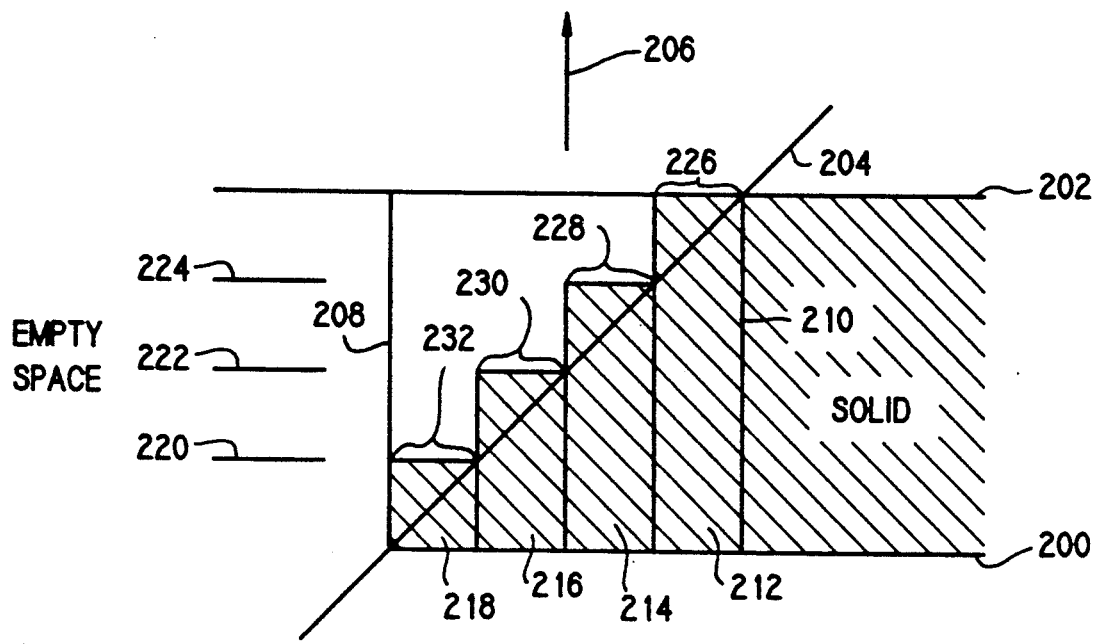

FIG. 24 depicts an up-facing analogy to FIG. 22, and as such, like elements are labeled with like numerals. FIG. 24 depicts a two-dimensional side view of slicing planes 200 and 202 and of the only visible edge of triangle 204. The region to the right of triangle 204 comprises a portion of the object while the region to the left is empty space. The upward direction is indicated by arrow 206. Thus, 204 represents an up-facing near-flat triangle. In the normal processing of triangle 204, the region depicted between planes 200 and 202 and bounded by line 208 and line 210 would be produced and labeled as a near-flat up-facing region. It would be associated with a cross-section corresponding to slice plane 200 but which specifies material to be transformed that corresponds to the region between planes 200 and 202. Instead of creating this singular rectangular box to be cured, by use of additional slice planes and additional processing, smaller rectangular regions 212, 214, 216, and 218 can be separately produced and labeled to form fill layers of different thicknesses. Area 226 of fill layer 212 is formed by slicing triangle 204 at slice planes 202 and 224 and projecting the area (a line in this two-dimensional view) to the appropriate cross-section. In terms of the preferred methods and the figure as illustrated, this area 226 would be associated with the cross-section 202 (actually 200 since the SLICE program in essence shifts everything downward by one layer thickness). This region 226 would be labeled as requiring a cure depth of 1 full structural layer thickness (plus any necessary overcure) to form fill layer 212. Area 228 of fill layer 214 will be obtained by slicing the triangle at slicing planes 224 and 222 and associating the intervening area with the cross-section associated with slicing plane 224 (or 1 structural layer below that in terms of the 1 layer down shift). In this case, the cure depth associated with this area will be $\frac{3}{4}$ of a layer thickness plus any necessary overcure. Area 230 of fill layer 216 will be obtained by slicing at planes 222 and 220 and associating the intervening area to the cross-section associated with slice plane 222 along with the labeling and specification for a cure depth of $\frac{1}{2}$ a layer thickness (plus overcure). Area 232 of fill layer 218 will be formed in an analogous manner by use of slicing planes 220 and 200. Its corresponding cure depth will be $\frac{1}{4}$ of a layer thickness (plus overcure). This above description called for the formation of fill layer in an edgewise manner and therefore corresponds to the method of FIG. 6d.

A similar implementation of the method of FIG. 6e is possible which is based on similar slice planes but where the comparisons between planes would be modified and the cure depths modified. This is outlined in FIG. 25. Fill layer 240 is obtained by slicing at planes 200 and 202, associating the net area with the cross-section corresponding to slice plane 220, and then labeling and specifying a cure depth of $\frac{1}{4}$ layer (plus any necessary overcure). Fill layer 238 is obtained by slicing triangle 204 at planes 220 and 202, projecting the area of 204 that is between 220 and 202 to the cross-section associated with 222, and then labeling and specifying a cure depth of $\frac{1}{4}$ of a layer (plus any necessary overcure). Similarly, fill layer 236 is obtained from slicing planes 222 and 202. It is associated with slicing plane 224 and its cure depth is $\frac{1}{4}$ of a layer thickness (plus any overcure). Similarly, fill layer 234 is obtained from slice planes 224 and 202. It is associated with plane 202 and its cure depth is $\frac{1}{4}$ of a layer thickness (plus any overcure).

A second method of implementation is based on forming a slightly undersized object. This implementation can be based on the SLICE program of the above discussion or on the SLICE program of the referenced concurrently-filed U.S. patent application Ser. No. 07/606,191. This implementation is substantially the same as the previously-described oversized implementation except in this implementation, the cure depth associated with each fill layer of FIG. 22 is decreased by $\frac{1}{4}$ of a layer thickness. The fill layers of FIG. 24 are decreased in thickness by $\frac{1}{4}$ of a layer thickness, but furthermore, the planes with which they are associated are shifted downward. Fill layer 226 would be associated with plane 224, while fill layers 228, 230, and 232 would be respectively associated with planes 222, 220, and 200. This, in turn, effectively means that fill layer 232 would disappear. The slicing planes used to obtain the fill layers of FIG. 23 would be

| Fill Layer | Planes |
|---|---|
| 240 | 200 and 224 |
| 238 | 200 and 222 |
| 236 | 200 and 220 |
| 234 | 200 and 200 = No Generation. |

Figure 25:
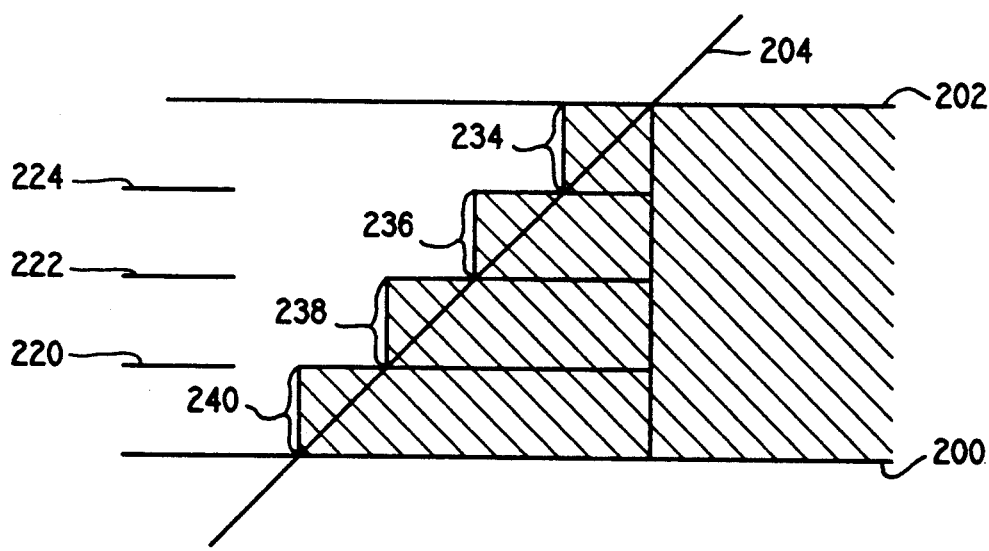

Similarly, the slicing planes and associated cross-sections used to obtain the fill layers of FIG. 25 would be

| Fill Layer | Planes | Cross-section |
|---|---|---|
| 240 | 202 and 220 | 220 |
| 238 | 202 and 222 | 222 |
| 236 | 202 and 224 | 224 |
| 234 | 202 and 202 = No Generation. | |

The generalization of the above implementations to different numbers of fill layers will be apparent to one of ordinary skill in the art.

Various other implementations are possible and will be apparent to one of ordinary skill in the art by following the teachings of this disclosure. For example, implementations that simply reduce discontinuities as opposed to simultaneously achieving higher levels of reproduction accuracy are conceivable and may have application in those market segments that are primarily concerned with visual appeal as opposed to accurate representation.

As stated previously, concurrently-filed U.S. patent application Ser. No. 07/606,802 relating to simultaneous multiple layer curing describes in detail modifications that can be made to the present commercial SLICE program so that determination and separation of overlapping regions can be made and therefore so that the concept of fill layers can be implemented based on this program. However, because of the computational simplicity of the layer comparison SLICE in terms of determining intersecting regions and separating them, the above oversized and undersized implementations may be more easily made available through appropriate modifications to this version of SLICE.

A problematic aspect with the first and second implementation embodiments, however, is, as discussed in Ser. No. 331,644, that triangle vertices of the object representation are rounded to the slicing planes corresponding to the structural layers before formation of the boundaries. As a result, even though a vertex may be closer to a slicing plane corresponding to a fill layer, it will still be rounded to the closest structural layer slice plane. This step is performed for computational efficiency, but it may result in a loss of accuracy. Therefore, a further modification of SLICE, whereby triangle vertices are rounded to the nearest slicing plane, even those corresponding to the fill layers, could be made in order to obtain even higher part accuracy at the expense of some loss in computational simplicity.

A third method of implementation involves modifying SLICE in this fashion. Specially, all triangle vertices are rounded to the closest slicing plane, whether it be a structural layer slicing plane or a fill layer slicing plane. The elements of this third method of implementation are described in more detail in copending concurrently filed U.S. patent application Ser. No. 07/606,802, relating to simultaneous multiple layer transformation. In addition to the benefit of more accurate part reproduction, this third method also involves modifying SLICE to build layers to a thickness, whenever possible, which may be greater than the desired fill layer thickness, but which is necessary to build layers of acceptable thickness and rigidity.

As described in U.S. patent application Ser. No. 07/331,644, different cure depths generally result in different cure widths. Therefore, in practicing the present invention, as described in the previous embodiments, it may be desirable to utilize an appropriate cure width compensation algorithm for each region to adjust the boundaries of regions depending on the particular cure width obtained.

ADDITIONAL EMBODIMENT

Figure 26A:
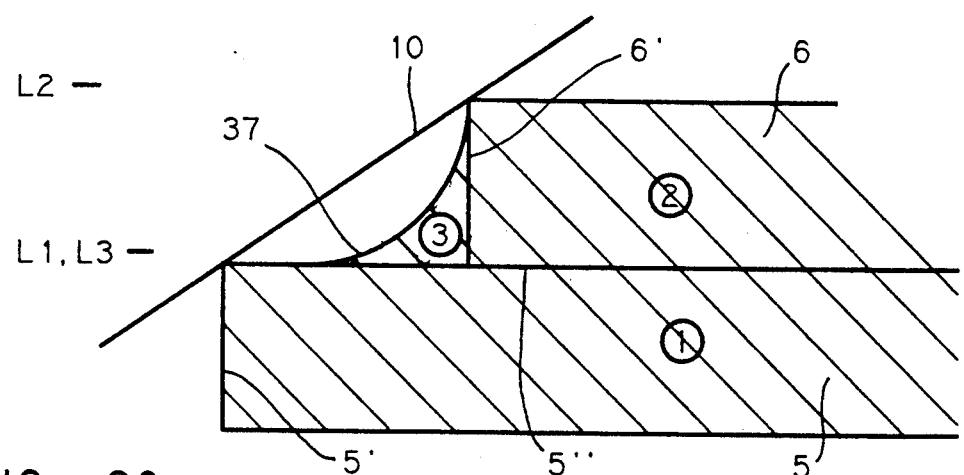
FIGS. 26a–26c and 27a–27f illustrate embodiments of the subject invention employing menisci to smooth over surface discontinuities.
Figure 26B:
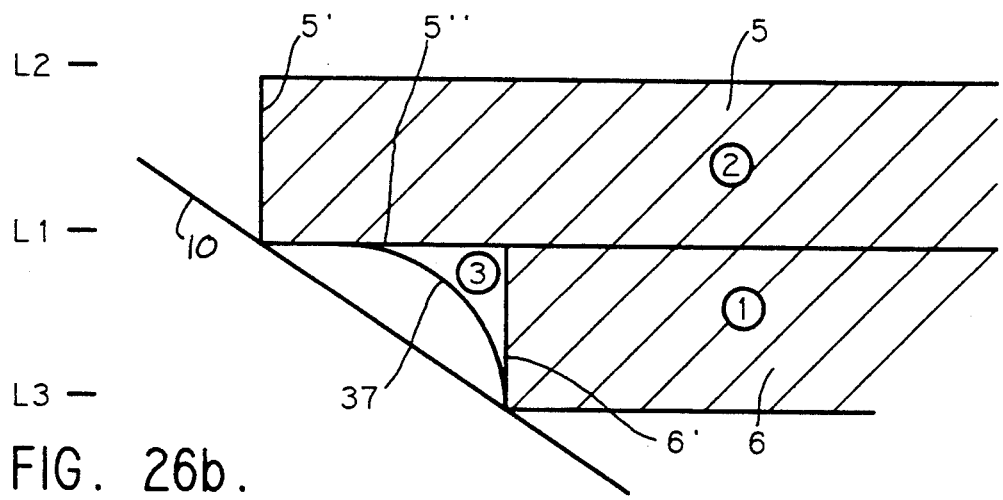
Figure 26C:
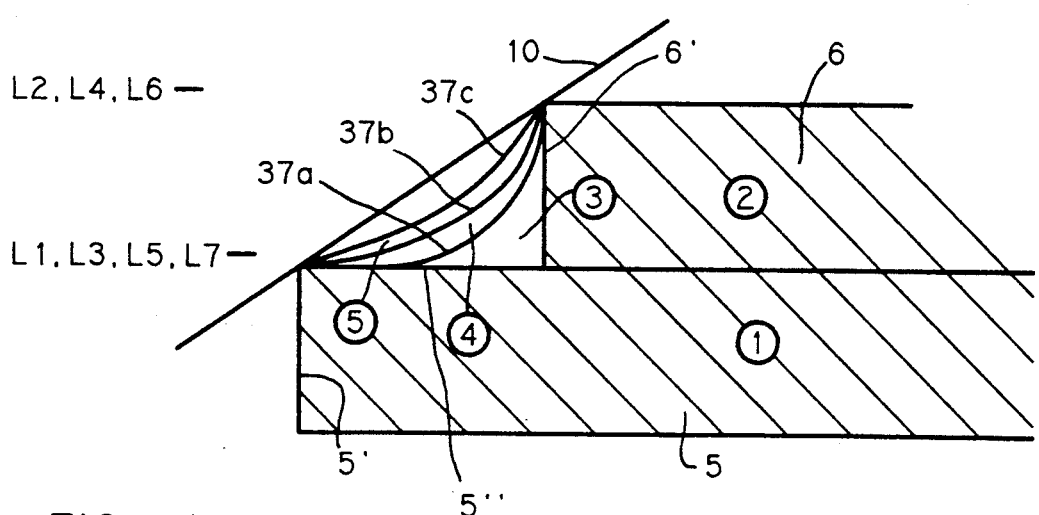

An additional embodiment of the subject invention, similar to the embodiment shown in FIG. 6b, is illustrated in FIGS. 26a-26c. As will be seen, this embodiment depends upon the surface tension of the material which will cause it to form a meniscus within the discontinuity, therefore, causing the material to bridge over the discontinuity, at least in part, and achieve a higher part resolution, without requiring the use of thin fill layers.

However, the effect of the meniscuses can also be used in conjunction with the fill layers. FIG. 6b illustrates the beneficial impact of the meniscuses when used in conjunction with the fill layers.

The embodiment here, on the other hand, is based solely on the meniscus effect, without explicitly requiring the use of thin fill layers. In those instances where the layer thicknesses of the structural layers is so great that a meniscus cannot effectively form without the generation of thin fill layers, then the example of FIG. 6b is preferable. However, when the thickness of the structural layers is thin enough so that a reasonable meniscus will form without requiring thin fill layers, then the embodiment here is preferable since it entails less steps, and is therefore easier to implement.

Compared to the examples of FIGS. 5a-5e, and FIGS. 6a-6e, in FIGS. 26a-26c, like elements are referred to with like reference numerals.

FIG. 26a illustrates meniscus 37 being formed in an up-facing discontinuity formed by layers 5 and 6. The particular order of formation of the layers and the meniscus is shown in FIG. 26a by the circled numbers. As shown, the first step is to form layer 5 while the working surface is at level L1. Next, layer 6 is formed after the working surface has been moved to level L2. At this level, the object surface bounded by edge 6' and extension region 5" is surrounded by untransformed material. Next, the level of the working surface is moved to level L3. As shown, because of the surface tension of the material, as the material recedes from above extension region 5", a meniscus 37 will remain in the discontinuity as shown. The next step is to expose the meniscus to the synergistic stimulation, thereby transforming it. The result is a smoothed over object surface which more closely matches the envelope 10 of the object representation.

FIG. 26b illustrates the formation of the meniscus in down-facing regions. As shown, the first step is to form layer 6 while the working surface is a level L1. Next, the working surface is moved to level L2, and layer 5 is formed. Next, the working surface is moved down to level L3, and as shown, meniscus 37 will remain in the discontinuity. Finally, a portion of the meniscus is exposed and transformed by directing synergistic stimulation through already-formed layer 5 in a similar manner to that described previously with respect to the examples of FIGS. 5d and 5e. However, since the exact shape and size of the meniscus may not be known, an exposure will be given which will expose as much of the meniscus as possible without risking the passing of significant radiation through to material which is to remain unexposed. Again, the result is an object surface which more closely defines the envelope 10 of the object representation.

FIG. 26c illustrates the formation of multiple meniscuses on top of each other to achieve even more discontinuity reduction. This is accomplished through multiple iterations of the processes described above with respect to FIGS. 26a and 26b. FIG. 26c illustrates the use of multiple iterations in an up-facing discontinuity, but multiple iterations are equally available for use in a down-facing discontinuity.

As illustrated, to begin the process, layer 5 is formed while the working surface is at level L1. Next, the working surface is moved to level L2, and layer 6 is formed. The working surface is then moved to L3 (which is coincidental with the previous level L1), and the meniscus 37a is formed, whereupon it is exposed and transformed. The working surface is then moved to at least level L4, and then to L5, whereupon meniscus 37b is formed over transformed meniscus 37a. Meniscus 37b is then exposed and transformed. Then, the working surface is moved to at least level L6, and then to L7. At this point, meniscus 37c has formed over already-transformed meniscus 37b. This is then exposed and transformed. As seen, compared to FIG. 26a, multiple iterations of the above process results in even higher surface resolution compared to the envelope 10 of the object representation. Also, FIG. 26c shows three iterations of the process illustrated in FIG. 26a, but this example is not meant to be limiting, and any number of iterations are possible.

In all the above embodiments, it is preferable to keep the working surface at a constant distance from the scanning mirrors. Otherwise, the computational complexity of converting between the radial movement of the scanning mirrors and the linear movement of the beam along the working surface will be more complex. This can be accomplished by periodically sensing the material level, and altering the material level when necessary to maintain a constant distance, such as through the use of a plunger or the like, or by simply adding or extracting material from the container. Alternatively, the scanning mirrors might be periodically moved so that this distance remains constant.

FIGS. 27a-27f illustrate another embodiment of a method for smoothing out surface discontinuities using the meniscus effect. In these figures, like elements are referred to with like reference numerals.

Figure 27A:
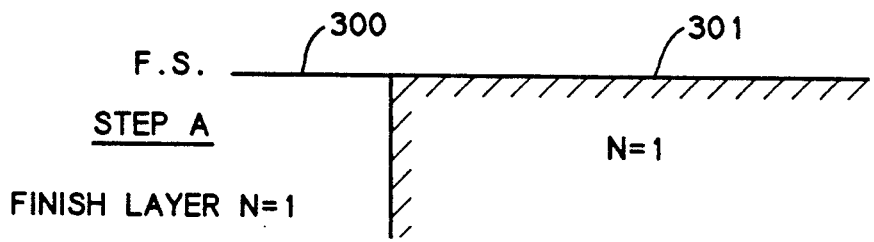

In FIG. 27a, the process begins. As indicated, structural layer 301 is formed at working surface 300.

Figure 27B:
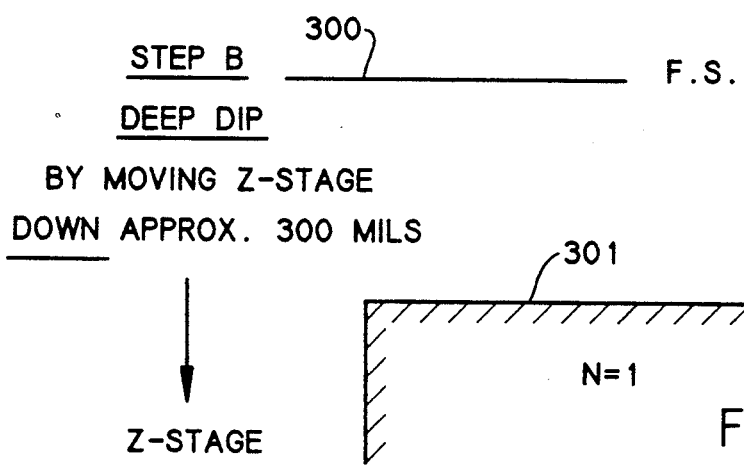

In FIG. 27b, the structural layer is down-dipped below the working surface, preferably by approximately 300 mils.

Figure 27C:
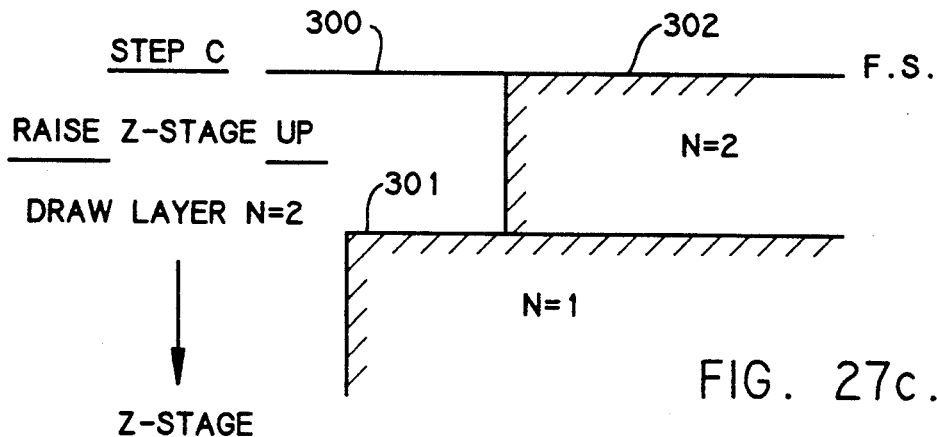

In FIG. 27c, the structural layer is up-dipped, and thereby recoated in the manner described previously in preparation for the formation of layer 302. Layer 302 is then formed at the working surface.

Figure 27D:
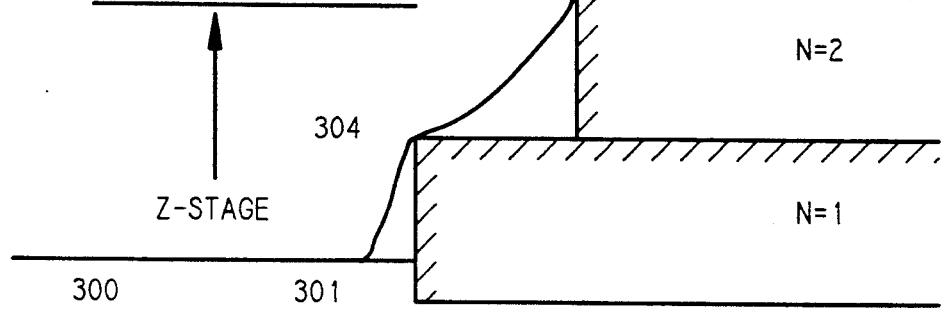

In FIG. 27d, the partially-formed part is super-elevated, preferably by 4 or 5 layer thicknesses as shown, to ensure rapid formation of meniscus 303.

Figure 27E:
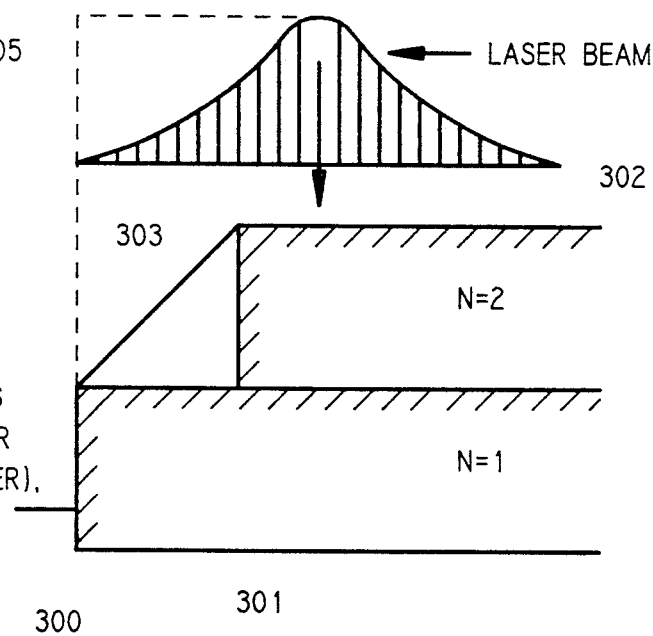

Next, in FIG. 27e, the material in meniscus 303 is solidified, preferably by positioning the laser beam utilizing an appropriate cure width compensation amount determined using the cure width compensation algorithm discussed in Ser. No. 331,644.

Figure 27F:
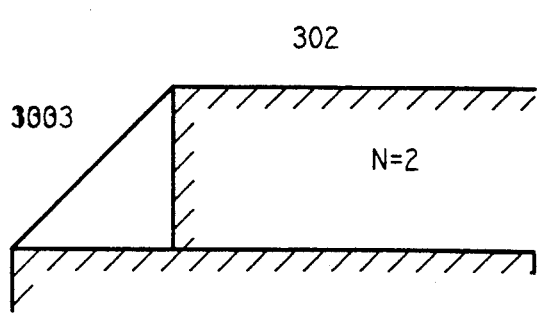

In FIG. 27f, the partially-formed part is down-dipped to continue the process.

Figure 28:
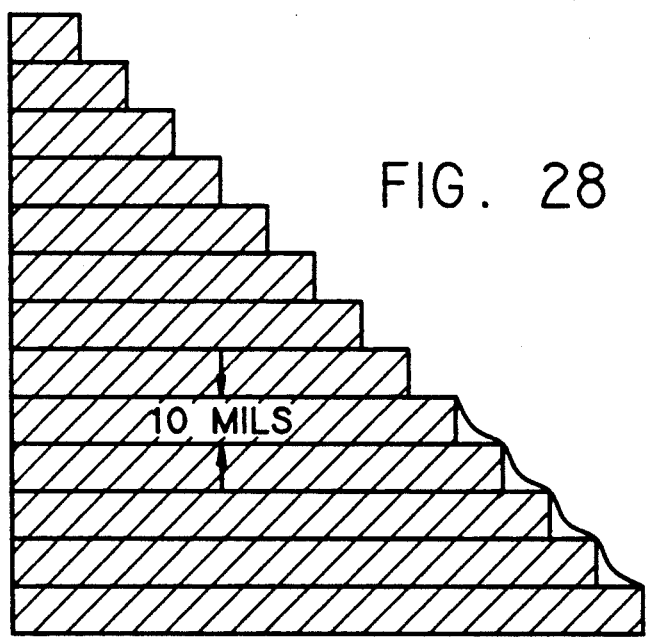
FIG. 28 illustrates the smoothing effect of the meniscus.

FIG. 28 illustrates the beneficial effect of this embodiment on a part surface. In this example, the part was formed with 10 mil layers, and the surface is inclined at 45°. The left-most portion of the figure illustrates discontinuities which were not smoothed out with the meniscus effect, while the right-most portion illustrates discontinuities which were smoothed out.

As described at the outset, the above examples are illustrative only, and are not meant to be limiting. Specifically, many types of materials are intended to be encompassed by the subject invention, including liquid photopolymers, thermoplastics, dry film photoresists, and non-reactive films, all having the common characteristic of being capable of physical transformation upon exposure to synergistic stimulation. Moreover, many different types of synergistic stimulation are possible, including radiation from UV, $CO_2$, or infrared lasers, or flood exposure, as long as the stimulation causes a physical transformation by any one of a variety of reactions, including UV reactions, thermal reactions and ablative reactions. Also, a variety of means of adhering the layers together are intended to be encompassed, including adherence though the natural adhesive properties of the material upon transformation or through the application of pressure or heat-sensitive adhesives or the like. Finally, a variety of different means of layer formation are meant to be encompassed, including where the layers are formed through the process of over-dipping into a liquid material, and then striking off excess material to form a uniform layer by recoating means such as a doctor blade or the like, or where sheets, rolls, or films of material are dispensed onto a working surface. A variety of different means of moving the working surface relative to the part are meant to be encompassed, including where the material is a liquid contained in a vat to form a working surface, and the part is moved relative to the working surface by means of a platform (on which the part rests) coupled to a Z-stage elevator, or where the part is kept stationary, and the working surface is itself moved, such as by adding material to the vat, by removing material from the vat, or by moving the vat itself relative to the working surface. In fact, every means of forming a three-dimensional object in layers, where the object has at least one stairstep surface discontinuity can benefit from the subject invention, and is meant to be encompassed.

Therefore, additional advantages and modifications than those explicitly described will readily occur to those skilled in the art. The invention in its broader aspects is not, therefore, limited to the specific details, representative methods, and illustrative examples shown and described. Accordingly, departures may be made from such details without departing from the spirit or scope of applicant's general inventive concept.

What is claimed is:

1. An improved stereolithographic method for forming a three-dimensional object on substantially a layer by layer basis from a material capable of selective physical transformation upon exposure to synergistic stimulation comprising the steps of forming successive layers of unsolidified material of desired thickness in preparation of forming layers of structure of said three-dimensional object and exposing said layers of unsolidified material to synergistic stimulation to form said layers of structure of said three-dimensional object, including forming a last layer of unsolidified material and exposing said last layer to synergistic stimulation to form a last layer of structure thereby completing formation of all layers of said three-dimensional object, the improvement comprising the step of:

reducing at least part of an up-facing surface discontinuity between two layers by selectively exposing said unsolidified building material within at least part of said discontinuity to synergistic stimulation wherein the synergistic stimulation impinges on a surface of said material with an orientation close to perpendicular prior to exposing said last layer of structure of said three-dimensional object.

2. An improved stereolithographic method for forming a three-dimensional object on substantially a layer by layer basis from a material capable of selective physical transformation upon exposure to synergistic stimulation, comprising the steps of forming successive layers of unsolidified material of desired thickness in preparation for forming layers of structure of said three-dimensional object and exposing said layers of unsolidified material to synergistic stimulation to form said layers of structure of said three-dimensional object, including forming a last layer of unsolidified material and exposing said last layer to synergistic stimulation to form a last layer of structure thereby completing formation of all layers of structure of said three-dimensional object, the improvement comprising the step of:

reducing at least part of a down-facing surface discontinuity between a first and a second layer by selectively exposing said unsolidified material within at least part of said discontinuity to synergistic stimulation prior to exposing said last layer of structure of said three-dimensional object but after a layer of material is formed in preparation for formation of said second layer of structure.

3. An improved stereolithographic method for forming a three-dimensional object, having an exterior surface, on substantially a layer by layer basis from a material capable of selective physical transformation upon exposure to synergistic stimulation, comprising the steps of forming successive layers of unsolidified material of desired thickness in preparation for forming layers of structure of said three-dimensional object and exposing said layers of unsolidified material to synergistic stimulation to form said layers of structure of said three-dimensional object, including forming a last layer of unsolidified material and exposing said last layer to synergistic stimulation to form a last layer of structure thereby completing formation of all layers of said three-dimensional object, the improvement comprising the steps of:

selectively curing a layer of material of desired thickness to form at least a portion of an internal region of a layer of structure, said layer of structure having a z-range corresponding to said desired thickness; and forming at least a portion of said exterior surface of said three-dimensional object from at least one fill layer which has a thicknesses less than said desired thickness, and wherein said at least portion of said exterior surface corresponds to said z-range, and wherein said at least one fill layer is formed prior to formation of said last layer of structure of said three-dimensional object.

4. A method for reducing a surface discontinuity between first and second structural layers of a three-dimensional object being stereolithographically formed, said discontinuity comprising a deviation between a down-facing region of a three-dimensional object surface and a desired object envelope, the down-facing region to comprise an end of a not yet formed first structural layer which is to contact at least in part the object envelope, and an extension region which is to comprise a portion of a lower surface of a not yet formed second structural layer which extends beyond the end of the first structural layer, and which is to contact, at least in part, the object envelope, the lower surface to contact at least in part an upper surface of the first structural layer, the method comprising the steps of:

containing a volume of flowable material, which material is capable of selective physical transformation upon exposure to synergistic stimulation, whereupon a working surface of the material is formed;

selectively exposing material at said working surface to a first exposure of said synergistic stimulation to form said first structural layer having a first cure depth;

selectively exposing material at the working surface to a second exposure of the synergistic stimulation to form a first fill layer, said fill layer being cured to a depth less than said first cure depth, said fill layer also having a first edge and a second edge and having an upper surface;

forming an untransformed layer of said material over at least a portion of said upper surface of said first structural layer, whereupon an upper surface of said untransformed layer defines, at least in part, a new working surface; and selectively exposing material at the new working surface to a third exposure of the synergistic stimulation to form said second structural layer, wherein said lower surface of said second structural layer contacts at least in part said upper surface of said first fill layer.

5. The method of claim 4 wherein the first fill layer is formed edgewise and further comprising the step of selectively exposing material at the working surface to a fourth exposure of the synergistic stimulation, before the forming of said untransformed layer, to form a second fill layer situated edgewise relative to the working surface, having a first edge and a second edge, an upper surface, and a lower surface which is situated below the working surface, wherein said first edge of said second fill layer contacts, at least in part, said second edge of said first fill layer, and wherein said upper surface of said second fill layer contacts at least in part said lower surface of said second structural layer upon formation of said second structural layer.

6. The method of claim 4, wherein the first fill layer is formed lengthwise and further comprising the steps of:

selectively exposing the upper surface of the first fill layer to a fourth exposure of synergistic stimulation, wherein the fourth exposure occurs before the third exposure, and wherein at least a portion of the synergistic stimulation in the fourth exposure passes through the first fill layer to expose untransformed material situated below the lower surface of the first fill layer to form a second fill layer situated lengthwise relative to the working surface and having an upper surface which is situated below and contacts at least in part the lower surface of the first fill layer, and having a first edge which contacts at least in part the end of the first structural layer, and having a thickness less than the thickness of the first structural layer.

7. The method of claim 4 wherein the first fill layer is formed lengthwise and overlapping at least in part, the first structural layer.

8. The method of claim 7 further comprising the step of selectively exposing said material to a fourth exposure of the synergistic stimulation to form a second fill layer situated lengthwise, and overlapping, at least in part, the first structural layer, said second fill layer having a lower surface, and having a thickness less than the thickness of the first structural layer, whereupon the lower surface of said second fill layer contacts, at least in part, the upper surface of the first fill layer.

9. A method for reducing a surface discontinuity between first and second structural layers of a three-dimensional object being stereolithographically formed from a flowable material capable of selective physical transformation upon exposure to synergistic stimulation, said discontinuity comprising a deviation between a down-facing region of said three-dimensional object surface and a desired object envelope, the down-facing region comprising an end of an already-formed first structural layer which contacts at least in part the envelope, and an extension region comprising a portion of a lower surface of a not yet formed second structural layer, the lower surface of said second structural layer, after formation, contacting at least in part an upper surface of the first structural layer, and the second structural layer having an end which extends beyond the end of the first structural layer by the extension region, which end contacts at least in part the object envelope, wherein the first and second structural layers have thicknesses, the method comprising:

coating over at least a portion of said first structural layer with a layer of desired thickness of said flowable building material in preparation for formation of said second structural layer;

selectively exposing said coating of flowable building material to synergistic stimulation to form at least a portion of said second structural layer; and selectively exposing, at least in part, the extension region of the second structural layer to synergistic stimulation to expose material situated below the extension region of the second structural layer to form a first fill layer.

10. The method of claim 9 wherein the fill layer is formed edgewise and the fill layer has a first edge, and wherein said first edge contacts, at least in part, the end of the first structural layer.

11. The method of claim 10 further comprising the step of selectively exposing, at least in part, the extension region to an additional exposure of synergistic stimulation to expose material below the extension region to form a second fill layer situated edgewise relative to the working surface and contacting at least in part said first fill layer.

12. The method of claim 9 wherein the first fill layer is formed lengthwise.

13. The method of claim 12 further comprising the step of selectively exposing at least in part the upper surface of the extension region to an additional exposure of the synergistic stimulation to form a second fill layer, below said extension region, situated lengthwise relative to the working surface, and having an upper surface which contacts, at least in part, a lower surface of said first fill layer.

14. A method for reducing a surface discontinuity between first and second structural layers of a three-dimensional object being stereolithographically formed from a flowable material capable of selective physical transformation upon exposure to synergistic stimulation, said discontinuity comprising a deviation between an up-facing region of a three-dimensional object surface and a desired object envelope, the up-facing region comprising an end of an already-formed first structural layer, and an extension region comprising at least part of an upper surface of an already-formed second structural layer, the first structural layer having a lower surface which contacts at least in part the upper surface of the second structural layer, and the second structural layer having an end which extends beyond the end of the first structural layer by the extension region, which end contacts at least in part the envelope, wherein the first and second structural layers have thicknesses, the method comprising:
selectively exposing said material to synergistic stimulation to form a first fill layer having a thickness less than the thickness of the first structural layer.

15. The method of claim 14 wherein a lower surface of the first fill layer contacts, at least in part, the extension region of the second structural layer and a first edge of said first fill layer contacts at least in part said end of said first structural layer.

16. The method of claim 15 wherein the first fill layer is formed lengthwise and further comprising the steps of selectively exposing said material to an additional exposure of synergistic stimulation to form a second fill layer situated lengthwise, and having a lower surface which contacts, at least in part, the upper surface of the first fill layer, and having a first edge which contacts, at least in part, the first end of the first structural layer, and having a thickness less than the thicknesses of the first structural layer.

17. The method of claim 14 wherein said first fill layer is formed edgewise.

18. The method of claim 17 wherein a first edge of said first fill layer contacts, at least in part, the end of the first structural layer.

19. The method of claim 18 further comprising the step of selectively exposing said material to form a second fill layer situated edgewise, and having a first edge which contacts, at least in part, a second edge of said first fill layer, and having a lower surface which contacts, at least in part, the extension region of the second structural layer.

20. A method for reducing a surface discontinuity between first and second structural layers of a three-dimensional object being stereolithographically formed from a flowable material capable of selective physical transformation upon exposure to synergistic stimulation, said discontinuity comprising a deviation between an up-facing region of a three-dimensional object surface and a desired object envelope, the up-facing region to comprise an end of a not yet formed first structural layer, an extension region comprising at least a portion of an upper surface of an already-formed second structural layer, the second structural layer having an end which is to extend beyond the end of the first structural layer by the extension region, and which ends contacts at least in part the envelope, wherein the second structural layer has an upper surface which is to contact, at least in part, a lower surface of the first structural layer, the second structural layer having an upper surface situated at about a working surface of said flowable material, the method comprising:
forming a first layer of said flowable material over at least part of said extension region in preparation for forming a first fill layer; and
selectively exposing said first layer of said material to synergistic stimulation to form a first fill layer having a lower surface which contacts, at least in part, the extension region of the second structural layer.

21. The method of claim 20 wherein the first fill layer is formed edgewise and a first edge of the first fill layer contacts, at least in part, the end of the yet to be formed first structural layer.

22. The method of claim 20 wherein the first fill layer is formed edgewise and further comprising the step of selectively exposing said material to an additional exposure of synergistic stimulation to form a second edgewise fill layer having a lower surface which contacts, at least in part, the extension region of the second structural layer, and having an edge which contacts, at least in part, an edge of the first fill layer.

23. The method of claim 20 further comprising the steps of:
forming a second layer of untransformed material over at least part of said upper surface of said second structural layer; and
selectively exposing said second layer to a second exposure of synergistic stimulation to form said first structural layer, wherein said thickness of said first structural layer is greater than the thickness of said first fill layer.

24. The method of claim 23, further comprising the steps of:
forming a third layer of flowable material over at least part of said extension region; and
selectively exposing said third layer of flowable material to a third exposure of said synergistic stimulation, prior to forming said second layer of flowable material, to form a second fill layer adjacent to said first fill layer, and having a thickness which is less than the thickness of said first structural layer.

25. A method for reducing a surface discontinuity between first and second structural layers of a three-dimensional object being stereolithographically formed, said discontinuity comprising a deviation between a region of a three-dimensional object surface and a desired object envelope, the region to comprise an end of a not yet formed first structural layer, and an extension region, the extension region to comprise at least a portion of a surface of a not yet formed second structural layer, the second structural layer to have an end which is to extend beyond an end of the first structural layer by the extension region, the ends to contact at least in part the envelope, the surface of the first structural layer to contact, at least in part, a surface of the first structural layer, and the first and second structural layers to have thicknesses, the method comprising the following steps:

containing a volume of flowable material, the material capable of selective physical transformation upon exposure to synergistic stimulation;

selectively exposing said material to a first exposure to said synergistic stimulation to form a first selected one of said first and second structural layers;

selectively exposing said material to a second exposure of said synergistic stimulation to form a first fill layer having a first portion which contacts, at least in part, a portion of said first selected one; and selectively exposing said material to a third exposure to said synergistic stimulation, to form a second selected one of said first and second structural layers which is different from said first selected one, wherein a time order of exposure is one of the first exposure followed by the second exposure followed by the third exposure or the first exposure followed by the third exposure followed by the second exposure.

26. The method of claim 25 wherein said formation of said second selected one occurs after formation of said first fill layer, and said first fill layer will contact, at least in part, a portion of said second selected one after formation.

27. The method of claim 25 wherein said formation of said second selected one occurs before formation of said first fill layer, and said first fill layer contacts, at least in part, a portion of said second selected one.

28. A method for reducing a surface discontinuity between first and second structural layers of a three-dimensional object being stereolithographically formed from a flowable material capable of selective physical transformation upon exposure to synergistic stimulation, said discontinuity comprising a deviation between a region of a three-dimensional object surface and a desired object envelope, the region to comprise an end of a not yet formed first structural layer, and an extension region, the extension region to comprise at least a portion of a surface of a not yet formed second structural layer, the second structural layer to have an end which is to extend beyond an end of the first structural layer by the extension region, the ends to contact, at least in part, the envelope, the surface of the second structural layer to contact, at least in part, a surface of the first structural layer, the method comprising the following steps:

selectively exposing flowable material to a first exposure of said synergistic stimulation to form a first selected one of said first and second structural layers out of said material;

forming a meniscus in said region which at least in part reduces said discontinuity;

selectively exposing said meniscus, at least in part, to a second exposure of said synergistic stimulation whereupon said meniscus substantially transforms, wherein said exposure of said meniscus occurs prior to formation of a last layer of structure of said three-dimensional object;

forming a coating of said flowable material over at least a portion of an upper surface of said first selected one, said upper surface comprising one of said surfaces of said first and second structural layers; and selectively exposing said coating to a third exposure of said synergistic stimulation to form a second selected one of said first and second structural layers which is different from said first selected one.

29. The method of claim 28 wherein said first selected one is said second structural layer.

30. The method of claim 28 wherein the steps of forming the meniscus and selectively exposing the meniscus are repeated at least one to further reduce said discontinuity.

31. An improved stereolithographic apparatus for forming a three-dimensional object on substantially a layer by layer basis from a material capable of selective physical transformation upon exposure to synergistic stimulation comprising means for forming successive layers of unsolidified material of desired thickness in preparation for forming layers of structure of said three-dimensional object and means for exposing said layers of unsolidified material to synergistic stimulation to form said layers of structure of said three-dimensional object, including means for forming a last layer of unsolidified material and means for exposing said last layer to synergistic stimulation to form a last layer of structure thereby completing formation of all layers of said three-dimensional object, the improvement comprising:

means for reducing at least part of an up-facing surface discontinuity between two layers by selectively exposing said unsolidified building material within at least part of said discontinuity to synergistic stimulation wherein said synergistic stimulation impinges on a surface of said material with an orientation close to perpendicular prior to exposing said last layer of structure of said three-dimensional object.

32. An apparatus for reducing a surface discontinuity between first and second structural layers of a three-dimensional object being stereolithographically formed comprising a deviation between a down-facing region of a three-dimensional object surface and a desired object envelope, the down-facing region to comprise an end of a not yet formed first structural layer which is to contact at least in part the object envelope, and an extension region which is to comprise a portion of a lower surface of a not yet formed second structural layer, the lower surface to contact at least in part an upper surface of the first structural layer, the second structural layer to have an end which is to extend beyond the end of the first structural layer, and which is to contact, at least in part, the object envelope, comprising:

a container containing a volume of flowable material, which material is capable of selective physical transformation upon selective exposure to synergistic stimulation, whereupon a working surface of the material is formed;

at least one computer programmed to modify a building representation, wherein said building representation specifies a first exposure of said synergistic stimulation to form said first structural layer having a first cure depth, to specify selectively exposing material at the working surface to a second exposure of the synergistic stimulation to form a first fill layer, said fill layer having a first edge and a second edge and having an upper surface and being cured to a depth less than said first cure depth;

wherein said at least one computer is further programmed to specify selectively exposing material to a third exposure of synergistic stimulation to form said second structural layer, wherein said lower surface of said second structural layer contacts at least in part said upper surface of said first fill layer, in accordance with said building representation;

recoating means for forming an untransformed layer of said material over said upper surface of said first structural layer and said upper surface of said first fill layer; and forming means for selectively exposing material to said synergistic stimulation in accordance with said building representation.

33. The apparatus of claim 32 wherein said at least one computer programmed to modify said building representation specifies formation of the first fill layer edgewise and is further programmed to modify said building representation to specify selectively exposing material at the working surface to a fourth exposure of the synergistic stimulation, before said third exposure, to form a second fill layer situated edgewise, having an upper surface, a first edge, and a second edge, wherein one of said first or second edges of said second fill layer contact said first one of said first or second edges of said first fill layer, at least in part, and wherein said upper surface of said second fill layer contacts, at least in part, said lower surface of said second structural layer upon formation of said second structural layer.

34. The apparatus of claim 32 wherein said at least one computer programmed to modify said building representation specifies formation of the first fill layer lengthwise and overlapping, at least in part, the first structural layer.

35. The apparatus of claim 34 wherein said at least one computer is further programmed to modify said building representation to specify selectively exposing said material to a fourth exposure of the synergistic stimulation to form a second fill layer situated lengthwise, and overlapping, at least in part, the first structural layer, said second fill layer having an upper surface and a lower surface, and having a thickness less than the thickness of the first structural layer, whereupon the lower surface of said second fill layer contacts, at least in part, the upper surface of the first fill layer.

36. An apparatus for reducing a surface discontinuity between first and second structural layers of a three-dimensional object being stereolithographically formed comprises a deviation between a down-facing region of said three-dimensional object surface and a desired object envelope, the down-facing region comprising an end of an already-formed first structural layer which contacts at least in part the object envelope, and an extension region comprising a portion of a lower surface of a not yet formed second structural layer, after formation the lower surface of said second structural layer contacting at least in part an upper surface of the first structural layer, and the second structural layer having an end which extends beyond the end of the first structural layer by the extension region, which end contacts at least in part the object envelope, wherein the first and second structural layers have thicknesses, comprising:

at least one computer programmed to modify a building representation, wherein said building representation specifies coating over said first structural layer with a layer of desired thickness of said flowable building material in preparation for formation of said second structural layer and specifies selective exposure of said coating to said synergistic stimulation to form at least part of said second structural layer, to specify selectively exposing, at least in part, the extension region of the second structural layer to synergistic stimulation to expose material situated below the extension region to form a first fill layer; and forming means for selectively exposing said material to said synergistic stimulation in accordance with said modified building representation.

37. The apparatus of claim 36 wherein said at least one computer programmed to modify said building representation specifies formation of the first fill layer edgewise and is further programmed to modify said building representation to specify selectively exposing at least in part the upper surface of the extension region to an additional exposure of the synergistic stimulation sufficient to expose material situated below the extension region of the second structural layer to form a second fill layer situated edgewise relative to the working surface and contacting at least in part said first fill layer and said second structural layer.

38. The apparatus of claim 36 wherein said at least one computer programmed to modify said building representation specifies formation of the first fill layer lengthwise.

39. The apparatus of claim 38 wherein said at least one computer is further programmed to modify said building representation to specify selectively exposing at least in part the extension region to an additional exposure of synergistic stimulation to expose material situated below the extension region of the second structural layer to form a second fill layer situated lengthwise relative to the working surface, and having an upper surface which contacts, at least in part, a lower surface of said first fill layer.

40. An apparatus for reducing a surface discontinuity between first and second structural layers of a three-dimensional object being stereolithographically formed, said discontinuity comprising a deviation between an up-facing region of a three-dimensional object surface and a desired object envelope, the up-facing region comprising an end of an already-formed first structural layer, and an extension region comprising at least part of an upper surface of an already-formed second structural layer, the first structural layer having a lower surface contacting at least in part the upper surface of the second structural layer, and the second structural layer having an end which extends beyond the end of the first structural layer by the extension region, which end contacts at least in part the object envelope, wherein the first structural layer has an upper surface at about a working surface of flowable material capable of selective physical transformation upon exposure to synergistic stimulation, wherein the first and second structural layers have thicknesses, comprising:

at least one computer programmed to modify a building representation to specify selectively exposing said material to a first exposure of the synergistic stimulation to form a first fill layer having a thickness less than the thicknesses of the first and second structural layers; and forming means for selectively exposing said material to said synergistic stimulation in accordance with said modified building representation.

41. The apparatus of claim 40 wherein said at least one computer programmed to modify said building representation specifies formation of the first fill layer lengthwise and is further programmed to modify said building representation to specify selectively exposing said material to a second exposure of synergistic stimulation to form a second fill layer situated lengthwise, and having a lower surface which contacts, at least in part, the upper surface of the first fill layer, and having a first edge which contacts, at least in part, the first end of the first structural layer, and having a thickness less than the thicknesses of the first structural layer.

42. The apparatus of claim 40 wherein said at least one computer programmed to modify said building representation specifies formation of the first fill layer edgewise.

43. The apparatus of claim 42 wherein said at least one computer is programmed to modify said building representation to specify selectively exposing said material to form a second fill layer situated edgewise, and having a first surface which contacts, at least in part, a second edge of said first fill layer, and having a lower surface which contacts, at least in part, the extension region of the second structural layer.

44. An apparatus for reducing a surface discontinuity between first and second structural layers of a three-dimensional object being stereolithographically formed from a flowable material capable of selective physical transformation upon exposure to synergistic stimulation, said discontinuity comprising a deviation between an up-facing region of a three-dimensional object surface and a desired object envelope, the up-facing region to comprise an end of a not yet formed first structural layer, an extension region comprising at least a portion of an upper surface of an already-formed second structural layer, the second structural layer having an end which is to extend beyond the end of the first structural layer by the extension region, and which ends contacts at least in part the object envelope, wherein the second structural layer has an upper surface which is to contact, at least in part, a lower surface of the first structural layer, the second structural layer having an upper surface situated at about a working surface of flowable material, comprising:

at least one computer programmed to modify a building representation to specify forming a coating of said flowable material over at least part of said extension region in preparation for forming a first fill layer and selectively exposing said material to a first exposure of synergistic stimulation to form said first fill layer, and having a lower surface which contacts, at least in part, the extension region of the second structural layer;

coating means for forming a coating over previously formed layers in accordance with said modified building representation; and forming means for selectively exposing said material to said synergistic stimulation in accordance with said modified building representation.

45. The apparatus of claim 44 wherein said at least one computer programmed to modify said building representation specifies formation of the first fill layer edgewise and is programmed to further modify said building representation to specify selectively exposing said material to a second exposure of the synergistic stimulation to form a second fill layer edgewise having a lower surface which contacts, at least in part, the extension region of the second structural layer, and having an edge which contacts, at least in part, an edge of the first fill layer.

46. The apparatus of claim 44 wherein said building representation specifies formation of a second coating, at least in part, over said first fill layer in said second structural layer in preparation for formation of said first structural layer and wherein said building representation specifies formation of said first structural layer over said second structural layer.

47. The apparatus of claim 46
wherein said at least one computer is programmed to modify said building representation to specify forming a third coating of said flowable material over said extension region prior to forming said second coating and specifies selectively exposing said third coating of said flowable material to a third exposure of said synergistic stimulation before formation of the first structural layer to form a second fill layer having a thickness which is less than the thickness of said first structural layer.

48. An apparatus for reducing a surface discontinuity between a first and second structural layer of a three-dimensional object being stereolithographically formed said discontinuity comprising a deviation between a region of a three-dimensional object surface and a desired object envelope, the region to comprise an end of a not yet formed first structural layer, and an extension region, the extension region to comprise at least a portion of a surface of a not yet formed second structural layer, the second structural layer to have an end which is to extend beyond an end of the first structural layer by the extension region, the ends to contact at least in part the object envelope, the surface of the second structural layer to contact, at least in part, a surface of the first structural layer, and the first and second structural layers to have thicknesses, comprising:

a container containing a volume of flowable material, the material being capable of selective physical transformation upon exposure to synergistic stimulation;

at least one computer programmed to modify a building representation, wherein said building representation specifies a first exposure of said synergistic stimulation to form a first selected one of said first and second structural layers in accordance with a building representation, to specify selectively exposing said material to a second exposure of said synergistic stimulation to form a first fill layer having a first portion which contacts, at least in part, a portion of said first selected one; and wherein said building representation specifies selectively exposing said material to a third exposure of said synergistic stimulation, to form a second selected one of said first and second structural layers which is different from said first selected one, wherein said modified building representation specifies a time order of exposure to be one of the first exposure followed by the second exposure followed by the third exposure or the first exposure followed by the third exposure followed by the second exposure; and forming means for selectively exposing said material to said synergistic stimulation in accordance with said modified building representation.

49. An apparatus for reducing a surface discontinuity between first and second structural layers of a three-dimensional object being stereolithographically formed from a flowable material capable of selective physical transformation upon exposure to synergistic stimulation, said discontinuity comprising a deviation between a region of a three-dimensional object surface and a desired object envelope, the region to comprise an end of a not yet formed first structural layer, and an extension region, the extension region to comprise at least a portion of a surface of a not yet formed second structural layer, the second structural layer to have an end which is to extend beyond an end of the first structural layer by the extension region, the ends to contact, at least in part, the object envelope, the surface of the second structural layer to contact, at least in part, a surface of the first structural layer, comprising:

at least one computer programmed to modify said building representation, wherein said building representation specifies a first exposure of said synergistic stimulation to form a first selected one of said first and second structural layers out of said material, to specify selectively exposing a meniscus of said material to a second exposure of said synergistic stimulation whereupon at least a portion of said meniscus substantially transforms, and wherein said building representation further specifies selectively exposing said flowable material to a third exposure of said synergistic stimulation to form a second selected one of said first and second structural layers which is different from said first selected one;

recoating means for forming a coating of untransformed material over an upper surface of said first selected one;

meniscus forming means for forming a meniscus of said flowable material in said region which at least in part reduces said discontinuity; and at least one forming means for selectively exposing material to said synergistic stimulation in accordance with said modified building representation to transform said material to form said layers and to transform said meniscus to reduce said discontinuity.

50. A method for forming a three-dimensional object from a material capable of selective physical transformation upon exposure to synergistic stimulation, comprising the steps of:

modifying an object representation, specifying, at least in part, a first layer of the object adjacent to a second layer in the object, said first and second layers specified to have thicknesses, and specified to form a surface which includes a deviation from a desired object envelope, to obtain a modified object representation further specifying forming a third layer, specified to have a thickness less than the thickness of said first and second layers, and attaching said third layer to at least one of said first or second layers of said object to reduce said deviation;

successively forming layers of said material; and selectively exposing said layers of material to said synergistic stimulation in accordance with said modified object representation to obtain said three-dimensional object.

51. An apparatus for forming a three-dimensional object from a material capable of selective physical transformation upon exposure to synergistic stimulation, comprising:

at least one computer programmed to modify an object representation specifying, at least in part, a first layer of the object adjacent to a second layer of the object, said first and second layers specified to have thicknesses, and specified to form a region which comprises a deviation from a desired object envelope, to obtain a modified object representation further specifying forming a third layer, specified to have a thickness less than the thicknesses of said first and second layers, and attaching said third layer to at least one of said first or second layers to reduce said deviation;

means for successively forming layers of said material; and means for selectively exposing said layers of material to said synergistic stimulation in accordance with said modified object representation to form said three-dimensional object.

52. The improved method of claim 1 wherein the step of reducing at least part of a surface discontinuity between two consecutive layers comprises selectively exposing said unsolidified building material within at least part of said discontinuity to synergistic stimulation to form at least one layer thinner than said thickness of said layers of structure.

53. The improved method of claim 52 additionally comprising the step of:

determining a configuration of the discontinuity to be reduced by comparing the difference between material to be cured by said two consecutive layers and the material desired to be cured within an object envelope, said object envelope descriptive of the desired object configuration.

54. The method of claim 1 wherein up-facing surface discontinuities exist between a plurality of layers and a wherein said step of reducing the up-facing surface discontinuity reduces a substantial number of said discontinuities.

55. The method of claim 2 wherein down-facing surface discontinuities exist between a plurality of layers and a wherein said step of reducing the down-facing surface discontinuity reduces a substantial number of said discontinuities.

56. The method of claim 3 wherein a plurality of layers are cured each having a desired z-range of a desired thickness and wherein the exterior surface corresponding to a substantial number of said desired z-ranges is at least partially formed from a number of fill layers.

57. The method of claim 29 wherein the time order of exposure is specified to be the first exposure followed by the third exposure followed by the second exposure.

58. The method of claim 57 wherein the step of forming the meniscus comprises the step of separating an upper surface of said second selected one from a material surface.

59. The method of claim 58 wherein the step of separating comprises raising at least said second selected one above said material surface.

60. The apparatus of claim 31 wherein the means for forming the layers is the means for forming the last layer and the means for exposing said layers is the means for exposing said last layer.

61. An improved stereolithographic apparatus for forming a three-dimensional object on substantially a layer by layer basis from a material capable of selective physical transformation upon exposure to synergistic stimulation comprising means for forming successive layers of unsolidified material of desired thickness in preparation for forming layers of structure of said three-dimensional object and means for exposing said layers of unsolidified material to synergistic stimulation to form said layers of structure of said three-dimensional object, including means for forming a last layer of unsolidified material and means for exposing said last layer to synergistic stimulation to form a last layer of structure thereby completing formation of all layers of said three-dimensional object, the improvement comprising:

means for reducing at least part of a down-facing surface discontinuity between a first and a second layer by selectively exposing said unsolidified building material within at least part of said discontinuity to synergistic simulation prior to exposing said last layer of structure of said three-dimensional object but after a layer of material is formed in preparation for formation of said second layer.

62. The apparatus of claim 61 wherein the means for forming the layers is the means for forming the layer and the means for exposing said layers is the means for exposing said last layer.

63. An improved stereolithographic apparatus for forming a three-dimensional object, having an exterior surface, on substantially a layer by layer basis from a material capable of selective physical transformation upon exposure to synergistic stimulation, comprising means for forming successive layers of unsolidified material of desired thickness, including a last layer, in preparation for forming layers of structure of said three-dimensional object and means for exposing said layers of unsolidified material to synergistic stimulation to form said layers of said three-dimensional object, including formation of a last layer of structure thereby completing formation of all layers of said three-dimensional object, the improvement comprising:

means for selectively exposing a layer of material of desired thickness to form at least a portion of an internal region of a layer of structure, said layer of structure having a z-range corresponding to said desired thickness; and means for forming at least a portion of said exterior surface of said three-dimensional object from at least one fill layer which has a thicknesses less than said desired thickness, and wherein said at least portion of said exterior surface corresponds to said z-range.

64. The apparatus of claim 63 wherein said means for selectively exposing exposes a plurality of layers each having a desired z-range of a desired thickness and wherein the exterior surface corresponding to a substantial number of said desired z-ranges and wherein said means for forming forms at least a portion of said exterior surface from a number of fill layers.

65. The apparatus of claim 32 wherein said at least one computer programmed to modify said building representation specifies formation of the first fill layer lengthwise and is further programmed to modify said building representation to specify selectively exposing at least a portion of the upper surface of the first fill layer to a fourth exposure of synergistic stimulation, before said third exposure, to form a second fill layer situated lengthwise, and having an upper surface which contacts at least in part the lower surface of the first fill layer, and having a thickness less than said first thickness.

66. The apparatus of claim 49 wherein said at least one computer is programmed to specify performing said first exposure followed by said third exposure followed by said second exposure.

67. The apparatus of claim 49, wherein the meniscus forming means is adapted to separate an upper surface of said second selected one from a material surface.

68. The apparatus of claim 67 wherein the meniscus forming means is adapted to raise at least said second selected one above said material surface.

69. The apparatus of claim 68 wherein the first structural layer is below the second structural layer and the at least one computer is programmed to specify the first structural layer as the second selected one and the second structural layer as the first selected one.

* * * * *